United States Patent [19]
Katsuyama et al.

[11] Patent Number: 6,035,061
[45] Date of Patent: Mar. 7, 2000

[54] TITLE EXTRACTING APPARATUS FOR EXTRACTING TITLE FROM DOCUMENT IMAGE AND METHOD THEREOF

[75] Inventors: Yutaka Katsuyama; Satoshi Naoi, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/694,503

[22] Filed: Aug. 7, 1996

[30] Foreign Application Priority Data

Sep. 6, 1995 [JP] Japan .................................. 7-229508
Dec. 28, 1995 [JP] Japan .................................. 7-341983

[51] Int. Cl.[7] ........................................................ G06K 9/34
[52] U.S. Cl. ............................ 382/177; 382/171; 382/203; 382/101
[58] Field of Search .................................... 382/180, 177, 382/176, 203, 101, 171, 175, 168, 170, 173, 174, 190, 226; 358/462

[56] References Cited

U.S. PATENT DOCUMENTS

| | | | |
|---|---|---|---|
| 5,075,895 | 12/1991 | Bessho | 382/61 |
| 5,185,813 | 2/1993 | Tsujimoto | 382/9 |
| 5,613,016 | 3/1997 | Saitoh | 382/174 |

FOREIGN PATENT DOCUMENTS 5274367 10/1993 Japan .

OTHER PUBLICATIONS

Takashi Saitoh et al., "Document Image Segmentation and Layout Analysis", *IEICE Transactions on Information and Systems*, Jul. 1994, No. 7, Tokyo, JP, pp. 778–784.

Hiroko Fujihara et al., "Qualitative/Fuzzy Approach to Document Recognition", *The Eighth Conference on Artificial Intelligence for Applications*, Mar., 1992, pp. 254–260.

A. Dengel et al., "OfficeMaid—A system for Office Mail Analysis, Interpretation and Delivery", Germany, pp. 52–75.

T. Akiyama and N. Hagita, "Automated entry system for printed documents", Pattern Recognition, vol. 23, No. 11, pp. 1141–1154, 1990.

*Primary Examiner*—Phuoc Tran
*Attorney, Agent, or Firm*—Staas & Halsey, LLP

[57] ABSTRACT

A title extracting apparatus scans black pixels in a document image and extracts rectangular regions that circumscribe connected regions of the black pixels as character rectangles. In addition, the title extracting apparatus unifies a plurality of character rectangles that adjoin and extracts rectangular regions that circumscribe the character rectangles as character string rectangles. Thereafter, the title extracting apparatus calculates points with the likelihood of being a title corresponding to attributes such as an underline attribute, a frame attribute, and a ruled line attribute of each character string rectangle, the positions of the character string rectangles in the document image, and the mutual position relation and extracts a character string rectangle with the highest points as a title rectangle. In the case of a tabulated document, the title extracting apparatus can extract a title rectangle from the inside of the table. Characters extracted from the title rectangle are used as keywords of a document image by the character recognizing process.

76 Claims, 77 Drawing Sheets

FIG. 4

| FREQUENCY | MAXIMUM HEIGHT |
|---|---|
| 2 | 15 |
| 7 | 10 |
| 12 | 9 |
| 19 | 8 |

FIG. 9

FRAME RECTANGLE 1401

ソフトウェア販推レポート 送付表

~FRAME RECTANGLE 1402

~FRAME RECTANGLE 1403

| |
|---|
| LABEL VALUE OF REFERENCE RECTANGLE |
| POINTER TO UPPER RECTANGLE |
| POINTER FROM UPPER RECTANGLE |
| POINTER TO LOWER RECTANGLE |
| POINTER FROM LOWER RECTANGLE |
| POINTER TO LEFT RECTANGLE |
| POINTER FROM LEFT RECTANGLE |
| POINTER TO RIGHT RECTANGLE |
| POINTER FROM RIGHT RECTANGLE |

FIG. 20

DOCUMENT REGION
281

FIG. 28

UNDERLINE FLAG IS SET

```
┌─────────────────────────────────┐ 71
│                                 │
│   CHARACTER   STRING   RECTANGLE│
│                                 │
└─────────────────────────────────┘

┌───────────────────────┐
    │   UNDERLINE RECTANGLE │
    └───────────────────────┘ 72
```

RULED LINE FLAG IS SET

FIG. 29

MARK A PARTIAL RECTANGLE WITH A HEIGHT THAT IS (HEIGHT OF CHARACTER STRING
    RECTANGLE x0.3) OR LARGER AS A WILD CARD PARTIAL RECTANGLE (use=9).
OTHERWISE, MARK A PARTIAL RECTANLGE AS A STANDARD RECTANGLE (use=0).

lnum=0

THE FOLLOWING PROCESS IS PERFORMED FOR ALL PARTIAL RECTANGLES.
    CURRENT RECTANGLE : i {

```
if ((use OF RECTANGLE i IS 0) OR ( use OF RECTANGLE i IS 9)) {
  xlf =              COORDINATE AT LEFT EDGE OF RECTANGLE i
  xr  =              COORDINATE AT RIGHT EDGE OF RECTANGLE i
  yup = line_starty = COORDINATE AT UPPER EDGE OF RECTANGLE i
  ybl = line_endy   = COORDINATE AT LOWER EDGE OF RECTANGLE i if(use OF RECTANGLE i IS 0) {
    standard_st=yup;
    standard_en=ybl;
    standard_h=ybl-yup+1;
    b_use=0; /* THE FIRST SEGMENT HAS BEEN SET AS a standard RECTANGLE
                                    RATHER THAN a wild card. */
    height=ybl-yup+1;
    use OF RECTANGLE i=1;
  }
  else { /* IN THE CASE OF use:9 */
    standard_st=0;
    standard_en=0;
    standard_h=0;
    b_use=9; /* THE FIRST SEGMENT HAS BEEN SET AS a wild card
                                    RATHER THAN a standard RECTANGLE. */
    height2=ybl-yup+1;
    height=0;
  }
  THE FOLLOWING PROCESS IS PERFORMED FOR ALL PARTIAL RECTANGLES.
      CURRENT RECTANGLE :k {
C1→α
C2→β
  }
  /* IN THE CASE THAT ALL SEGMENTS ARE wild card SEGMENTS. */
  if( (b_use IS 9) ) {
    /* THE HEIGHT OF THE FIRST SEGMENT IS SUBSTITUTED
                                    WITH THE HEIGHT OF A LONG SEGMENT. */
    height=height2;
  }

THE COORDINATE OF THE OBTAINED SEGMENT(LEFT EDGE : xlf, RIGHT EDGE : xr,
  UPPER EDGE : line_starty, LOWER EDGE : line_endy) ARE STORED
                                    AT lnum IN yokoline.

lnum IS INCREMENTED BY ONE.
  }
}
```

FIG. 34

```
rxlr = COORDINATE AT LEFT EDGE OF RECTANGLE k
rxr  = COORDINATE AT RIGHT EDGE OF RECTANGLE k
ryup = COORDINATE AT UPPER EDGE OF RECTANGLE k
rybl = COORDINATE AT LOWER EDGE OF RECTANGLE k
rheight=rybl-ryup+1;

/* A VALUE OF a standard RECTANGLE HAS BEEN SET. */
if( (b_use IS 0) ) {
   /* THE CURRENT RECTANGLE IS a standard RECTANGLE.
          THE RIGHT-SIDE RECTANGLE IS a wild card. */
   if (use OF RECTANGLE k IS 9) {

/* THE CURRENT RECTANGLE OVERLAPS WITH THE RIGHT SIDE RECTANGLE
          FOR 1 dot OR MORE IN THE HORIZONTAL AND VERTICAL DIRECTIONS. */
      if( (xr+1)>=rxlf) && (xr< rxr) ) &&
         ( (ybl+1)>=ryup) && ( (yup-1)<=rybl) ) {
         xr     = rxr;
      }
   }
   /* THE CURRENT RECTANGLE IS a standard RECTANGLE.
          THE RIGHT SIDE RECTANGLE IS NOT a wild card. */
   else if( use OF RECTANGLE k IS 0) {
   /* THE CURRENT RECTANGLE OVERLAPS WITH THE RIGHT SIDE RECTANGLE
          FOR 1 dot OR MORE IN THE HORIZONTAL AND VERTICAL DIRECTIONS. */
   if( ((xr+1) >=rxlf) && (xr <rxr) &&
      ((ybl+1)>=ryup && ((yup-1) <=rybl) &&
      (standard_h-TH_HEIGHTDOT   <= rheight) &&
      (rheight<=standard_h+TH_HEIGHTDOT) ) {
   use OF RECTANGLE k = 2;
   xr        = rxr;
   yup       = ryup;
   ybl       = ryb1;
   hei=rybl-ryup+1;
   if(hei>height) {
      height=hei;
   }
   if(ryup<line_starty)
      line_starty=ryup;
   if(rybl>line_endy)
      line_endy=rybl;

standard_h=hei;
   }
 }
}
```

F I G. 3 5

```
/* A VALUE OF a standard RECTANGLE HAS NOT BEEN SET. */
else if((b_use ==9) ) {
  /* THE CURRENT RECTANGLE IS NOT a standard RECTANGLE.
        THE RIGHT SIDE RECTANGLE IS a wild card. */
  if (use OF RECTANGLE k IS 9) {

/* THE CURRENT RECTANGLE OVERLAPS WITH THE RIGHT SIDE RECTANGLE
           FOR 1 dot OR MORE IN THE RIGHT SIDE RECTANGLE FOR 1 dot
               OR MORE IN THE HORIZONTAL DIRECTION. */
     if( (xr+1) >=rxlf) && (xr < rxr) ) {
        xr      =rxr;
     }
  }
  /* THE CURRENT RECTANGLE IS NOT a standard RECTANGLE.
        THE RIGHT SIDE RECTANGLE IS NOT a wild card RECTANGLE. */
  else if(use OF RECTANGLE k IS 0) {

/* THE CURRENT RECTANGLE OVERLAPS WITH THE RIGHT SIDE RECTANGLE
           FOR 1 dot OR MORE IN THE HORIZONTAL DIRECTION. */
     if( ((xr+1) >=rxlf) && (xr < rxr) ) { b_use=0; /* A VALUE OF a standard RECTANGLE HAS BEEN SET. */
        use OF RECTANGLE k = 2;
        xr      = rxr;
        yup     = ryup;
        ybl     = rybl;
        hei=rybl-ryup+1;
        if(hei>height) {
          height=hei;
        }
        standard_st=ryup;
        standard_en=rybl;
        standard_h-hei;
        line_starty=ryup;
        line_endy=rybl;
     }
  }
}
```

F I G. 3 6

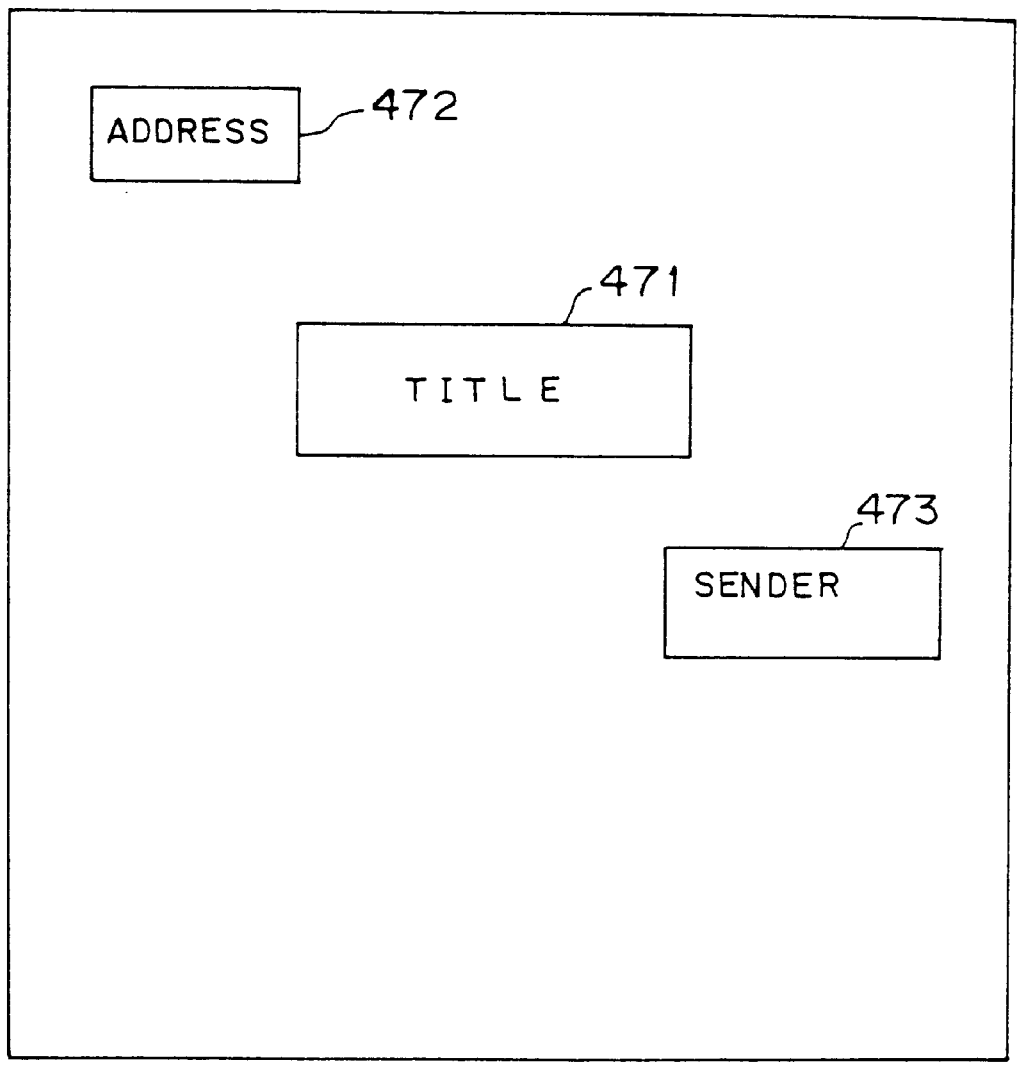
F I G. 47

TITLE 491

ADDRESS 492

SENDER INFORMATION 493

FIG. 50

TABLE RULED LINE 511

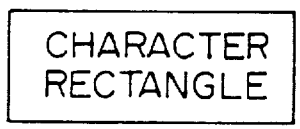 HEIGHT H  NUMBER OF CHARACTER = [ W / H ]
WIDTH W
F I G. 66

FIG. 77

TITLE EXTRACTING APPARATUS FOR EXTRACTING TITLE FROM DOCUMENT IMAGE AND METHOD THEREOF

BACKGROUND OF THE INVENTION

1. Field of the Invention

The present invention relates to an image data recognizing process, and in particular, to a title extracting apparatus for extracting a title region from a document image obtained as image data of a document and a method thereof.

2. Description of the Related Art

Related art references for extracting a partial region, such as a title of a document, from a document image, that is image data obtained from a conventional document by a photoelectric converting device such as a scanner, include:

(1) A title extracted from a document with fixed regions (as disclosed in Japanese Patent Laid-Open Publication No. 64-46873).

(2) A title portion of a document marked with a particular marking means such as a color marker or frame lines. The document is scanned by a scanner and the title portion is extracted (as disclosed in Japanese Patent Laid-Open Publication No. 01-150974).

(3) A physical structure such as a character string of a document or a photograph is represented as a tree structure or the like. By matching tree structures as logical structures, the physical structures tagged with "title", "writer name", and so forth (as disclosed in Japanese Patent Laid-Open Publication Nos. 01-183784, 05-342326, and so forth).

(4) A region of a part of a document image is assigned. The inside of the region is projected and a histogram of black pixels is generated. A range of continuous values of projected black pixels between two predetermined thresholds is obtained. A portion of the length of the continuous portion that exceeds another predetermined threshold is extracted as a title (as disclosed in Japanese Patent Laid-Open Publication No. 05-274471).

In addition, the following related art references for extracting a partial region such as a title from a document image that includes a table are known.

(5) A title is extracted from a formatted document including a table (as disclosed in Japanese Patent Laid-Open Publication No. 07-093348).

(6) A document image is projected and a histogram of black pixels is generated. Frame lines are extracted from the distribution of the histogram. A character string surrounded by the frame lines is extracted as a title (as disclosed in Japanese Patent Laid-Open Publication No. 05-274367).

(7) Characters of all character regions in a document image are recognized. A knowledge process such as keyword collation and mode prime analysis is linguistically and logically performed for the obtained character codes. A character string that is likely to be a title is extracted from a result of the knowledge process (as disclosed in Japanese Patent Laid-Open Publication No. 03-276260).

(8) A region surrounded by a white pixel connected portion in a document image is extracted as a table portion. Ruled lines are extracted from the inside of the table. A region surrounded by the ruled lines is obtained. An image in the obtained region is template-matched with a predetermined character string (template). Thus, the same character string is extracted as a title (as disclosed in Japanese Patent Laid-Open Publication No. 03-74728).

However, these related art references have the following problems.

In methods (1) and (5), only formatted documents are processed. When a format is changed, the assignment of a portion to be extracted must also be changed.

In method (2), it is burdensome to mark an original document.

In the method (3), a dictionary of logical structures represented with tree structures or the like must be prepared. When the logical structure of a document is not contained in the dictionary, a title cannot be precisely extracted.

In method (4), although the method for assigning a region of a document image is not clear, if this method is applied for all regions of the document image, a large black pixel portion such as a table or a chart will be incorrectly extracted as a title. Moreover, in a document that contains only characters, a character string in a large font is not always a title. Thus, a title may not be correctly extracted.

In method (6), a title may be extracted if a table containing the title is surrounded by simple ruled lines. However, since a table contains complicated ruled lines, a title region cannot be precisely distinguished.

In method (7), the currently available character recognizing process takes a long time. Thus, this method is substantially used as a batch process. In addition, since the recognition ratio is not 100%, an incorrect portion may be extracted as a title unless information of a title position is used.

In method (8), the template matching process for an image takes time. In addition, the process is adversely affected by the shape and size of a font used in the template. Moreover, in this method, only predetermined character strings can be extracted as titles. Thus, in this method, the types of documents that can be processed are limited.

Thus, in the conventional title extracting methods, special preparations or special operations are required. In addition, documents and titles that can be processed by such methods are limited.

SUMMARY OF THE INVENTION

An object of the present invention is to provide a title extracting apparatus for easily extracting a title portion from a document image and a method thereof.

The present invention is a title extracting method, comprising the steps of converting a document into image data so as to generate a document image, generating a character region including a black pixel connected region composed of connected black pixels in the document image, unifying at least one character region so as to generate a character string region including the character region, extracting a particular character string region of a plurality of a character string regions as a title region corresponding to attributes of a plurality of character string regions, and recognizing characters included in the title region.

Thus, regions of a title, an address, and a sender information can be easily extracted from various document images without having to perform special operations and use dictionaries and so forth. Character strings and so forth extracted from the image data can be used as keywords of the image data.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a schematic diagram showing document image data;

FIG. 9 is a schematic diagram showing a rectangle height table;

FIG. 20 is a schematic diagram showing a connection relation table;

FIG. 28 is a schematic diagram showing a document region;

FIG. 29 is a schematic diagram showing an underline rectangle;

FIG. 34 is a list showing codes for the segment extracting process (No. 1);

FIG. 35 is a list showing codes for the segment extracting process (No. 2);

FIG. 36 is a list showing codes for the segment extracting process (No. 3);

FIG. 47 is a schematic diagram showing a fourth arrangement of a title, an address, and a sender information;

FIG. 50 is a schematic diagram showing another example of the extracted result of a title, an address, and a sender information;

FIG. 51 is a schematic diagram showing a tabulated document;

FIG. 53 is a schematic diagram showing image data of a tabulated document;

FIG. 66 is a schematic diagram showing the relation of a character rectangle and the number of characters thereof;

FIG. 77 is a schematic diagram showing an extracted result of an in-table title.

DESCRIPTION OF THE PREFERRED EMBODIMENT

Figure 1:
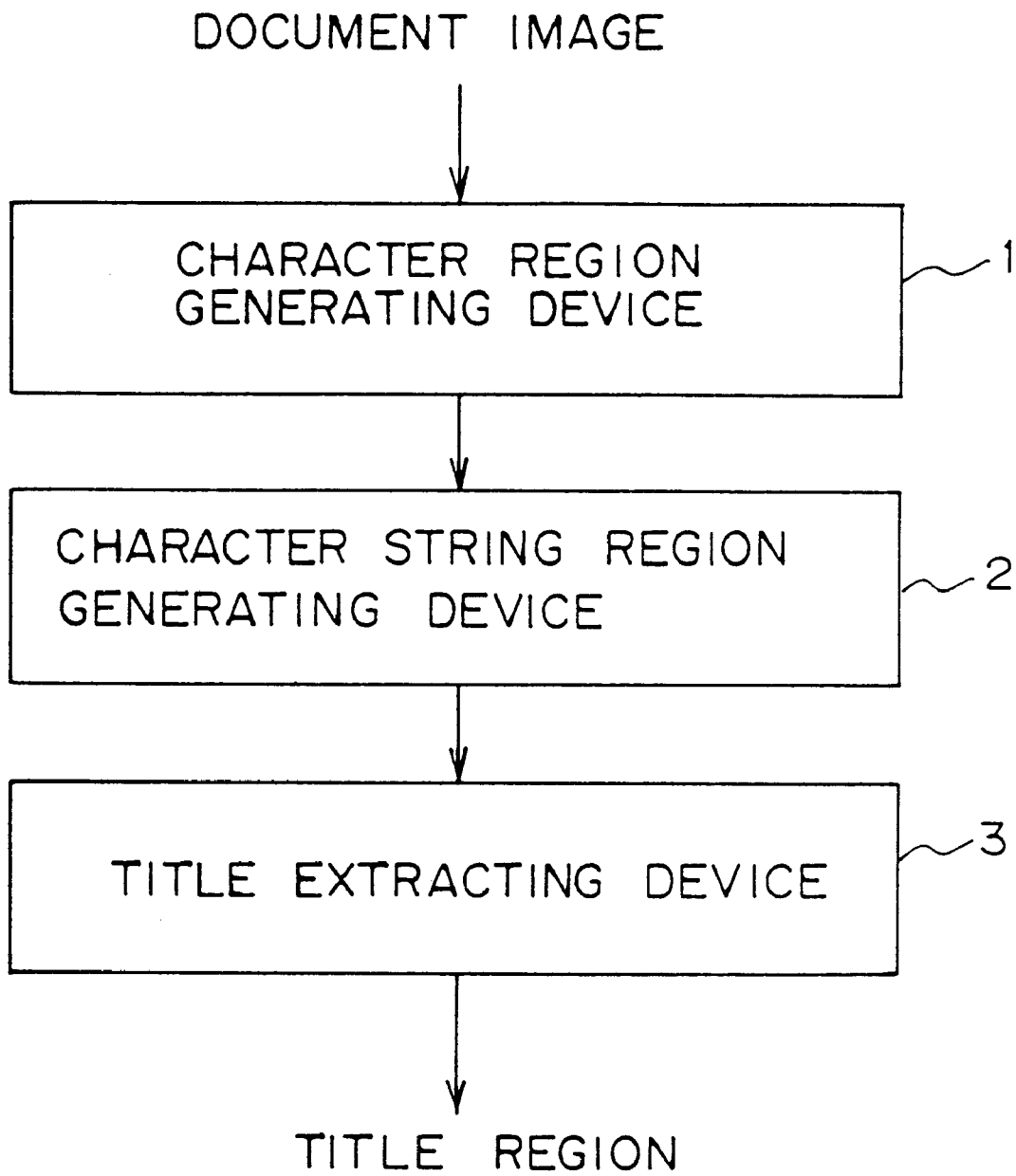
FIG. 1 is a block diagram showing the theory of the present invention.

FIG. 1 is a block diagram showing the theory of a title extracting apparatus according to the present invention.

The title extracting apparatus shown in FIG. 1 comprises a character region generating device 1, a character string region generating device 2, and a title extracting device 3.

The character region generating device 1 generates a character region including a black pixel connected region composed of connected black pixels in a document image which is a document that is converted into image data.

The character string region generating device 2 unifies at least one character region generated by the character region generating device 1 and generates a character string region including the character region.

The title extracting device 3 extracts a particular character string region from a plurality of character string regions as a title region corresponding to attributes of a plurality of character string regions generated by the character string region generating device 2.

The character region generating device 1 scans black pixels in the document image and extracts a rectangular region that circumscribes a connected region of the black pixels as a character region. Thus, a large number of character regions are generated corresponding to the numerous characters in the document.

Next, the character string region generating device 2 unifies a plurality of character regions that adjoin and extracts a rectangular region that circumscribes these character regions as a character string region. The extracted character string region accords with, for example, a character string for one line of a horizontally written document.

The title extracting device 3 evaluates the likelihood that the character string region includes a title using attributes such as an underline attribute, a frame attribute, and a ruled line attribute for each generated character string region, and extracts a particular character string region that has a maximum likelihood of being a title as a title region.

The underline attribute indicates that a line is disposed inside or below a current character string region. The underline attribute is represented by an underline flag or the like. The frame attribute indicates that a character string region is surrounded by frame lines. The frame attribute is represented by a frame flag or the like. The ruled line attribute indicates that a character string region accords with a vertically ruled line or a horizontal ruled line. The ruled line attribute is represented by a ruled line flag or the like. Character string regions with the underline attribute and the frame attribute are often titles of documents. On the other hand, character string regions with the ruled line attribute are most likely not titles. Thus, the likelihood of a title can be automatically evaluated corresponding to the attributes.

The title extracting device 3 extracts a table region including a black pixel connected region of a predetermined size or larger and extracts a particular character string region from a plurality of character string regions in the table region as a title region.

For example, a table region is a rectangular region that circumscribes a black pixel connected region and that has a predetermined threshold. The title extracting device 3 evaluates the relation between the positions of character string regions in the table region and the number of characters thereof for the likelihood of being a title, and extracts a particular character string region that has the maximum likelihood of being a title as a title region.

For example, a character string region that is closest to the upper left edge of a table region is treated as a title. In addition, a character string region with a large font is treated as a title.

According to the title extracting apparatus of the present invention, a title extracting process can be precisely performed for various document images, including tabulated documents, without having to mark original documents and use special dictionaries containing structures, regardless of the size of fonts used. In addition, according to the title extracting apparatus of the present invention, characters of a character region included in an extracted title region are recognized and the recognized result can be used as keywords of document images.

Next, with reference to the accompanying drawings, an embodiment of the present invention will be described in detail.

In recent years, attempts for storing information in electronic means instead of conventional paper means have been made. An example of the electronic means is an electronic filing system. In the electronic filing system, a document written on paper is converted into an image by a photoelectric converting device such as an image scanner. Keywords and management information are assigned to the image and stored on an optical disc or a hard disk.

In this method, since a document is stored as image data, the required storage capacity of a disc that stores the image data is larger than in a method in which all characters written in the document are encoded by a character recognizing method and then stored. However, the former method has many advantages over the latter method, such as easy operation, fast processing speed, and storage of noncharacter data including pictures and tables. However, in the former method, in order to retrieve stored information, management information such as keywords and numbers should be assigned along with document images. In the conventional system, it takes a long time to designate keywords. Thus, the conventional system is not user-friendly.

To solve this problem, a method for automatically extracting a title portion in a document as a keyword, recognizing characters of the title portion, encoding the recognized characters, and storing the encoded result along with a document image may be applicable.

The speed of the character recognition process that is currently available is at most several tens of characters per second. When one sheet of an A4 document is processed, a process time in a range from 30 seconds to several minutes is required. Thus, to increase the speed of the title extracting process, a method for extracting only a title portion from an image and then recognizing characters thereof is effective.

In the method for recognizing all characters in a document and extracting a title, the relation of the position of a title portion in the image is not considered. Thus, a title code may not be precisely extracted due to incorrect recognition and paragraph connection.

To effectively operate the electronic filing system, it can be said that the technology for directly extracting a title portion (region) from a document image is important. Next, with the electronic filing system, the title extracting technology according to the present invention will be described.

Figure 2:
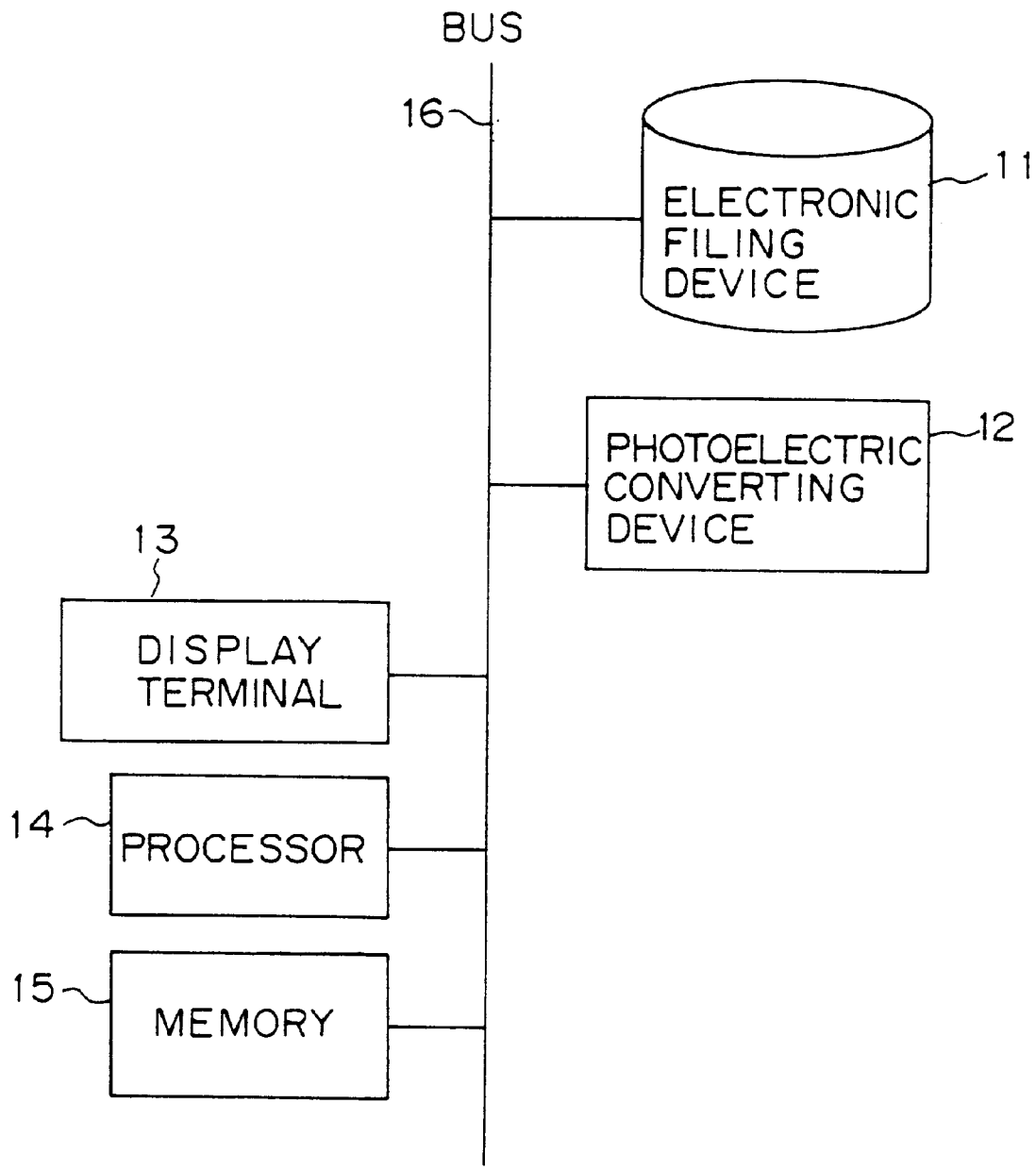
FIG. 2 is a block diagram showing a structure of a system of the present invention.

FIG. 2 is a block diagram showing a structure of a title extracting system according to an embodiment of the present invention. The title extracting system comprises an electronic filing device 11, a photoelectric converting device 12, a display terminal 13, a processor 14, and a memory 15. These devices are connected by a bus 16.

The character region generating device 1, the character string region generation device 2, and the title extracting device 3 shown in FIG. 1 accord with the processor 14 according to the embodiment (shown in FIG. 2) of the present invention.

The electronic filing device 11 has a storing device such as a hard disk or an optical disc. The photoelectric converting device 12 is an optical reading device such as a scanner. The photoelectric converting device 12 converts a document, a picture, a photo, and so forth into image data. The resultant image data is stored in the electronic filing device 11 or the memory 15. The display terminal 13 is an operator terminal that has a display device and input devices such as a keyboard and a mouse.

The processor 14 extracts a particular region, such as a title, from a document image read from the photoelectric converting device 12 and stored in the memory 15, corresponding to a command that is input from the display terminal 13. Alternatively, the processor 14 extracts such a region from the electronic filing device 11. Thereafter, the processor 14 recognizes characters included in the extracted region. It should be noted that the character recognizing process may be performed using systems other than the title extracting system.

Figure 4:
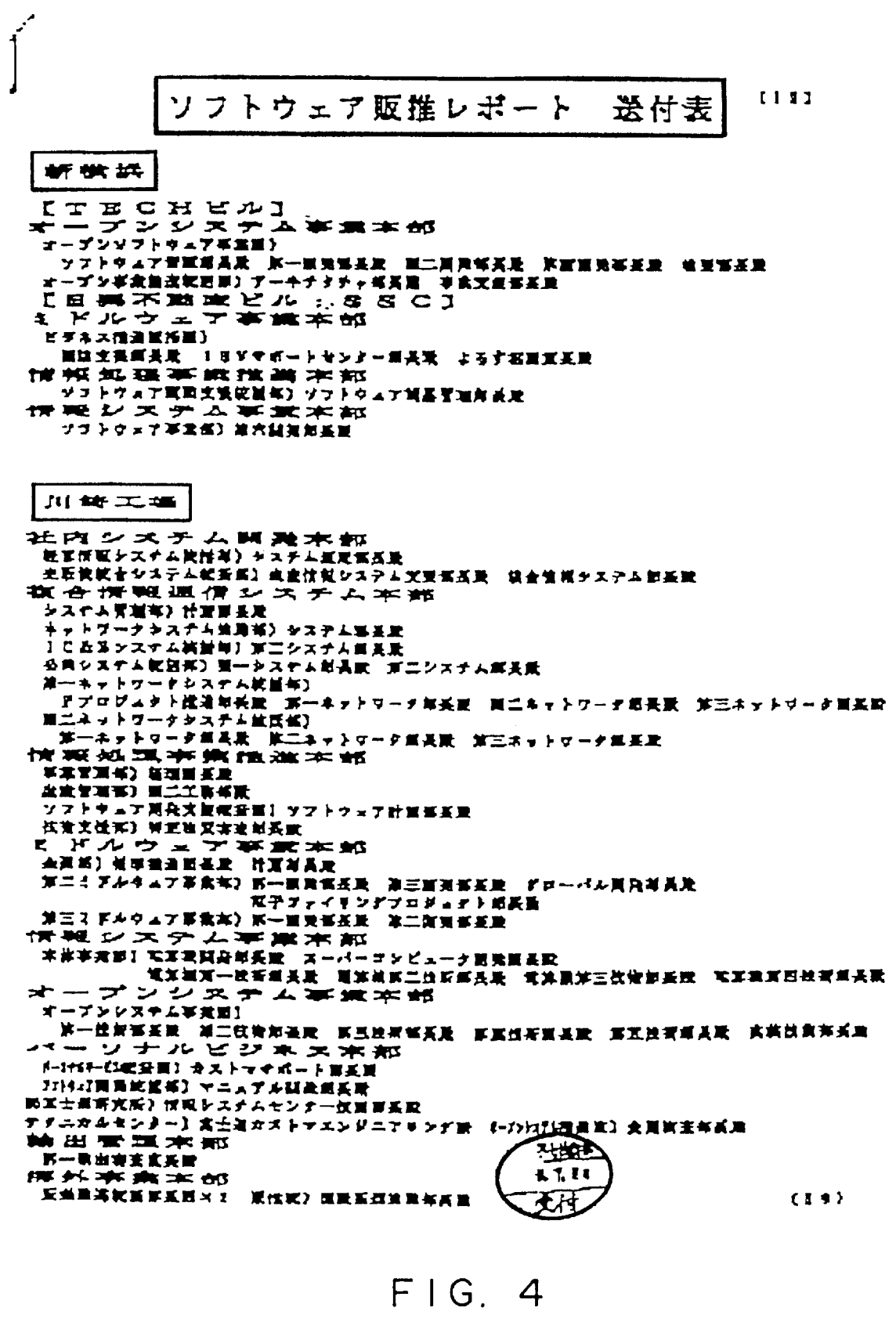
Figure 6:
FIG. 6 is a schematic diagram showing circumscribed rectangles of which a labeling process has been performed.
Figure 27:
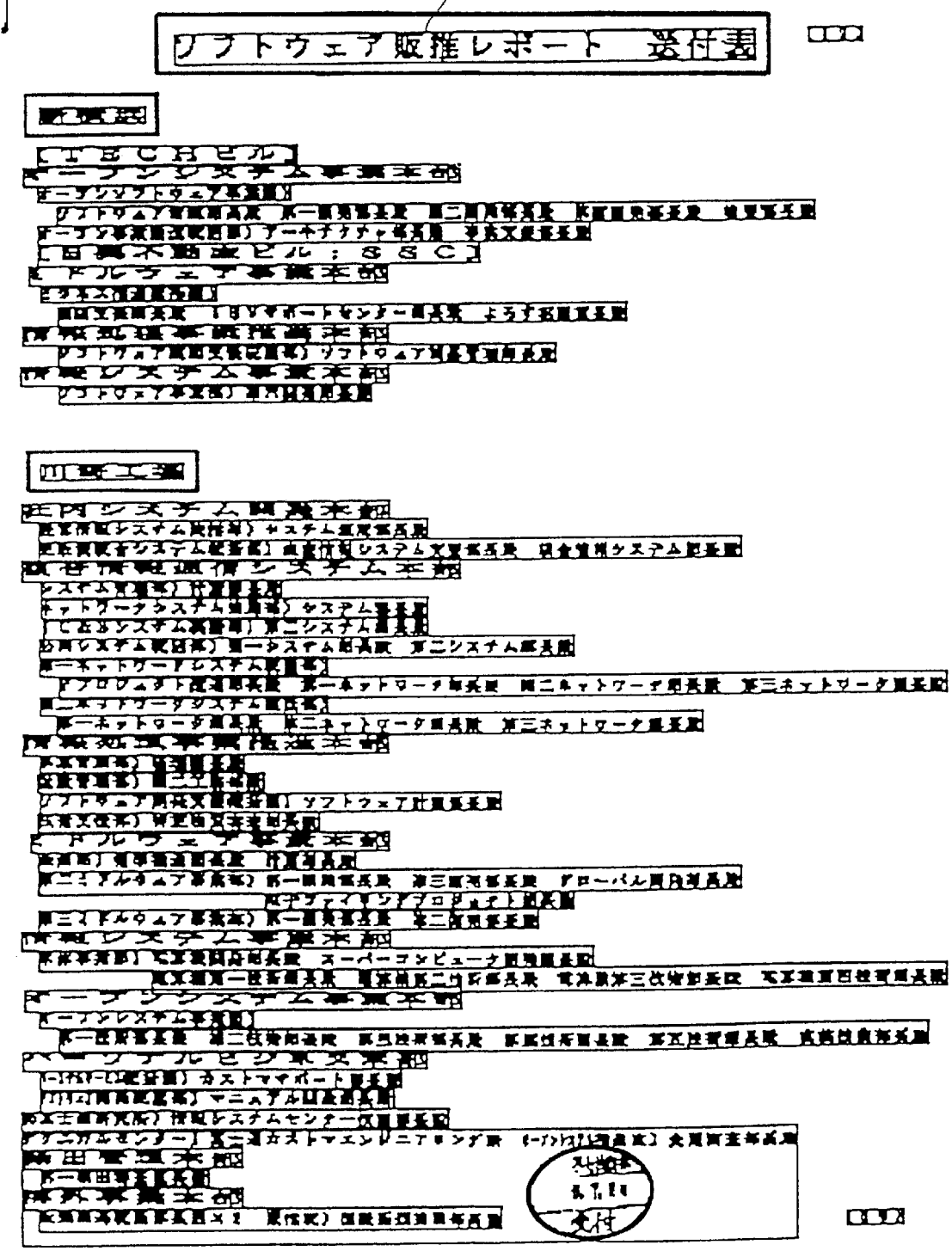
FIG. 27 is a schematic diagram showing unified character string rectangles.

The title extracting system shown in FIG. 2 obtains circumscribed rectangles of characters shown in FIG. 6 from a document image shown in FIG. 4, unifies the circumscribed rectangles of the characters, and obtains character string rectangles shown in FIG. 27. Thereafter, the title extracting system determines whether or not each character string rectangle is emphasized in the document.

Figure 14:
FIG. 14 is a schematic diagram showing frame rectangles.

For example, character strings that are surrounded by frame lines as shown in FIG. 14 are treated as emphasized character strings. The emphasized character string are likely to be titles. Thus, the emphasized character strings are extracted as title alternatives. In addition, character strings with an underline and that are large in size are treated as emphasized character strings and extracted as title alternatives. The position of a character string in the document and the relation of the positions of a current character string and adjacent character strings can be used as important information for distinguishing a title character string.

Thus, since character strings are selected as title alternatives depending on whether or not the character strings are emphasized and correspond to appearance information, a region with a high likelihood of being a title can be easily extracted from a document image. This extracting method is faster than the method for recognizing all characters in a document and extracting a title therefrom. In addition, the extracting method of the present invention is more generally applicable than the conventional method because the types of documents are not limited. Moreover, by using a combination of two or more types of appearance information, a title region can be more accurately distinguished than using the conventional method.

Figure 3:
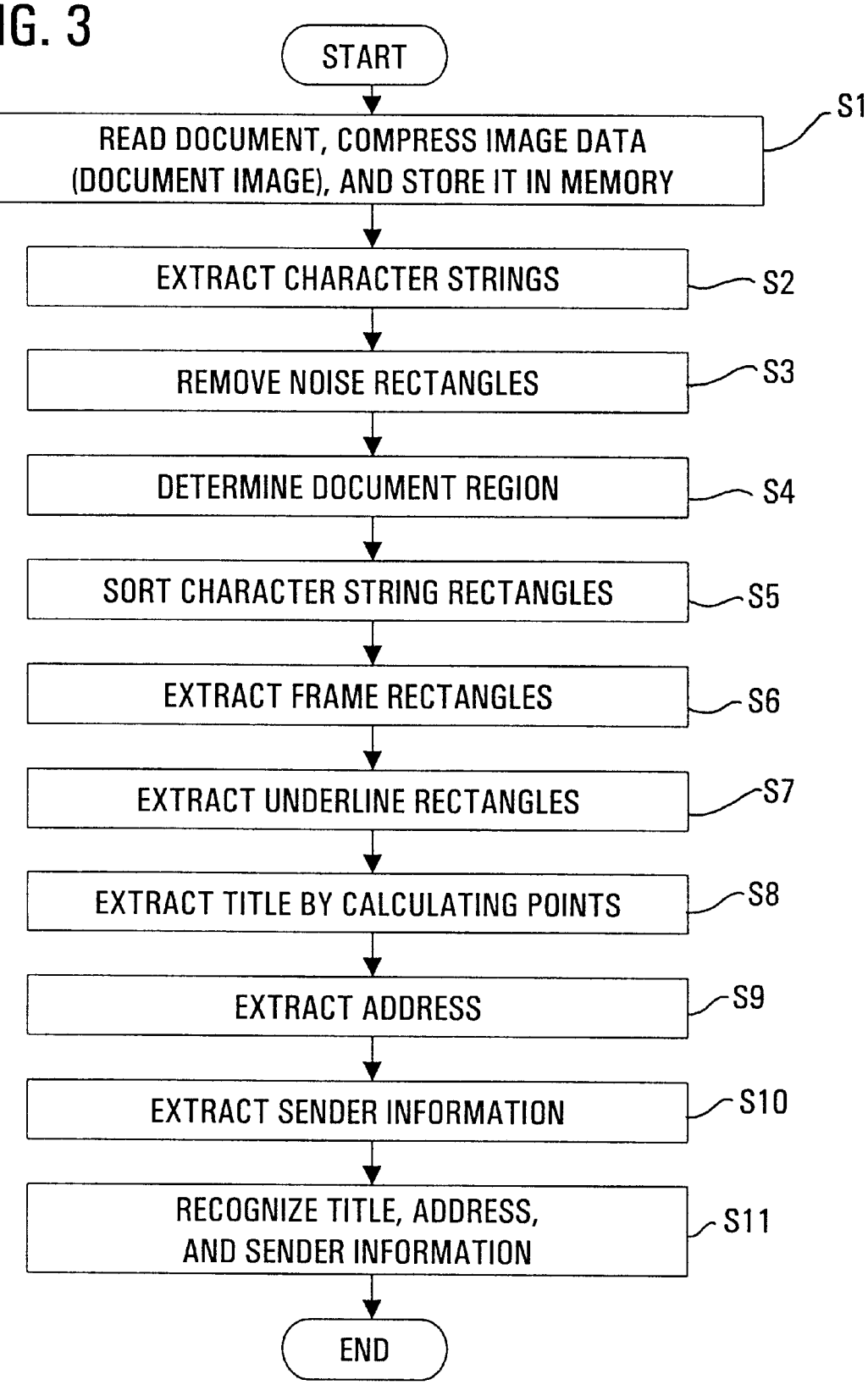
FIG. 3 is an operating flow chart showing a title extracting process for extracting a title from a document image.

FIG. 3 is a flow chart showing a title extracting process of the title extracting system shown in FIG. 2. As a precondition, the title extracting process shown in FIG. 3 is applied for a horizontally written document. However, this process can also be applied for vertically written documents. It should be noted that the relation between the heights and widths of character regions and character string regions in the vertically written documents is the reverse of that in the horizontally written documents.

In FIG. 3, when the process is started, a document is read by the photoelectric converting device 12 and stored as image data (document image) in the memory 15 (at step S1). At this point, to increase the process speed, the read original image is compressed to ⅛ in both the vertical and horizontal directions. The compressed image is stored in the memory 15.

When the image is compressed, a logic OR compressing method is used to prevent segments from being broken. In other words, even if one of each region composed of 8×8 pixels of the original image is a black pixel, the pixels of the current region are treated as black pixels. When no black pixel is present in the current region, the pixels of the current region are treated as white pixels.

Thereafter, character strings are extracted from the document image by the processor 14. Circumscribed rectangles of the character strings (namely, character string rectangles) are obtained. The coordinates of the circumscribed rectangles are stored in the memory 15 (at step S2). Thereafter, rectangles that have small widths and rectangles that have large heights are removed as noise rectangles from the stored character string rectangles (at step S3). In addition, rectangles that are not likely to be character strings are removed. Thus, a document region is determined (at step S4).

Thereafter, the remaining character string rectangles are sorted in the vertical direction (y coordinate) (at step S5). Rectangles including frames (namely, frame rectangles) are extracted. Character string rectangles in the frame rectangles are marked as framed rectangles (at step S6). In addition, rectangles including underlines are extracted. Character string rectangles disposed just above the underlines are marked as underline rectangles (at step S7).

Next, points of the likelihood of being a title are calculated. A character string rectangle with high points is extracted as a title (at step S8). Corresponding to the result, an address and a sender information of the document are extracted (at steps S9 and S10). Thereafter, the extracted title, the address and the sender information are recognized (at step S11). As a result, the title extracting process is completed.

Next, with a general business document, the title extracting process will be described in detail. A general business document includes regions such as "title", "address", "date of transmission", "section of sender", "transmission management number", and "document (including a table and/or a graph)". These regions are disposed in various combinations. In this embodiment, a title, an address, and a sender information (including date of transmission, section of sender, and transmission management number) are extracted from a document with such a format.

FIG. 4 is a schematic diagram showing an example of a document image read by the scanner 15. The document image shown in FIG. 4 relates to a cover sheet of software sales promotion report. The title of the document is ( 「ソフトウェア販推レポート、送付表」 ). Below the title, the address and the sender information are disposed. Character strings are extracted from the document image by the processor 14.

Figure 5:
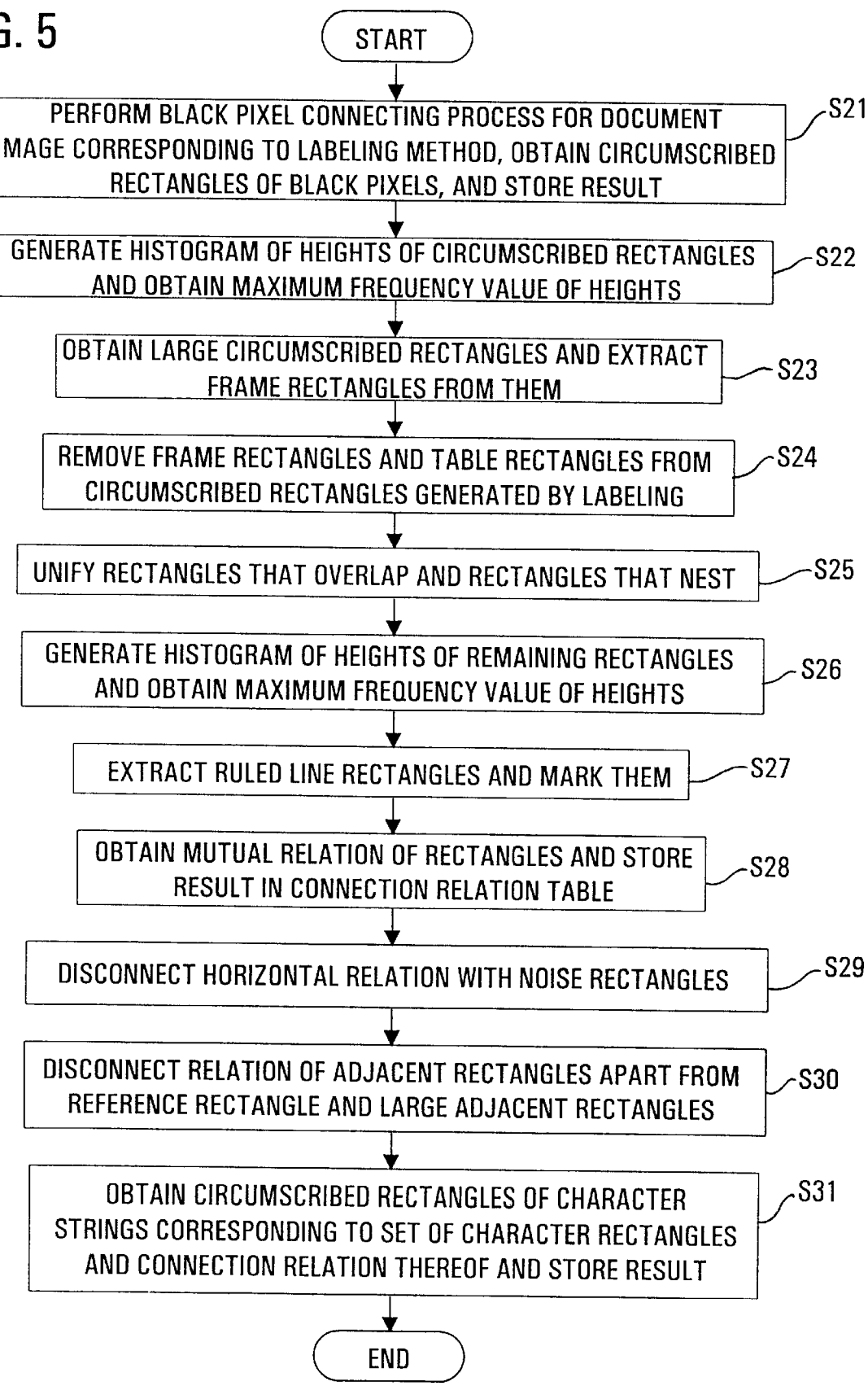
FIG. 5 is an operating flow chart showing a character string extracting process.

FIG. 5 is an operating flow chart showing the character string extracting process at step S2 of FIG. 3.

In FIG. 5, when the process is started, rectangles corresponding to characters are extracted from the document image. In other words, a black pixel connecting process is performed for the document image using a labeling method. Circumscribed rectangles of black pixels are obtained and the result is stored (at step S21).

In this embodiment, black pixels of the image that have been digitized and compressed are scanned corresponding to an eight-connection method. When there are connections of black pixels, the same label value is assigned to these black pixels. Thus, black pixel connected regions are generated and the circumscribed rectangles (character rectangles) are obtained. The scanning method corresponding to the eight-connection method is a method for scanning eight directions (up, down, left, right, upper left, upper right, lower left, and lower right) of each black pixel and determining whether or not there is an adjacent black pixel. The obtained circumscribed rectangles are stored in a file lbtbl. FIG. 6 shows the result of the labeling process for the document image shown in FIG. 4.

Figure 7:
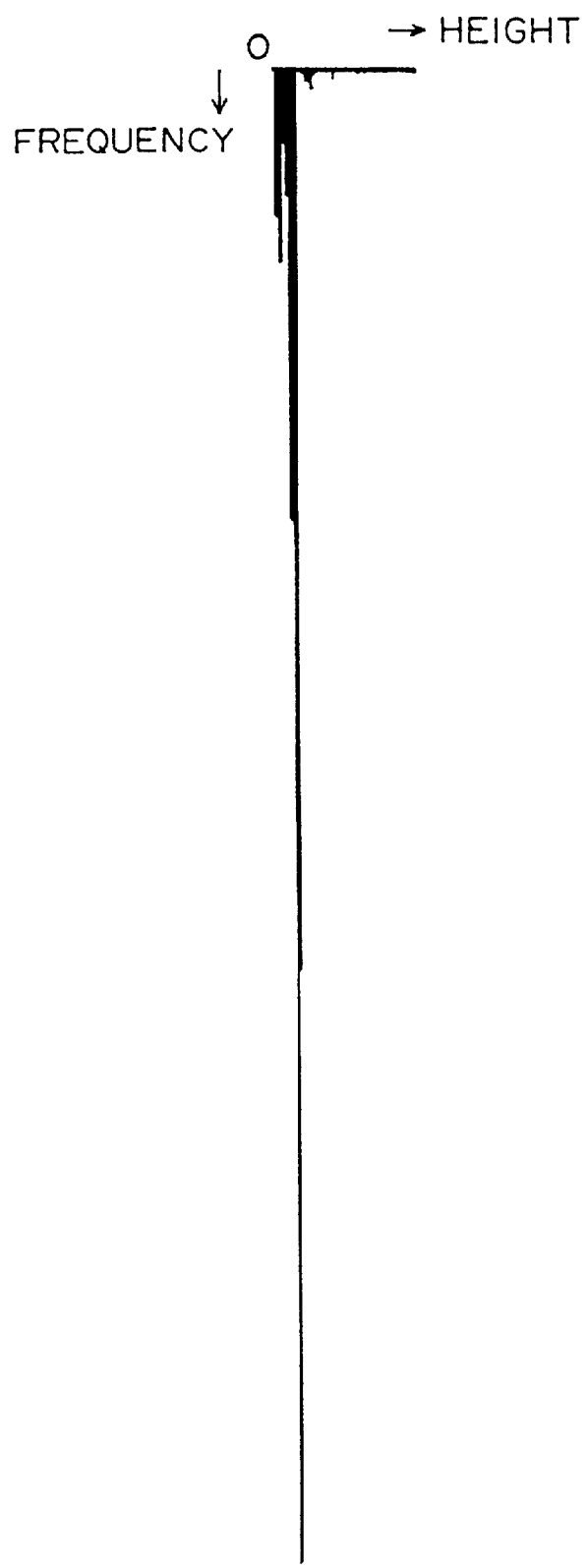
FIG. 7 is a schematic diagram showing a histogram of heights.

Next, a histogram representing the frequency distribution of the heights of the circumscribed rectangles 6 obtained corresponding to the labeling method is obtained. Thus, the maximum frequency value freq of the heights is obtained (at step S22). In this example, as shown in FIG. 7, a histogram of the heights of rectangles is generated with a set lbtbl of circumscribed rectangles 6 as the result of the labeling method. In FIG. 7, the horizontal axis represents the heights of the circumscribed rectangles 6, whereas the vertical axis represents the number of circumscribed rectangles of these heights (frequency values). The height of each circumscribed rectangle 6 is defined as multiples of the height of one pixel.

Next, the relation of frequency values and heights of rectangles with the frequency values is obtained and stored in a rectangle height table height. The rectangle height table height is checked from the frequency value 0. When the heights of rectangles change for 1 pixel or less, the frequency values of the heights of the rectangles continuously change, and the total of the frequency values that change is 9 or more, the largest values of continuous heights is defined as the maximum frequency value freq of the heights of the rectangles.

Figure 8:
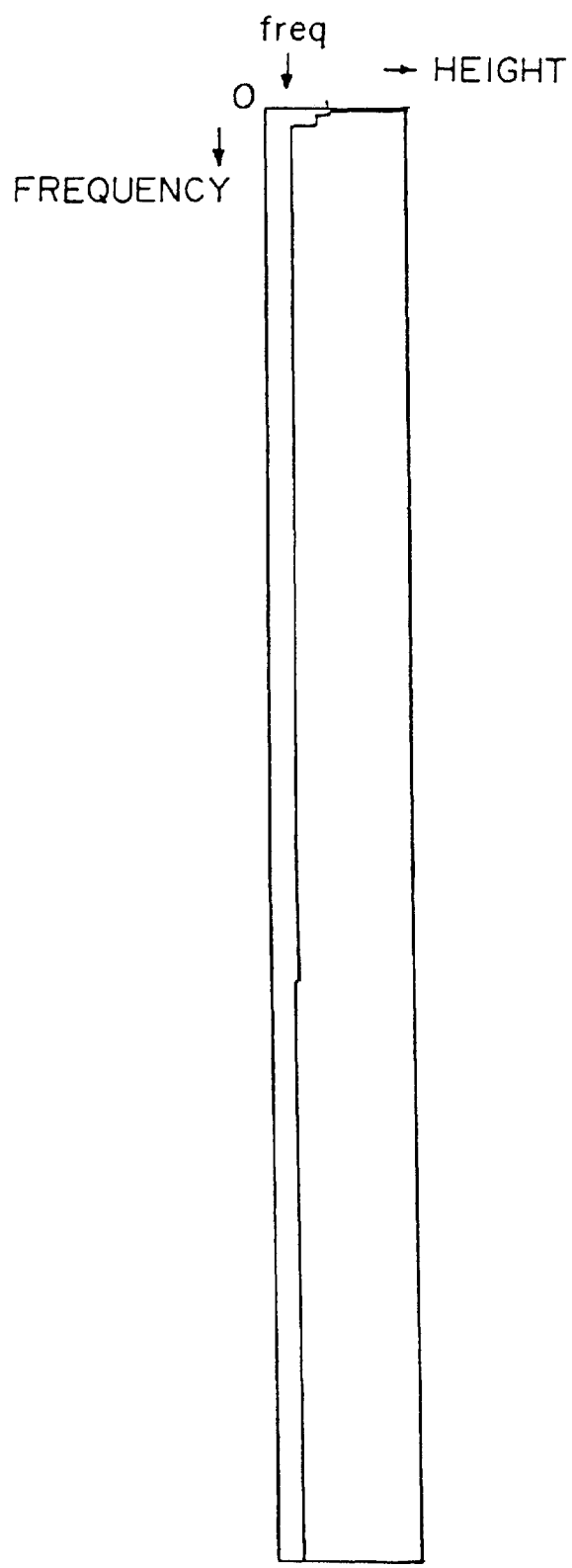
FIG. 8 is a schematic diagram showing a histogram for obtaining the maximum frequency value of heights.

FIG. 8 is a schematic diagram showing a histogram representing the contents of the rectangle height table height corresponding to the histogram shown in FIG. 7. In FIG. 8, the height at which a frequency value sharply changes is the maximum frequency value freq. Thus, when the maximum frequency value freq is obtained in such a manner, the influence of noise smaller than one character can be prevented.

Figure 9:
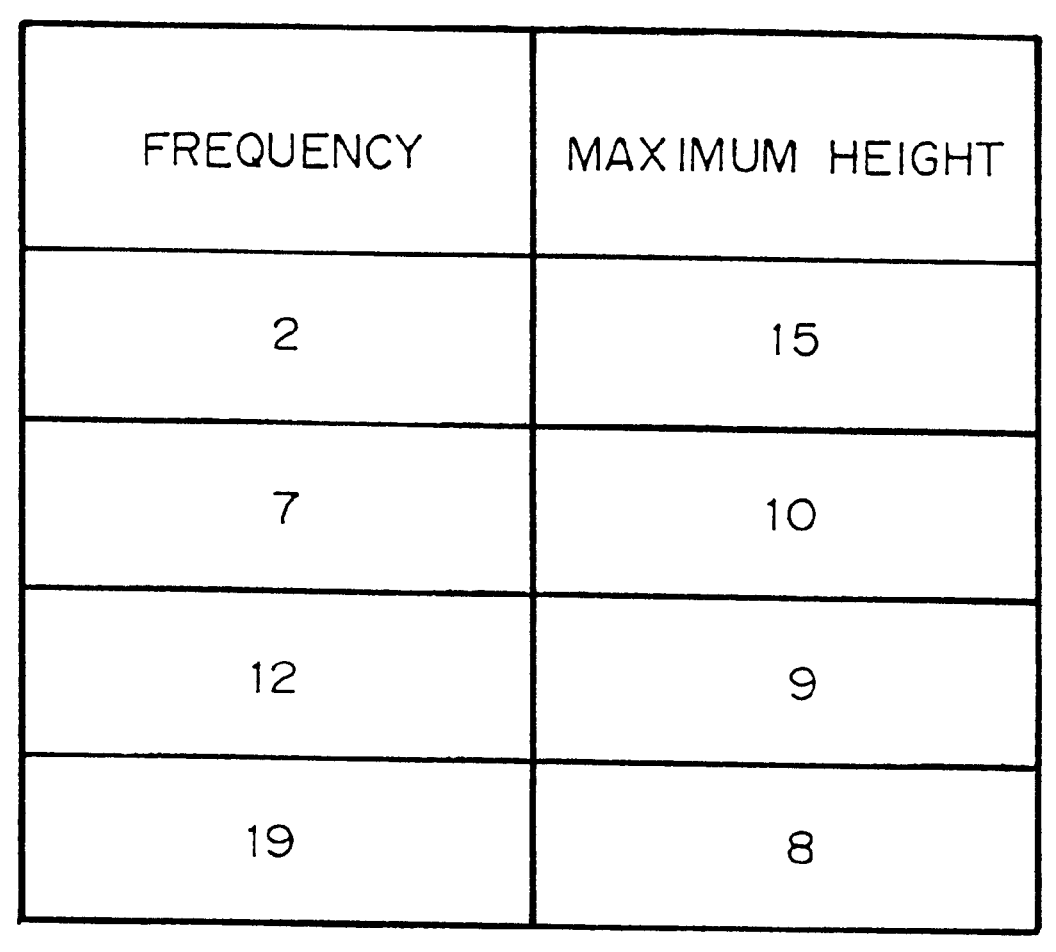
Figure 10:
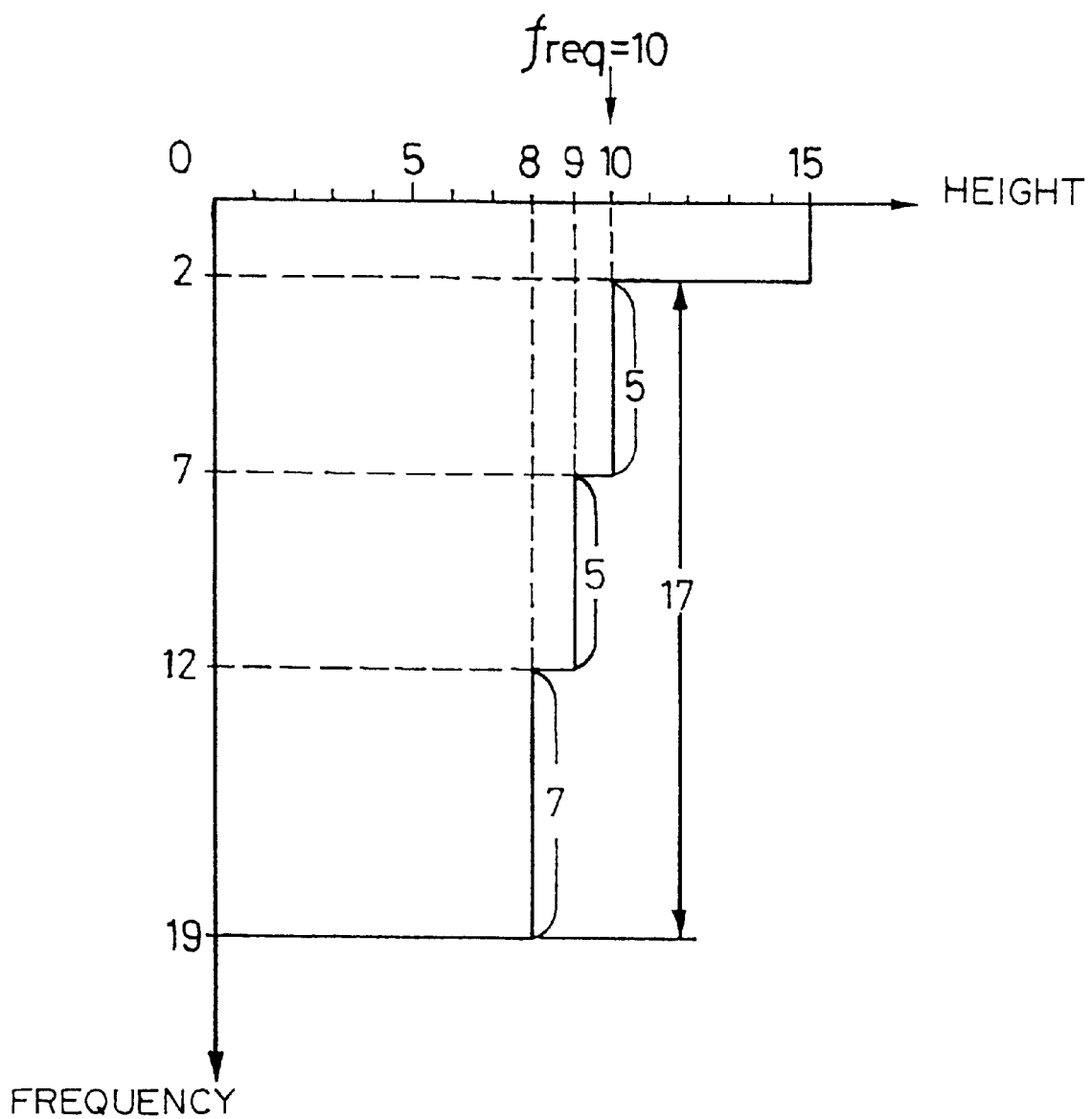
FIG. 10 is a schematic diagram showing a histogram corresponding to the content of the rectangle height table.

FIG. 9 is a table showing a simple example of the rectangle height table height. In FIG. 9, the rectangle height table height stores pairs of frequency values and maximum heights of rectangles. FIG. 10 is a schematic diagram showing a histogram of the contents of the rectangle height table height. The histogram shown in FIG. 10 is checked in the order of lower frequency values (namely, in the order of larger height values). Thus, at the positions of the heights 10, 9, and 8, the frequency values change for 5, 5, and 7, respectively. The difference of the heights of continuous rectangles is 1. The total of the frequency values that change is 17. Thus, at the heights 10, 9, and 8, since the total of the frequency values that change is 9 or more, the first height 10 of these rectangles is defined as the maximum frequency value freq.

Thereafter, to remove circumscribed rectangles of frame lines and tables, a threshold for determining large rectangles is assigned. Rectangles that are larger than the threshold are extracted. Rectangles including frame lines are extracted from the large rectangles and stored (at step S23).

In this example, the height of a rectangle that is larger than the maximum frequency value freq and that has the highest frequency value is defined as a large rectangle threshold th_large. Rectangles that are larger than the threshold th_large are extracted and stored in a file box.

Figure 11:
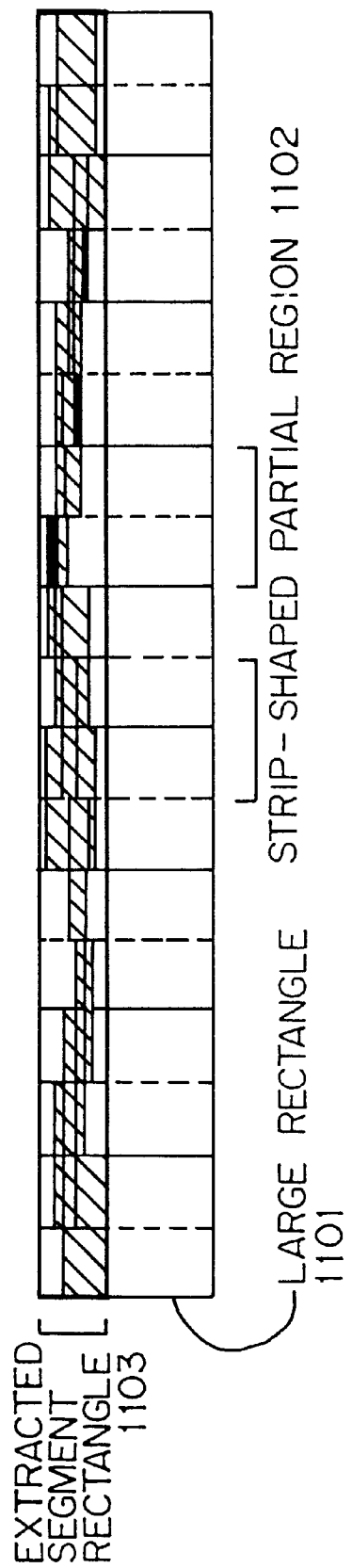
FIG. 11 is a schematic diagram showing segment rectangles extracted from a large rectangle.

Next, to extract frame lines from large rectangles in the file box, the inside of each large rectangle 1101 is vertically divided as shown in FIG. 11, so as to form strip-shaped partial regions 1102 that overlap. A horizontal linear region that has the height of one pixel and has a predetermined black pixel occupying ratio is obtained in each strip-shaped partial region 1102. When two or more linear regions are vertically connected, they are unified as a partial segment.

Figure 12:
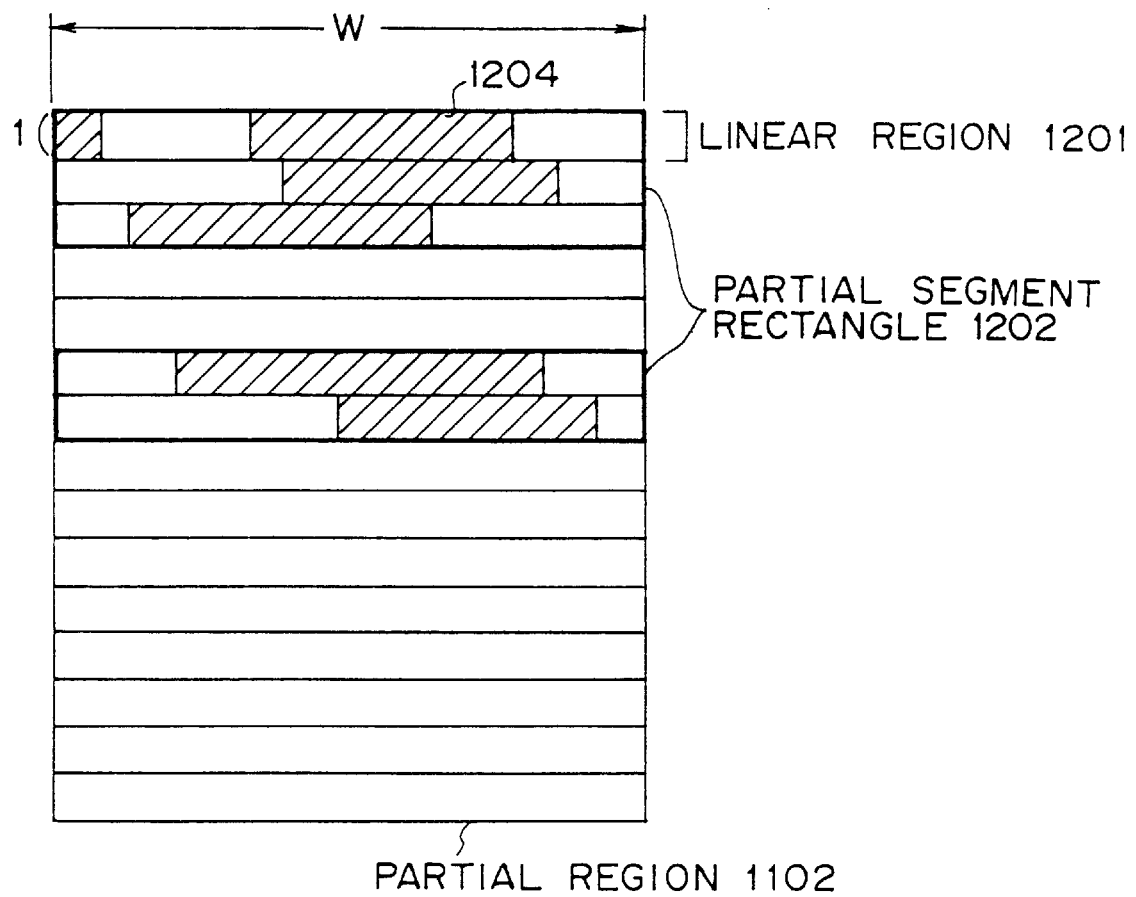
FIG. 12 is a schematic diagram showing partial segment rectangles.
Figure 13A:
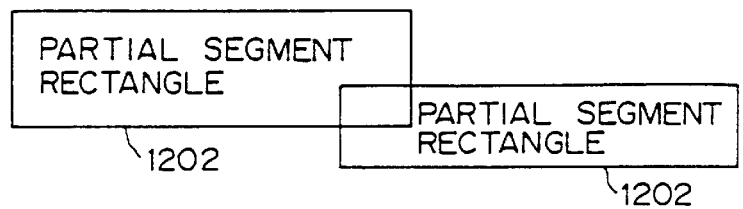
FIGS. 13A, 13B, and 13C are schematic diagrams showing connected partial segment rectangles.
Figure 13B:
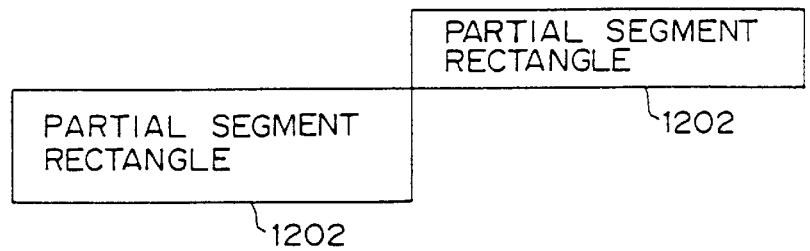
Figure 13C:
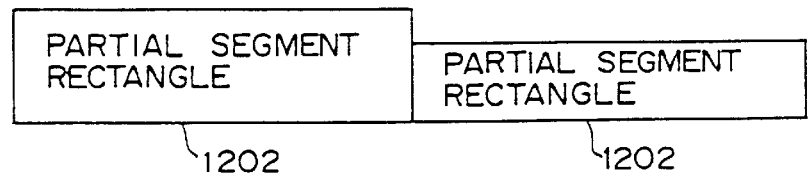

FIG. 12 is a schematic diagram showing a strip-shaped partial region of the large rectangle shown in FIG. 11. In FIG. 12, the partial region with a width W is divided into linear regions 1201 with a height 1. Linear regions 1201 that include a predetermined occupying ratio of black pixels 1204 and that are vertically adjoin are unified as one partial segment rectangle 1202. As shown in FIG. 12, two or more partial segment rectangles 1202 may be present in one partial region 1102. When partial segment rectangles that horizontally adjoin have the eight-connection relation, they are treated as one segment. FIGS. 13A, 13B, and 13C each show two partial segment rectangles 1202 that have the eight-connection relation. In the case shown in FIG. 11, segment rectangles 1103 horizontally disposed are extracted from an upper edge portion of a large rectangle.

When a segment rectangle 1103 has an aspect ratio that is larger than a predetermined ratio of the aspect ratio of the current large rectangle, the segment rectangle 1103 is extracted as a large segment rectangle. When the difference between the length of both the edges of the large segment rectangle and the length of both the edges of the large rectangle is in a predetermined range and the difference between the length of the y coordinate of the large segment rectangle and the length of the y coordinate of the large rectangle is smaller than a predetermined ratio of the width of the rectangle, the segment rectangle 1103 is treated as a horizontally ruled line disposed above or below the large rectangle.

A histogram of the frequency distribution in which black pixels in the vicinity of the left edge and the right edge of the large rectangle are vertically projected is obtained. When the height of the peak is larger than the predetermined ratio of the height of the rectangle, it is determined that vertically ruled lines are present at the left edge and the right edge. At this point, the large rectangle is treated as a circumscribed rectangle (frame rectangle) of frame lines. The same process is performed for each large rectangle in the file box. Only the frame rectangles are stored in the file box. FIG. 14 shows detected frame rectangles 1401, 1402, and 1403.

Thereafter, rectangles that have been treated as frame rectangles and tables (these rectangles are referred to as table rectangles) are removed from the set lbtbl of the circumscribed rectangles obtained by the labeling method (at step S24). In this example, frame rectangles stored in the file box are removed from the set lbtb1. Next, rectangles that accord with one of the following conditions are assumed to be table rectangles. These table rectangles are removed from the set lbtb1.

(a) When a rectangle is larger than ⅓ of the height of the entire document image, (b) When a rectangle has a height larger than three times the maximum frequency value freq and has an aspect ratio that is smaller than 0.4, and (c) When a rectangle has a height larger than three times the maximum frequency value freq and a width larger than ⅓ of the width of the entire document image.

The resultant rectangle set is treated as newtbl. Circumscribed rectangles of character strings are extracted from the rectangle set newtbl.

Rectangles in the rectangle set newtbl include rectangles that overlap and rectangles that nest. These rectangles are preferably unified so as to clarify the relation of the positions of rectangles and effectively extract character strings. Thus, the rectangles that overlap and the rectangles that nest are removed from the rectangle set newtbl and the result is stored in a file lbtbl2 (at step S25).

Figure 15:
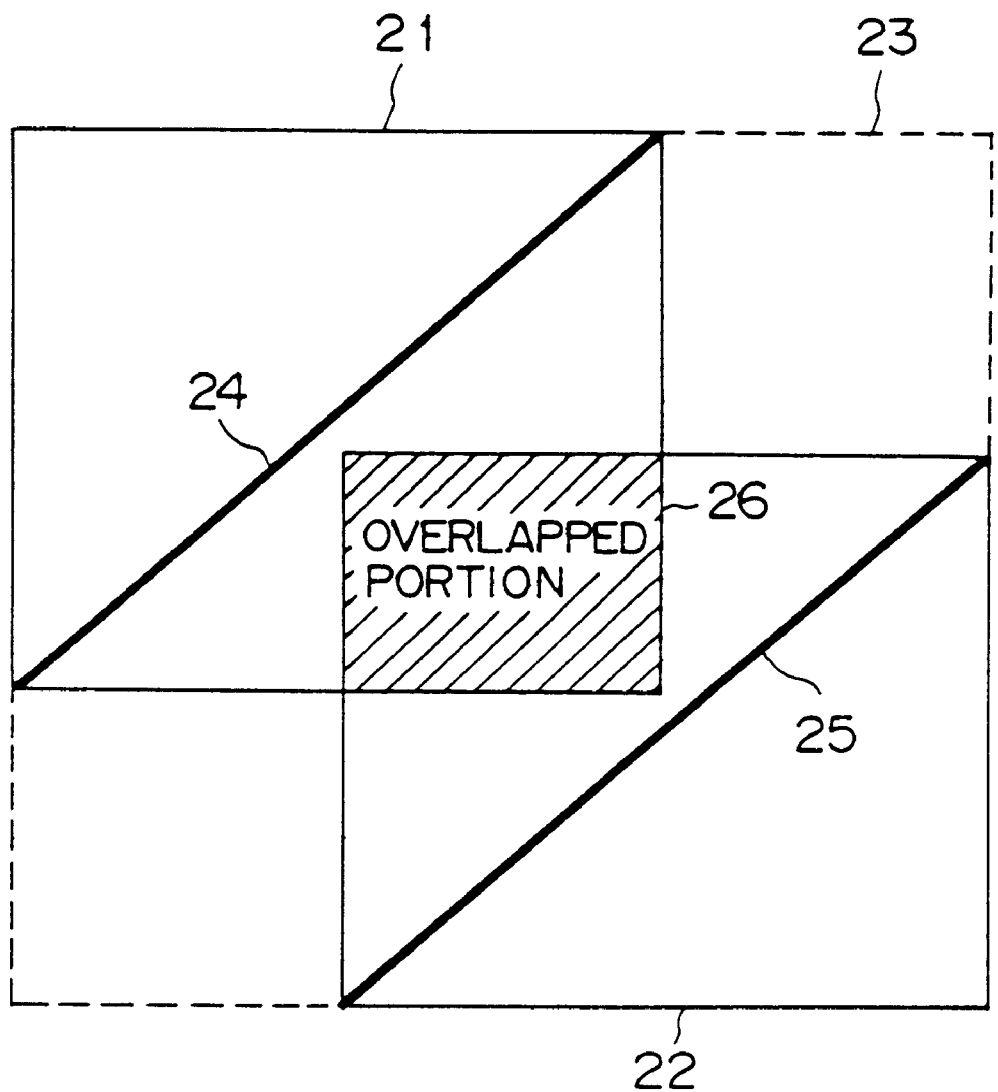
FIG. 15 is a schematic diagram showing circumscribed rectangles that overlap.
Figure 16:
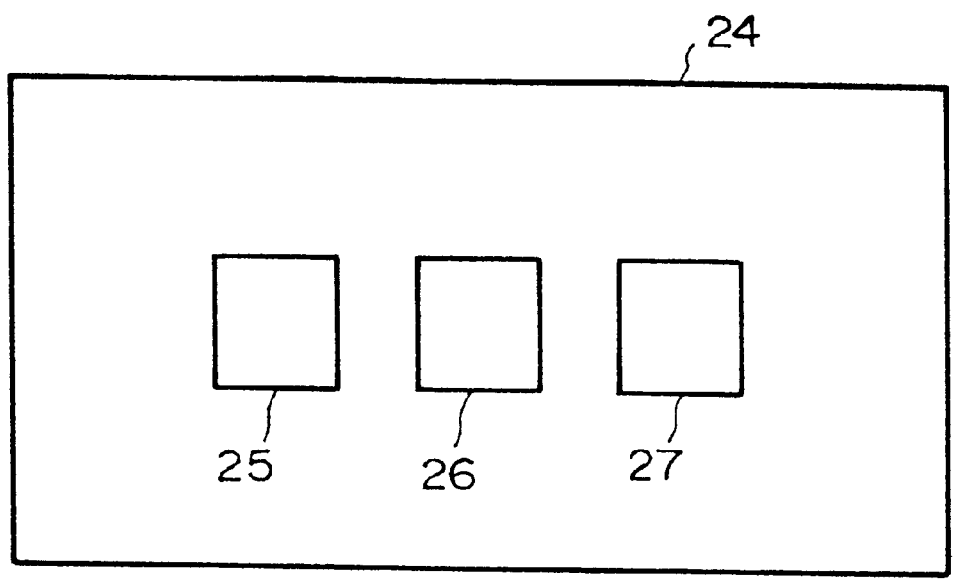
FIG. 16 is a schematic diagram showing circumscribed rectangles that nest.

FIG. 15 is a schematic diagram showing an example of two rectangles that overlap. In FIG. 15, rectangles 21 and 22 represent circumscribed rectangles of inclined segments 24 and 25. The rectangles 21 and 22 overlap at a hatched portion 26. In this case, the rectangles 21 and 22 are unified as one rectangle 23. In this case, the nested portion is removed. FIG. 16 is a schematic diagram showing a plurality of rectangles that nest. In FIG. 16, rectangles 25, 26, and 27 are completely enclosed in a rectangle 24. In other words, the rectangles 25, 26, and 27 are nested in the rectangle 24. In this case, the nested rectangles 25, 26, and 27 are removed. Thus, only the rectangle 24 is left.

There are two methods for searching rectangles that overlap or nest with another rectangle in the rectangle set newtbl.

(d) With reference to one rectangle, the remaining rectangles are searched.

(e) An isosceles triangle that has a vertex on the center line of a side of each rectangle is formed in the vertical or horizontal direction. A histogram of isosceles triangles that are formed in such a manner is generated. In addition, a set (group) of rectangles that form peaks of frequency values is recorded. Rectangles of which the distance between adjacent peaks on the histogram is smaller than a predetermined threshold are unified. At the same time, the relevant rectangle sets are also unified. The set of rectangles is defined as one search range. When a rectangle in the set is used as a reference, the set is searched. Alternatively, the overlapped portion of the sets of rectangles in the vertical and horizontal direction may be defined as a search range.

Figure 17:
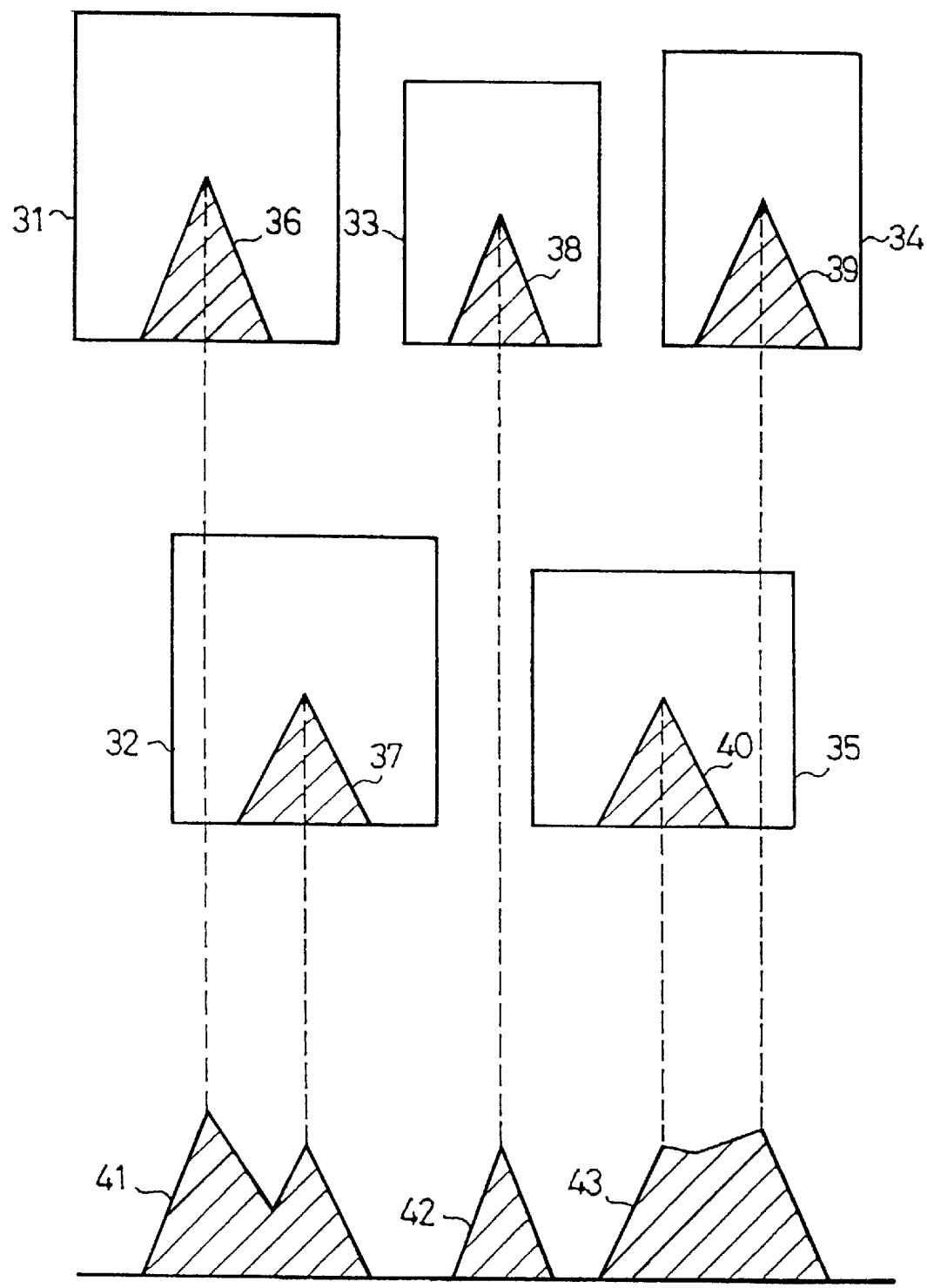
FIG. 17 is a schematic diagram showing a histogram of isosceles triangles.

FIG. 17 is a schematic diagram showing an example of a histogram of isosceles triangles used in the method (e). In FIG. 17, isosceles triangles 36 and 37 of rectangles 31 and 32 are projected to a peak 41. An isosceles triangle 38 of a rectangle 33 is projected to a peak 42. Isosceles triangles 39 and 40 of rectangles 34 and 35 are projected to a peak 43. For example, when these peaks 41, 42, and 43 are present within a predetermined distance, the rectangles 31, 32, 33, 34, and 35 are unified as one rectangle set. Alternatively, as with the rectangles 31 and 32, when isosceles triangles of rectangles are projected to one peak, these rectangles may be unified as one rectangle set.

Figure 18:
FIG. 18 is a schematic diagram showing circumscribed rectangles of which overlap and nest have been removed.

According to the method (e), since rectangles in a limited range are searched, the process can be more quickly performed than the method (d). FIG. 18 is a schematic diagram showing circumscribed rectangles 1801 of which rectangles that overlap and rectangles that nest have been removed.

Next, after rectangles that overlap and rectangles that nest have been removed, a histogram of the heights of rectangles in the file lbtbl2 is obtained and a maximum frequency value freq2 thereof is obtained (at step S26). The method for generating the histogram of the heights and the method for obtaining the maximum frequency value freq2 are the same as the methods at step 22.

Thereafter, ruled line rectangles are extracted from the file lbtbl2 and then marked (at step S27). In this example, a rectangle whose height is smaller than ½ of the maximum frequency value freq, whose width is larger than three times the maximum frequency value freq, and whose aspect ratio is smaller than 0.1, is marked as a ruled line rectangle in the file 1btb12.

Next, a mutual relation of rectangles in the file lbtbl2 is obtained so as to find a plurality of characters included in one character string and then stored in a connection relation table connect (at step S28). In this example, rectangles that are closest to a particular rectangle are searched from the file lbtbl2 in the upper, lower, left, and right directions. The result is stored in the connection relation table connect. The mutual relation of rectangles represents pointers that move from a reference rectangle to rectangles in the upper, lower, left, and right directions, pointers that move in the reverse directions thereof, and the distance from the reference rectangle to each of the rectangles in the upper, lower, left, and right directions.

Figure 19:
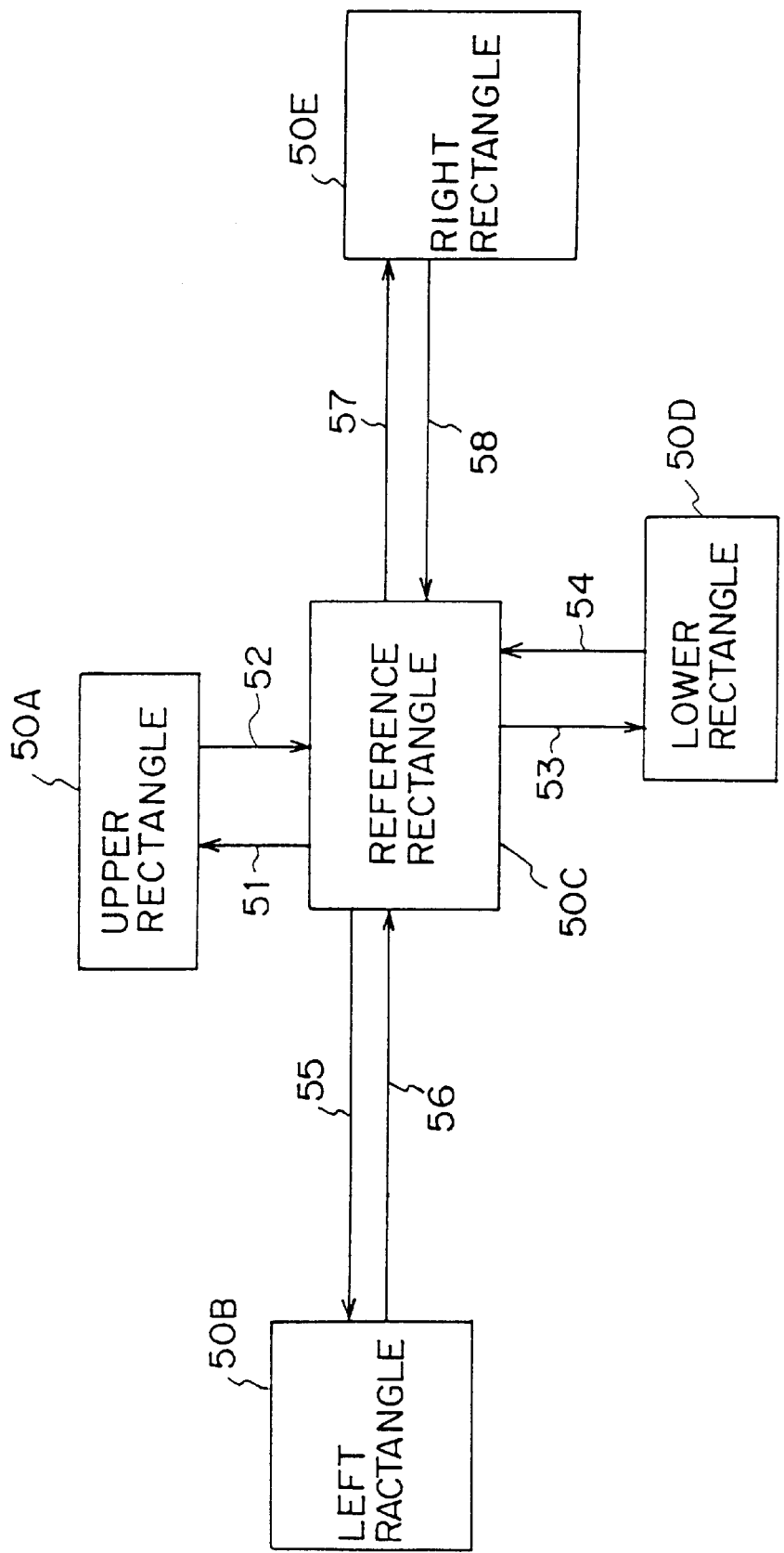
FIG. 19 is a schematic diagram showing the relation of connections of rectangles.

FIG. 19 is a schematic diagram showing a connection relation of rectangles in the case that one rectangle is assigned as a reference rectangle 50c. In FIG. 19, an upper rectangle 50a represents a rectangle that upwardly adjoins the reference rectangle 50c. The upper rectangle 50a is connected to the reference rectangle 50c with pointers 51 and 52. A lower rectangle 50d represents a rectangle that downwardly adjoins the reference rectangle 50c. The lower rectangle 50d is connected to the reference rectangle 50c with pointers 53 and 54. A left rectangle 50b represents a rectangle that leftwardly adjoins the reference rectangle 50c. The left rectangle 50b is connected to the reference rectangle 50c with pointers 55 and 56. A right rectangle 50e represents a rectangle that rightwardly adjoins the reference rectangle 50c. The right rectangle 50e is connected to the reference rectangle 50c with pointers 57 and 58.

FIG. 20 is a schematic diagram showing a structure of the connection relation table connect that stores such pointers. The connection relation table shown in FIG. 20 stores a label value of the reference rectangle 50c, a pointer to the upper rectangle 50a, a pointer from the upper rectangle 50a, a pointer to the lower rectangle 50d, a pointer from the lower rectangle 50d, a pointer to the left rectangle 50b, a pointer from the left rectangle 50b, a pointer to the right rectangle 50e, and a pointer from the right rectangle 50e. In addition, the connection relation table connect also stores the distance from the reference rectangle 50c to each of the rectangles 50a, 50b, 50d, and 50e that upwardly, downwardly, leftwardly, and rightwardly adjoin the reference rectangle 50c.

The connection relation table connect is generated in such a manner that the connection relations of frame rectangles are disconnected on four sides. Thus, character strings that extrude from frame lines are prevented from being extracted. When a rectangle is closest to the reference rectangle 50c, the two methods (d) and (e) that were used at step S25 can be also used.

Thereafter, noise rectangles due to a reading error of the scanner are distinguished and the horizontal relation with other rectangles is disconnected (at step S29). In this case, a rectangle whose height and width is smaller than ¼ of the maximum frequency value freq2 or whose aspect ratio is smaller than 0.1 or larger than 10, and whose distance between upper and lower rectangles is larger than a predetermined value, is determined as a noise rectangle. The horizontal pointers between these rectangles are removed so as to disconnect the connection relation.

Next, when the distance between adjacent rectangles is large or when the difference of the sizes of adjacent rectangles is large, the connection relation of these rectangle is disconnected (at step S30). In this example, when the reference rectangle accords with one of the following conditions, the connection relation with an adjacent rectangle is disconnected.

(f) When the distance between the reference rectangle and the adjacent rectangle is larger than three times the maximum frequency value freq2, (g) When the reference rectangle or an adjacent rectangle thereto has a size that is three times larger than the maximum frequency value freq2, and (h) When an adjacent rectangle is larger than twice the maximum frequency value freq2.

Next, a character string is extracted from the character rectangle set lbtbl2 and the connection relation table connect and a circumscribed rectangle of the character string (character string rectangle) is stored (at step S31). In this example, a rectangle that does not have a pointer that rightwardly moves (namely, the rectangle does not leftwardly adjoin another rectangle) is treated as a start rectangle. Next, an identification number (for example, a label value) of the start rectangle is successively transmitted to other rectangles disposed on the right of the start rectangle. A plurality of rectangles with the same identification number are unified. The circumscribed rectangle of the unified rectangle is defined as a character string rectangle. At this point, the identification number of the start rectangle is stored in a file line_lab as an identification number (label number) of the extracted character string. When there is no rectangle to be connected on the right, the transmission of the identification number is stopped.

Figure 21:
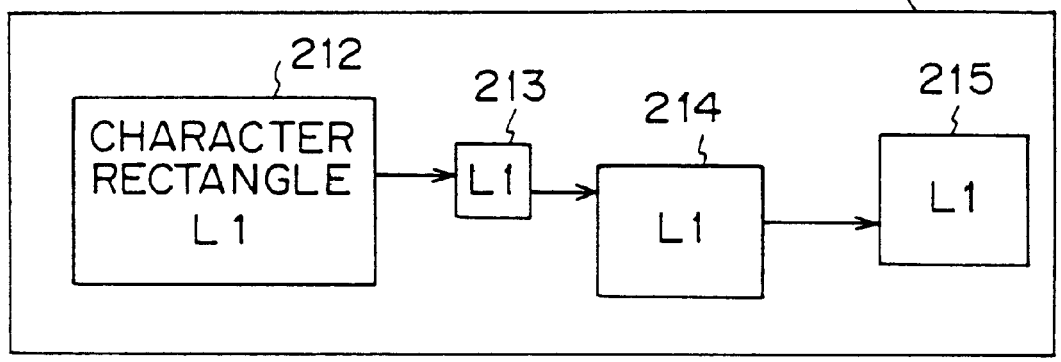
FIG. 21 is a schematic diagram showing a character string rectangle.

FIG. 21 is a schematic diagram showing an example of a character string rectangle 211 extracted in the above-described manner. In FIG. 21, four character rectangles 212 to 215 that are horizontally disposed are assigned a label value L1 and unified as one character string rectangle 211. In this example, the label value of the character string rectangle 211 is also L1.

When the identification number of a rectangle on the right of the reference rectangle accords with a character string identification number in the file line_lab, the character string identification number of the rectangle on the right side is substituted with the transmitted identification number of the set of the rectangles. The old character string identification number is removed from the file line_lab.

Thereafter, a rectangle that does not have a pointer that rightwardly moves is detected as a reference rectangle. When a rectangle is disposed on the left of the reference rectangle, the left side rectangle has an identification number of a character string that has been extracted. Thus, this identification number is transmitted to rectangles disposed on the right of the reference rectangles as long as there is a rectangle disposed on the right of the reference rectangle. The old identification number is substituted with the transmitted identification number. The old identification number is removed from the file line_lab.

Figure 22:
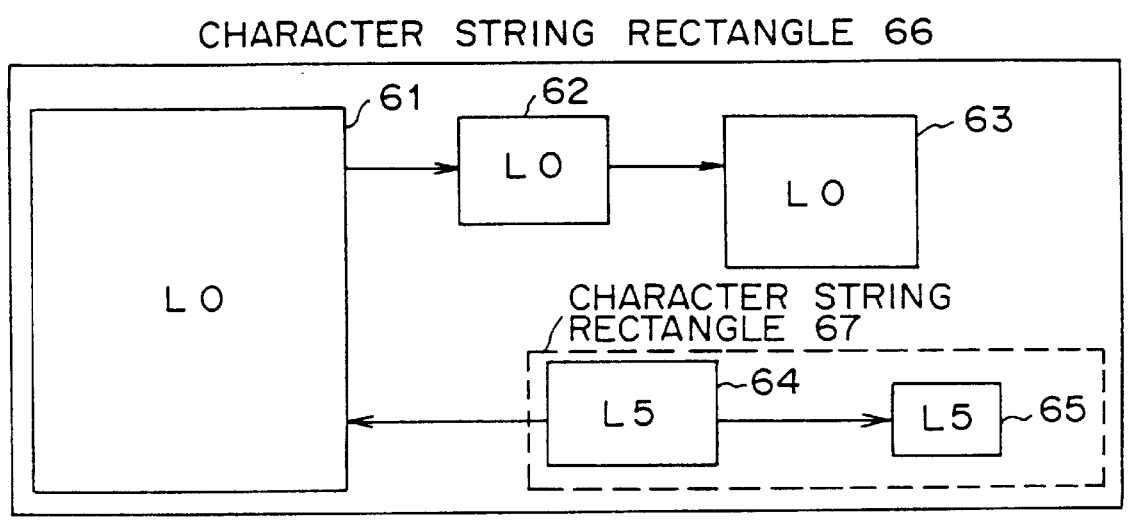
FIG. 22 is a schematic diagram showing a character string rectangle extracting process.

For example, as shown in FIG. 22, it is assumed that a character string rectangle 67 is present in another character string rectangle 66. When a rectangle 64 that does not have a pointer that leftwardly moves is assigned as a reference rectangle, a rectangle 61 is disposed on the left of the reference rectangle 64. Since the rectangle 61 has a label value L0, the label value L0 is transmitted to the rectangles 64 and 65. The label value of the rectangles 64 and 65 is substituted with the label value L0. Thus, the label value L5 is removed from the file line_lab. Consequently, the rectangles 61, 62, 63, 64, and 65 are unified as one character string rectangle 66.

In the above-described process, each rectangle that has been identified as the same character string has the same character string identification number. All the rectangles are scanned and the left edge, the right edge, the upper edge, and the lower edge are obtained from the coordinates of a plurality of rectangles with the same character string identification number. They are stored as coordinates that structure the periphery of the character string rectangle in a file line. In addition, the number of character strings being extracted is stored in a file maxline.

Figure 23:
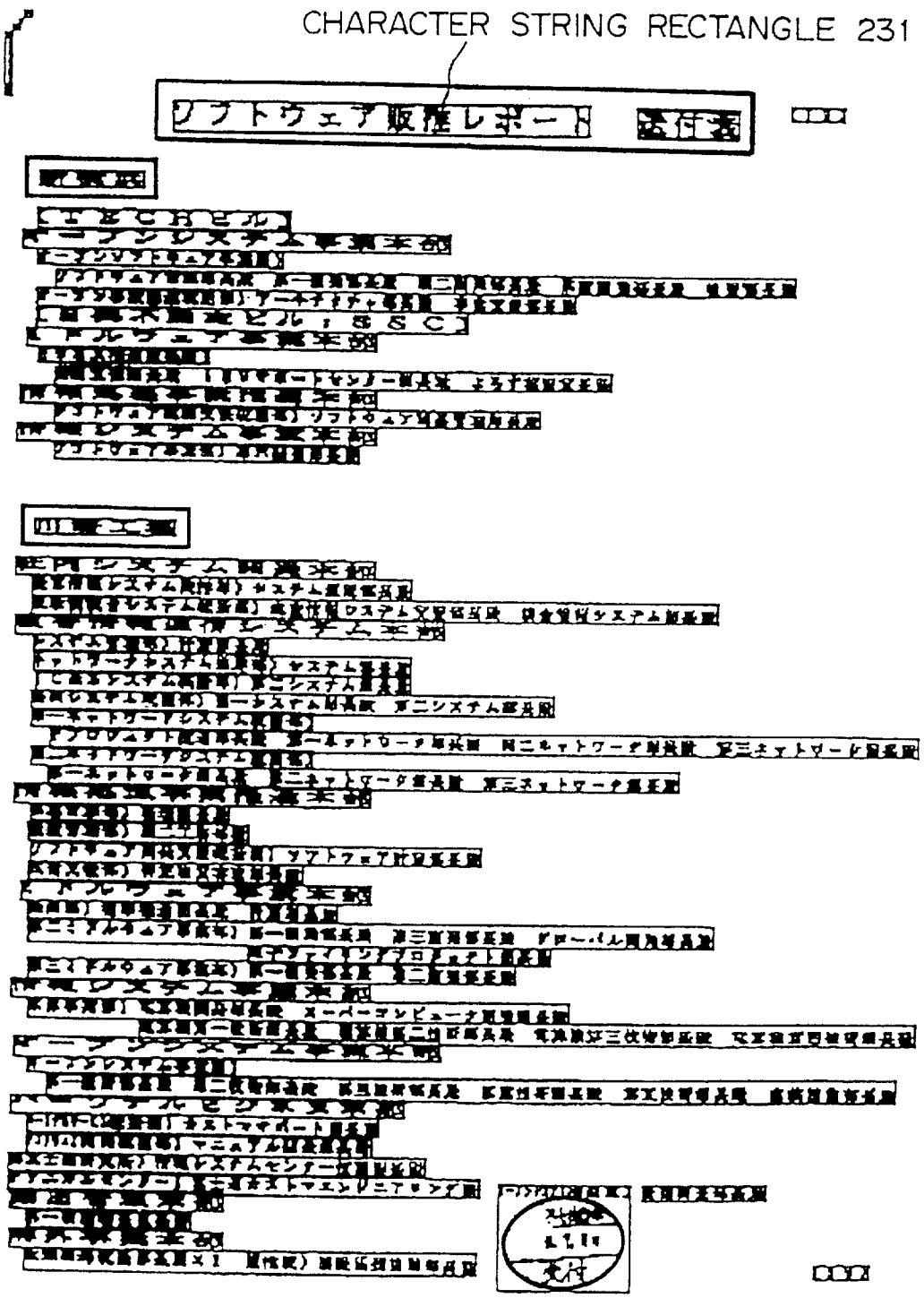
FIG. 23 is a schematic diagram showing extracted character string rectangles.

As a result, the character string extracting process is completed. FIG. 23 is a schematic diagram showing a character string rectangle 231 extracted in the above-described manner.

Thereafter, the character string rectangle forming process that accords with steps S3 to S7 of FIG. 3 is performed by the processor 14. In the character string rectangle forming process, attributes such as an underline attribute, a frame attribute, and a ruled line attribute of each character string rectangle 231 are extracted and recorded. In a point calculating process that will be described later, high points are assigned to a character string rectangle that has an underline attribute and a frame attribute. On the other hand, low points are assigned to a character string rectangle 231 that has a ruled line attribute.

Figure 24:
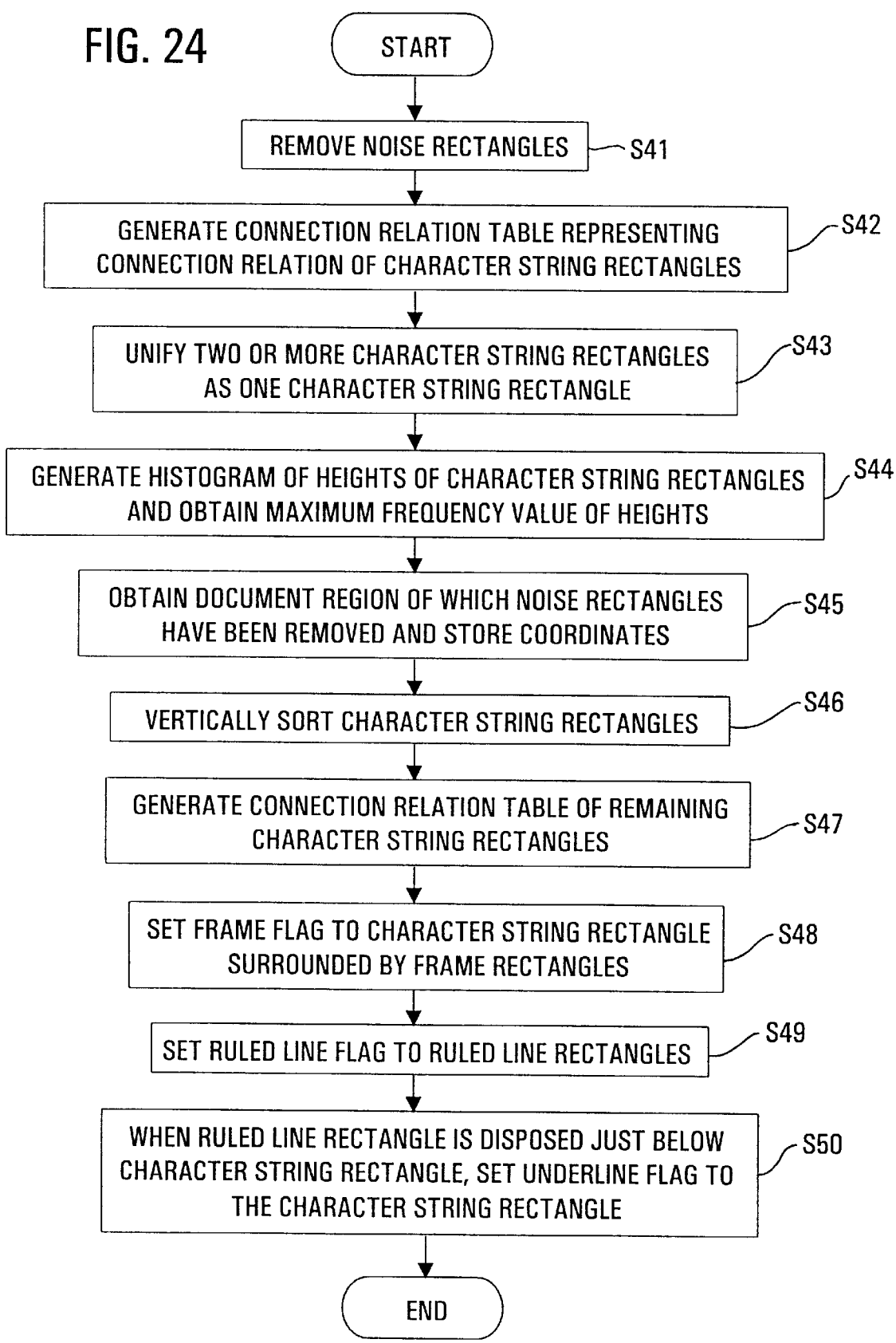
FIG. 24 is an operating flow chart showing a character string rectangle forming process.

FIG. 24 is an operating flow chart showing the character string rectangle forming process.

Figure 25:
FIG. 25 is a schematic diagram showing character string rectangles of which noise have been removed.
Figure 26A:
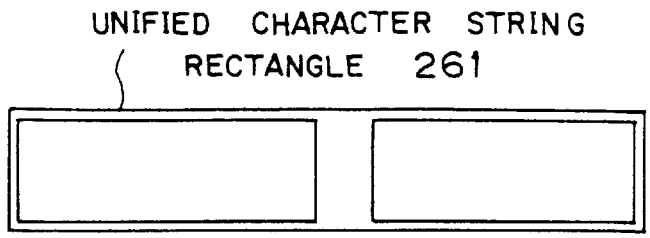
FIGS. 26A, 26B, 26C, and 26D are schematic diagrams showing a character string rectangle unifying process.
Figure 26B:
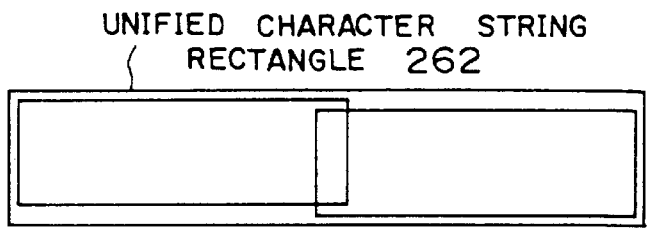
Figure 26C:
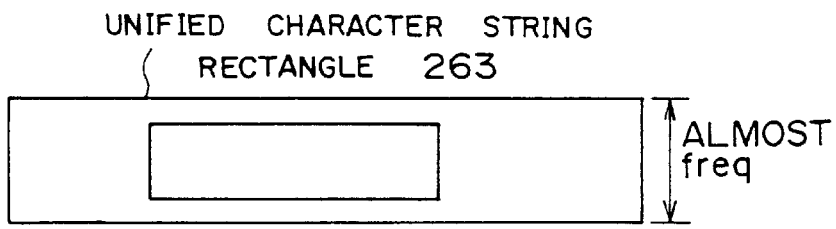
Figure 26D:
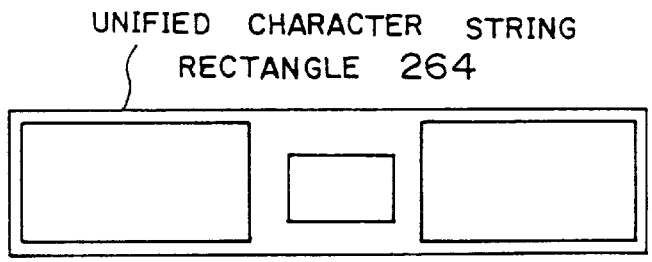

In FIG. 24, when the process is started, character string rectangles with small widths and character string rectangles with large heights are removed as noise character string rectangles and the result is stored (at step S41). In this example, a character string rectangle whose width is smaller than ¼ of the maximum frequency value freq and a character string rectangle whose height is smaller than ¼ of the maximum frequency value freq and whose aspect ratio is larger than 0.1, are treated as noise character string rectangles. These noise character string rectangles are removed and the remaining character string rectangles are stored in the file line2. FIG. 25 is a schematic diagram showing character string rectangles 251 and 252 from which noise character string rectangles have been removed.

Next, a connection relation table str_conn that represents the connection relation of character string rectangles in the file line2 is created (at step S42). This connection relation is the same as that of the character rectangles shown in FIG. 19. The connection relation table str_conn has the same structure as the connection relation table shown in FIG. 20.

Next, two or more character strings that satisfy predetermined conditions, such as the position relation and heights, are unified and a long character string is obtained. The result is stored (at step S43). In this example, when one of the following conditions is satisfied, character string rectangles are unified as a large character string rectangle.

(i) When the distance between character string rectangles is smaller than the height thereof, (j) When character string rectangles horizontally overlap and the heights of the character string rectangles are almost the same, (k) When a character string rectangle has a height that is almost equal to the maximum frequency value freq and the character string rectangle is completely included in another character string rectangle, (l) When the y coordinate values of rectangles disposed at both edges of three successive character string rectangles are almost the same and only the y coordinate value of the middle character string rectangle is different from the y coordinate values of the other character string rectangles.

FIGS. 26A, 26B, 26C, and 26D are schematic diagrams showing examples of character string rectangles 261 to 264 that have been unified in the case that the methods (i), (j), (k), and (l) are satisfied. The character string rectangle forming process is repeated until the number of character string rectangles does not vary. The remaining character string rectangles are stored in a file line3. FIG. 27 is a schematic diagram showing a result in which character string rectangles have been unified. When the schematic diagrams shown in FIG. 25 and FIG. 27 are compared, it is clear that character string rectangles (「ソフトウェア販推レポート」) 251 and (「送付表」) 252 are unified into a character string rectangle (「ソフトウェア販推レポート 送付表」) 271.

Next, a histogram of the heights of character strings is generated so as to obtain the maximum frequency value str_freq of the heights of the character strings (at step S44). In this example, the histogram of the heights of the character string rectangles is generated in the same manner as that shown in FIG. 7. With the histogram, a height that is larger than the maximum frequency value freq2 and that is the maximum frequency value is obtained. The resultant value is defined as the maximum frequency value of the heights of the character string rectangles (this value is denoted by str_freq). When a plurality of heights that accord with the maximum frequency value are obtained, a height that is closer to the maximum frequency value freq2 is used. In the histogram of the heights of the character string rectangles, there are two positions at which the frequency value is 0 on both sides of the maximum frequency value str_freq. The smaller height at the position just before the frequency value becomes 0 is denoted by st_h, whereas the larger height thereof is denoted by en_h.

Figure 28:
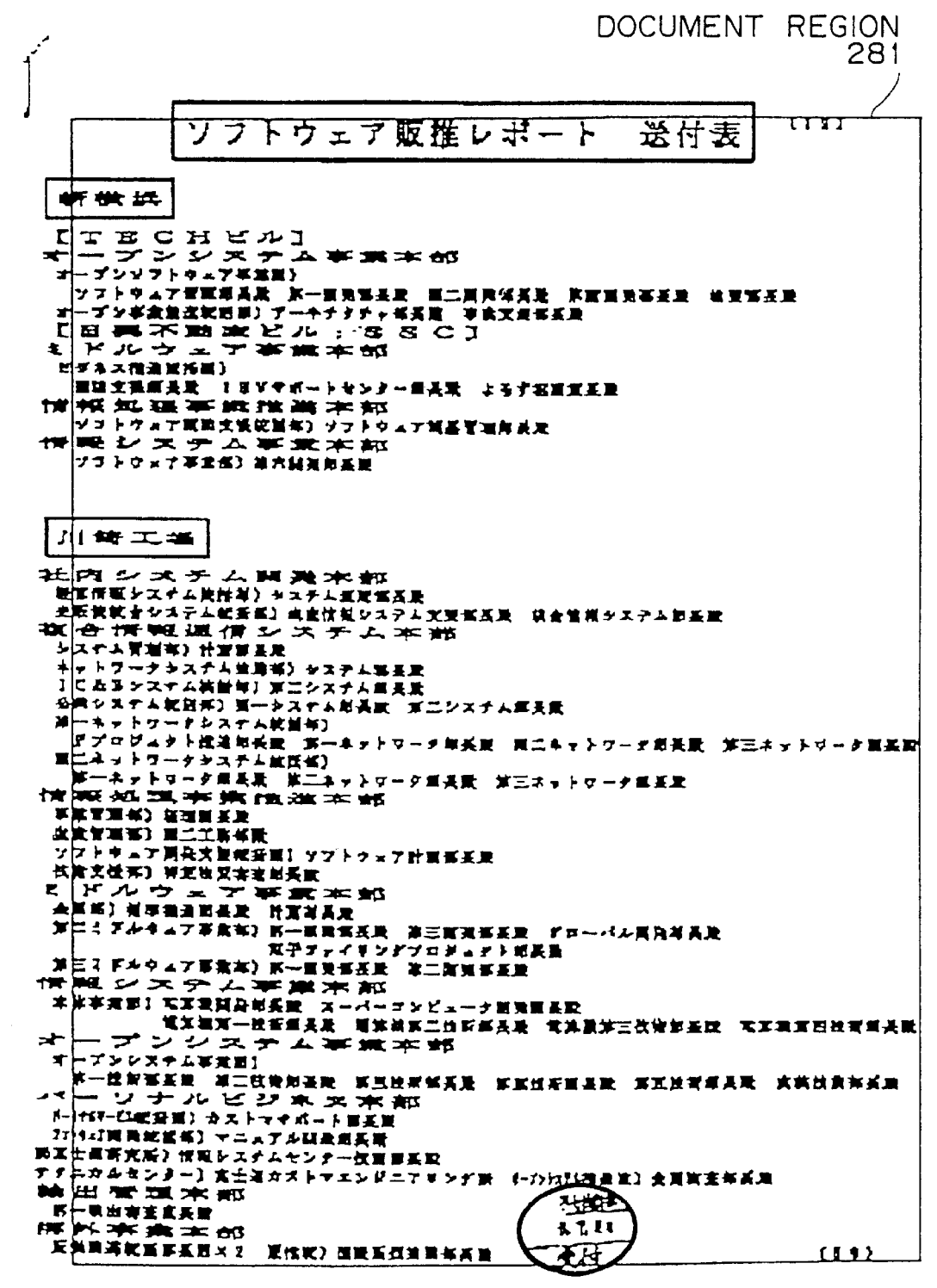

Thereafter, a document region in which noise character string rectangles are removed is obtained. The coordinates of the region are stored (at step S45). In this example, even if character string rectangles partially extend to a predetermined region at the left edge and the right edge of the document image, these character string rectangles are excluded. A region in which a character string rectangle is present, whose height is st_h or larger and en_h or smaller, whose width is the maximum frequency value str_freq or larger, and whose aspect ratio is smaller than 0.5, is defined as a document region. The x coordinate at the left edge of the region, the y coordinate at the upper edge thereof, the x coordinate at the right edge thereof, and the y coordinate at the lower edge thereof are stored as st_x, st_y, en_x, and en_y, respectively. When an image of one page of a B5 size book is read in an A4 size image region, predetermined regions at the left edge and the right edge are ignored so as to remove character string rectangles of adjacent pages of the book as noise character string rectangles. FIG. 28 is a schematic diagram showing a document region 281 obtained in the above-described manner.

Next, character string rectangles in the file line3 are vertically sorted (on the Y coordinate) (at step S46).

Thereafter, a connection relation table str_conn2 that represents a connection relation of character string rectangles in the file line3 is generated (at step S47). At this point, character string rectangles should not protrude from a frame rectangle.

Next, it is determined whether or not each character string rectangle is completely included in the frame rectangle. When a current character string rectangle is included in the frame rectangle, a frame flag is set to the character string rectangle (at step S48). In this example, when each character string rectangle in the file line3 is completely implicated in the frame rectangle stored in the file box, the character string rectangle is treated as a framed rectangle. The frame flag is set to the character string rectangle. As conditions of frame rectangles, (1) all character string rectangles in the frame rectangle are treated as framed rectangles.

(2) When the coordinate value of a frame rectangle is not spaced apart from the coordinate value of a character string rectangle therein by a threshold, the character string rectangle is treated as a framed rectangle.

Next, when a character string rectangle in the file line3 is treated as a ruled line rectangle, a ruled line flag is set to the ruled line rectangle (at step S49). In this example, a character string rectangle whose size is ½ or smaller of the maximum frequency value str_freq and whose aspect ratio is smaller than 0.8 or larger than 12.5, is treated as a ruled line rectangle. In this case, the ruled line flag is set to the character string rectangle.

Next, character string rectangles in the file line3 are checked. When there is a ruled line rectangle below a character string rectangle (this ruled line rectangle is referred to as an underline rectangle) or when an underline is present in a character string rectangle, an underline flag is set to the character string rectangle (at step S50). In this example, in the conditions that a character string rectangle is disposed above a ruled line rectangle, that the distance therebetween is smaller than the maximum frequency value str_freq, and that the difference between the lengths at the left edge and the right edge of the above described character string rectangle and the ruled line rectangle is the maximum frequency value str_freq or less, the underline flag is set to the above described character string rectangle. FIG. 29 is a schematic diagram showing an example of an underline rectangle. In FIG. 29, since a flat ruled line rectangle 72 of which the ruled line flag has been set is disposed below a character string rectangle 71, this ruled line rectangle 72 is treated as an underline rectangle. Thus, the underline flag is set to the character string rectangle 71.

In addition, a segment is extracted from a character string rectangle whose width or height is ½ or larger than the maximum frequency value str_freq, by a method that will be described later. In the conditions that a segment extracted from a character string rectangle is present in a predetermined pixel position measured from the left edge and the right edge of the character string rectangle, that the height of the segment is WAKUTHIN times (for example, 0.3 times) or less of the height of the rectangle, that the y coordinate of the bottom of the segment is lower than a position that is higher than the y coordinate of the top of the rectangle by ½ of the maximum frequency value str_freq, that the difference between the y coordinate of the top of the segment and the y coordinate of the top of the rectangle is larger than (maximum frequency value str_freq−2), and that the difference between the y coordinate of the bottom of the segment and the y coordinate of the bottom of the rectangle is smaller than the difference between the y coordinate of the top of the segment and the y coordinate of the top of the rectangle, this segment is treated as an underline in a character string rectangle. The underline flag is set to the character string rectangle.

Figure 30:
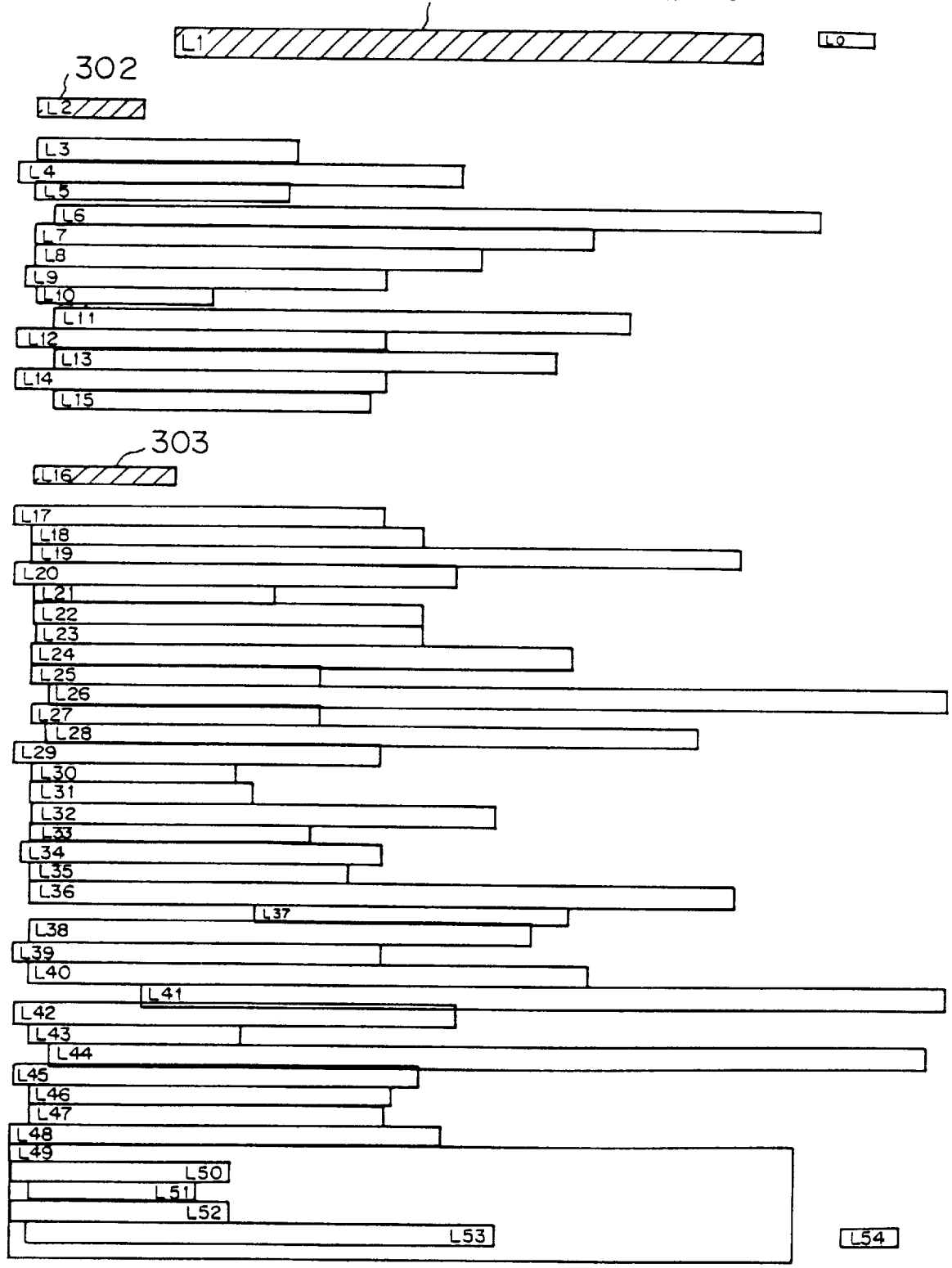
FIG. 30 is a schematic diagram showing character string rectangles of which a frame attribute, a ruled line attribute, and an underline attribute have been checked.

As a result, the character string forming process is completed. FIG. 30 is a schematic diagram showing character string rectangles to which the frame flag, the ruled line flag, and the underline flag have been set. In FIG. 30, L0 to L54 represent label values assigned to relevant character string rectangles. In these character string rectangles, character string rectangles 301, 302, and 303 with label values L1, L2, and L16 are framed rectangles.

Figure 31:
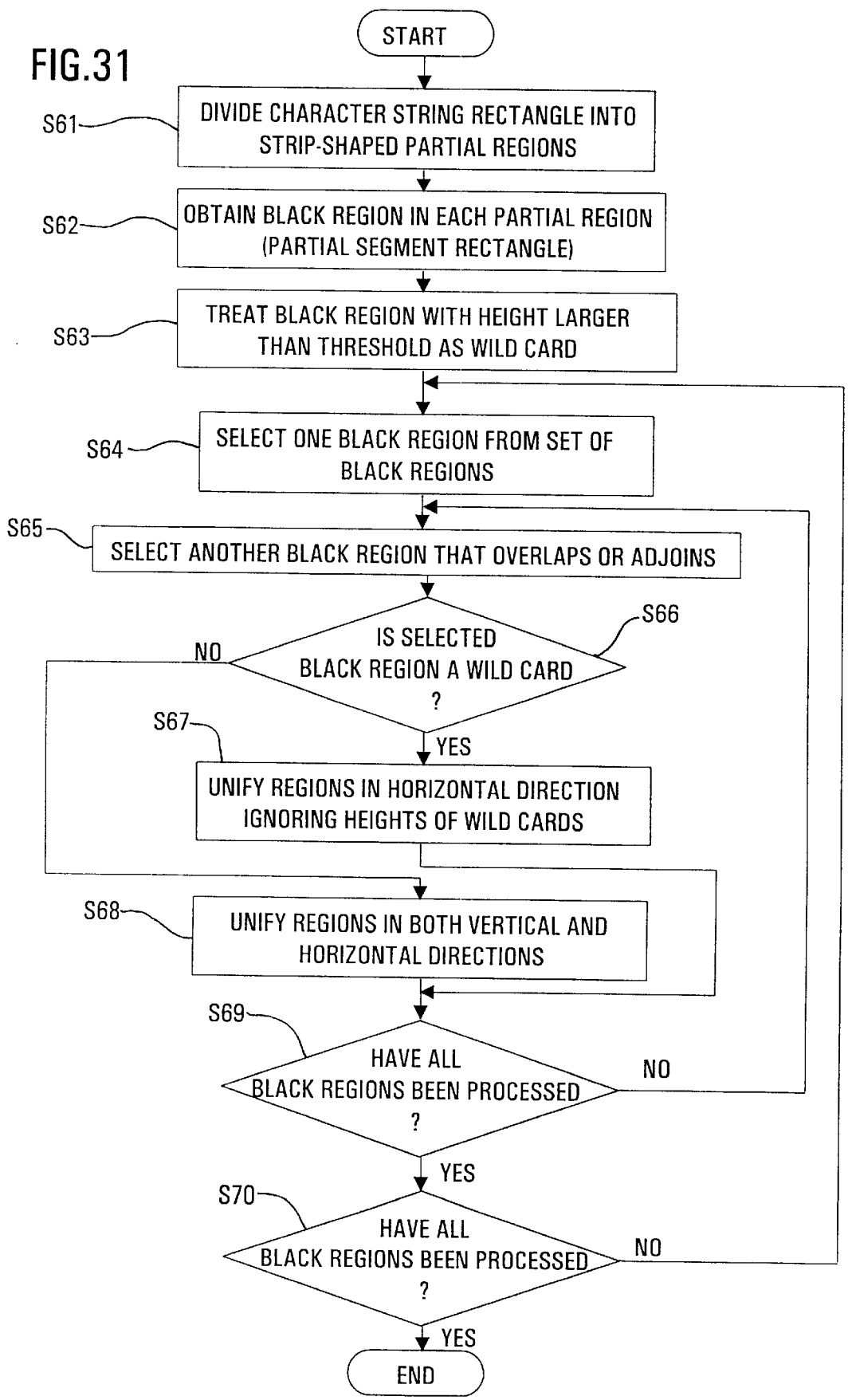
FIG. 31 is an operating flow chart showing a segment extracting process.

Next, a method for extracting a segment from a character string rectangle at step S50 shown in FIG. 24 will be described in detail. FIG. 31 is an operating flow chart showing the segment extracting process.

In FIG. 31, when the process is started, a character string rectangle is divided into strip-shaped partial regions with a predetermined pixel width w by the processor 14 (at step S61). The half of each region is overlapped with the half of the adjacent region as with the process shown in FIG. 11.

Next, the inside of each partial region is checked downwardly for each linear region of 1 pixel (h)×w pixels (w). When the number of black pixels in a particular linear region is larger than a predetermined threshold, the inside of the linear region is treated as all black pixels. This region is treated as a black region. When another black region is disposed just below the particular black region, it is determined that the two black regions are continuous and treated as one black region (partial segment rectangle) (at step S62). In other words, as the coordinates of a black region, the left and right thereof are coordinates of the left and right of the partial region; the top thereof represents the y coordinate of the black region that changes from a white region; and the bottom thereof is the y coordinate of the black region that changes to the white region. Thus, with one partial region, coordinates of one or more black regions can be obtained. This process is performed for all partial regions so as to obtain a set of black regions.

Figure 32:
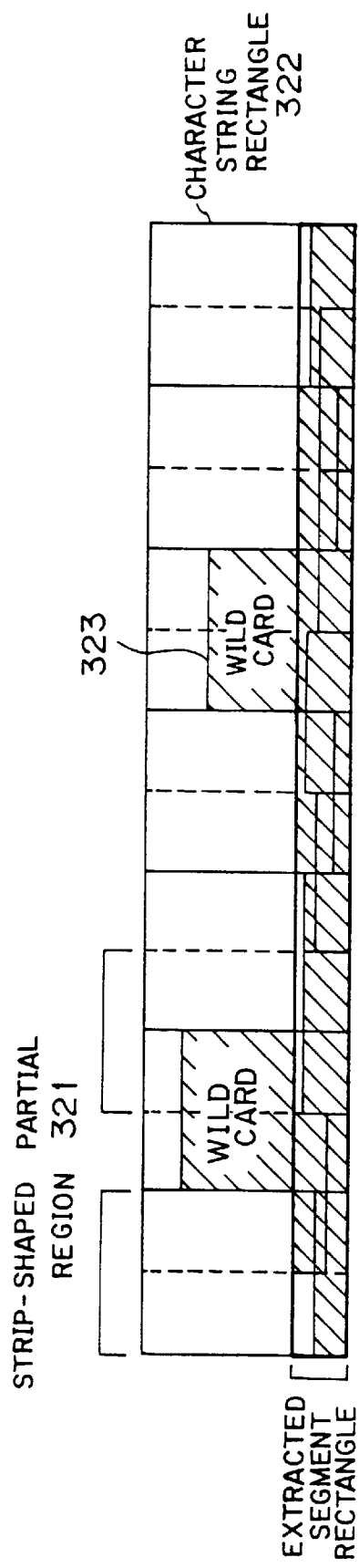
FIG. 32 is a schematic diagram showing segment rectangles in the case that wild cards are present.
Figure 33:
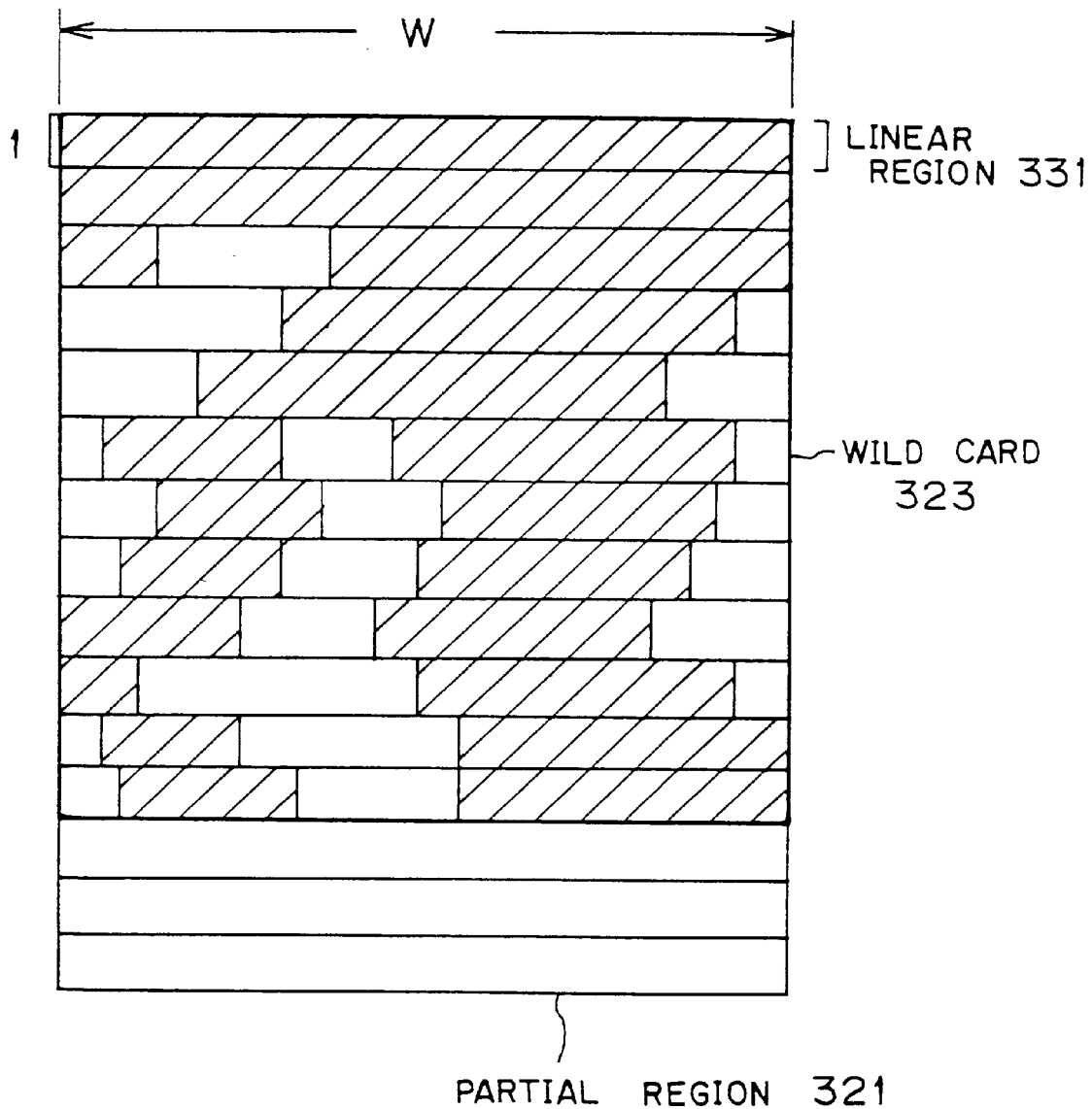
FIG. 33 is a schematic diagram showing wild cards.

A black region whose height is larger than the threshold is referred to as a wild card (at step S63). For example, a wild card takes place when characters of a character string rectangle are defaced as a black mass. FIG. 32 is a schematic diagram showing a character string rectangle 322 (divided into partial regions 321) and wild cards 323 disposed therein. FIG. 33 is a schematic diagram showing linear regions 331 in one partial region 321 and wild cards 323. In FIG. 33, the partial region 321 is composed of 15 linear regions 331. Among them, the upper 12 linear regions 331 have the wild cards 323.

Next, the set of black regions is scanned. Black regions that overlap or black regions that adjoin are unified as a flat rectangle region (at steps S64 to S69). First, one black region is selected from the set of black regions. The selected black region is checked (at step S64). When this black region is not a wild card rectangle, the coordinates at the upper and lower edges of the black region and the coordinates at the left and right edges thereof are stored as coordinates of a flat rectangle region. A check flag is set to the black region. Thus, each black region extracted from the set is not used again.

Next, one black region is extracted from the set of black regions. When the black region has not been checked, the coordinates thereof are compared with those of the stored flat rectangle and it is determined whether or not the black region adjoins on the right of the flat rectangle or overlaps therewith. The black region that satisfies such relation is selected (at step S65). Thereafter, it is determined whether or not the black region is a wild card (at step S66). When the black region is a wild card, the black region is unified in the horizontal direction, ignoring the height thereof (at step S67). At this point, the coordinates at the right edge of the stored flat rectangle are substituted with the coordinates at the right edge of the wild card rectangle.

When the black region that adjoins on the right of the flat rectangle or overlaps therewith is not a wild card, the coordinates at the upper and lower edges of both the rectangles are compared. When the difference is within a predetermined threshold, the regions are unified in both the vertical and horizontal directions (at step S68). At this point, the coordinates at the upper and lower edges of the right-side black region that is not a wild card are treated as the coordinates at the upper and lower edges of the new flat rectangle region. In addition, the coordinates at the right edge of the black region are treated as the coordinates at the right edge of the flat rectangle. Thereafter, it is determined whether or not all the black regions have been checked (at step S69). When there is a black region to be checked, the flow returns to step S65. In addition, a black region to be checked is changed to another black region (when the determined result at step S70 is NO). The flow returns to step S64. After all the black regions have been extracted, the segment extracting process is completed.

Thus, in the segment extracting process shown in FIG. 31, the inside of a rectangle is divided into vertical strips (of a predetermined length) that overlap. A portion with a predetermined black pixel occupying ratio is extracted from one strip and represented as a partial segment rectangle (black region). The black region is stored. These steps are the same as those of the segment extracting method shown in FIG. 11. At this point, a stored partial segment rectangle may be a small rectangle that is a part of an underline. However, when characters are defaced and they contact an underline, the partial segment rectangles may be rectangles with large heights as shown in FIG. 32. These partial segment rectangles are scanned in the horizontal direction and extracted as one long segment rectangle. In FIG. 32, the heights of wild cards in the character string rectangle are ignored.

These wild cards are unified with other partial segment rectangles. A flat segment rectangle is extracted at the lower edge of the character string rectangle.

Figure 37:
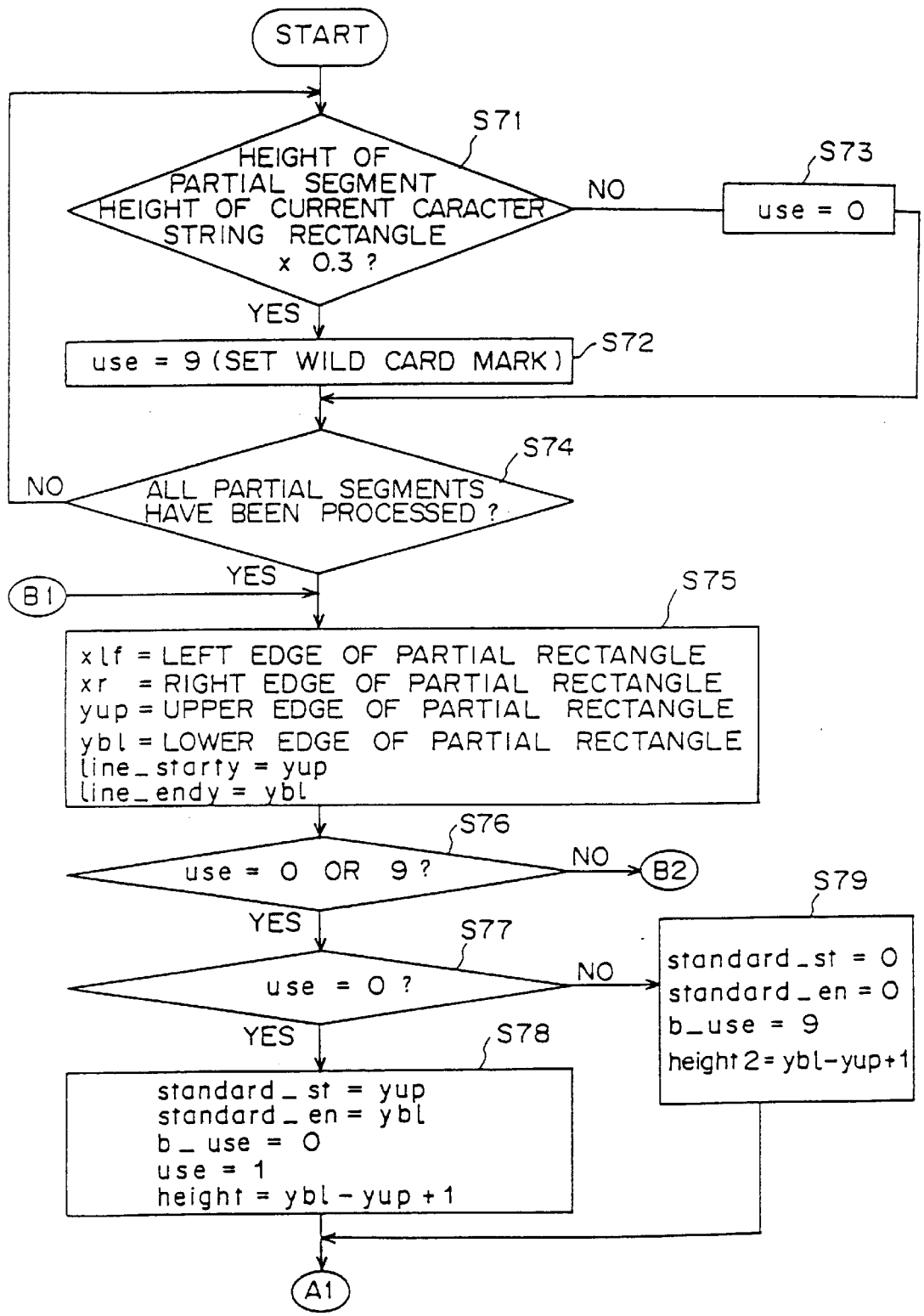
FIG. 37 is a detailed operating flow chart showing the segment extracting process (No. 1)
Figure 38:
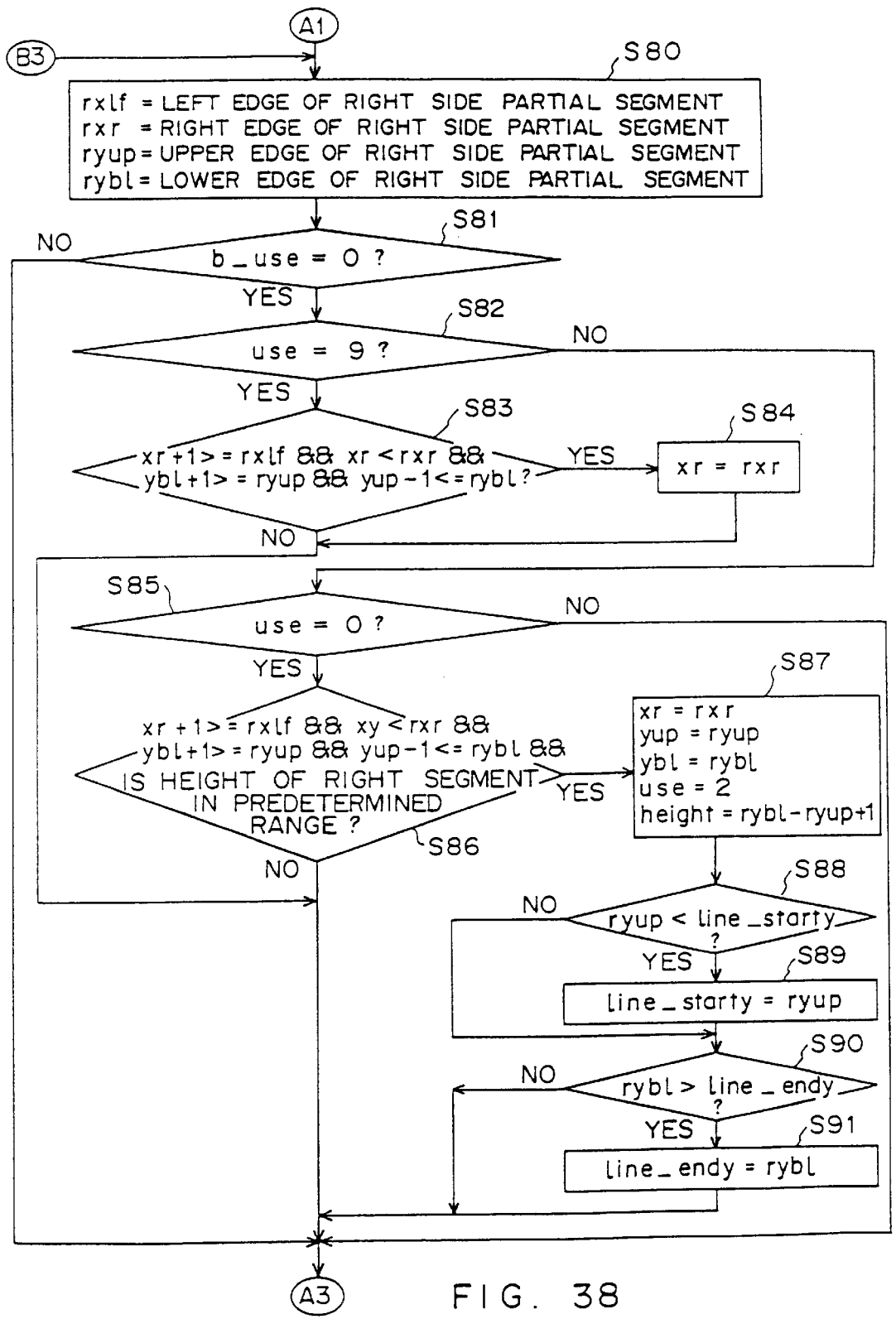
FIG. 38 is a detailed operating flow chart showing the segment extracting process (No. 2)
Figure 39:
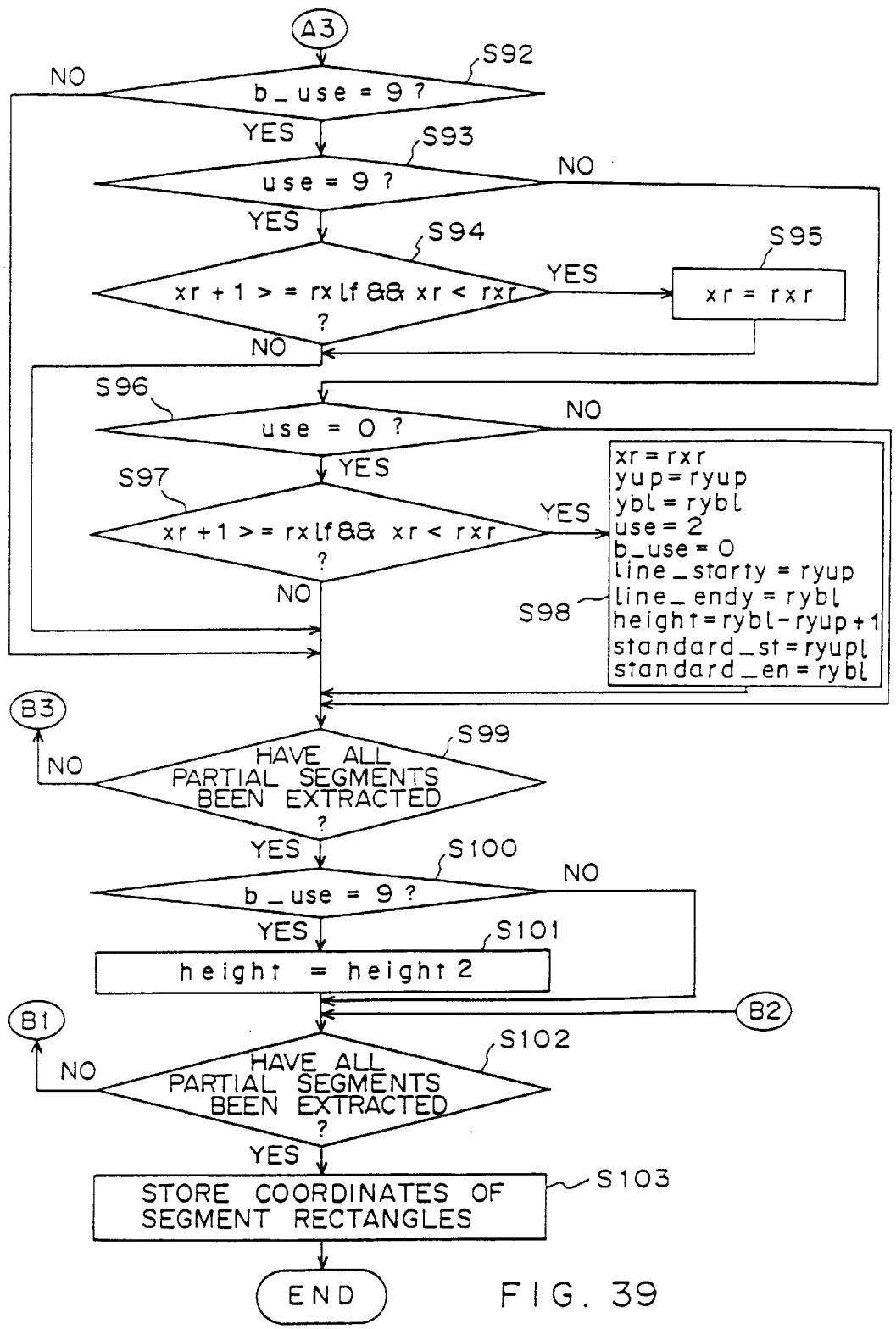
FIG. 39 is a detailed operating flow chart showing the segment extracting process (No. 3)

FIGS. 34, 35, and 36 show an example of a program code of the segment extracting process. FIG. 35 shows a portion α (C1) of the program code shown in FIG. 34. FIG. 36 shows a portion β (C2) of the program code shown in FIG. 34. FIGS. 37, 38, and 39 are operating flow charts for explaining processes shown in FIGS. 34, 35, and 36, respectively. In the process shown in FIG. 34, a large mass of black pixels of defaced characters is treated as a wild card rectangle. Flat rectangles that have the above-described eight-connection relation are checked. Rectangles that are disposed with wild card rectangles and that have the eight-connection relation are unified. Thus, one flat rectangle is obtained as a ruled line that is a segment alternative. Next, with reference to FIGS. 37, 38, and 39, the actual process will be described.

In FIG. 37, when the segment extracting process is started, the height of each partial segment rectangle is checked by the processor 14 (at step S71). When the height of the partial segment is {(height of character string rectangle)×0.3} or larger, it is marked as a wild card rectangle (at step S72). At this point, use=9 is set (where use is an identification variable of the partial segment rectangle) so as to mark the partial segment rectangle with a wild card mark. On the other hand, use=0 is set for other partial segment rectangles as normal rectangles (standard rectangles) (at step S73). Next, it is determined whether or not all partial segment rectangles have been marked (at step S74). When there is a partial segment rectangle to be marked, the flow returns to step S71.

After all partial segment rectangles have been marked, one rectangle is extracted as a current rectangle i. xlf=coordinate at left edge of current rectangle i, xr=coordinate at right edge of current rectangle i, yup=coordinate at upper edge of current rectangle i, ybl=coordinate at lower edge of current rectangle i, line_starty=yup, and line_endy=ybl are set (at step S75). Next, it is determined whether or not the identification variable use of the current rectangle i is 0 or 9 (namely, use=0 or 9) (at step S76).

When the identification variable use of the current rectangle i is 0 or 9, it is determined whether or not use=0 (at step S77). When use=0, standard_st=yup, standard_en=ybl, b_use=0, use=1, and height=ybl−yup+1 are set (at step S78). When b_use is 0, it represents that the current rectangle i is not a wild card, but a standard rectangle. When use=1, it represents that the current rectangle i has been used. When use is not 0 at step S77, standard_st=0, standard_en=0, b_use=9, and height2=ybl−yup+1 are set (at step S79). When b_use=9, it represents that the current rectangle i is a wild card, not a standard rectangle.

Next, another partial segment rectangle is extracted as a current rectangle k. rxlf=coordinate at left edge of current rectangle k, rxr=coordinate at right edge of current rectangle k, ryup=coordinate at upper edge of current rectangle k, and rybl=coordinate at lower edge of current rectangle k are set (at step S80 shown in FIG. 38). Thereafter, it is determined whether or not the current rectangle i has been set as a standard rectangle (namely, it is determined whether or not b_use=0) (at step S81). When b_use=0, it is determined whether or not the identification variable use of the current rectangle k is 9 (at step S82). When use=9, it represents that the current rectangle i is a standard rectangle and that the current rectangle k is a wild card.

When use=9, it is determined whether or not xr+1≧rxlf, xr<rxr, ybl+1≧ryup, and yup−1≦rybl (at step S83). When these relations are satisfied, they represent that the current rectangle k is disposed on the right of the current rectangle i and that they overlap by one pixel (dot) or more in the horizontal and vertical directions. When these conditions are satisfied, xr=rxr is set so as to extend the right edge of the current rectangle i to the right edge of the current rectangle k (at step S84).

When use is not 9 at step S82, it is determined whether or not use=0 (at step S85). when use=0, it represents that the current rectangle i is a standard rectangle and that the current rectangle k is not a wild card. When use=0, it is determined whether or not xr+1≧rxlf, xr<rxr, ybl+1≦ryup, and yup−1≦rybl are satisfied and whether or not the height of the current rectangle k is in a predetermined range (at step S86).

When these conditions are satisfied, xr=rxr, yup=ryup, ybl=rybl, use=2, height=rybl−ryup+1 are set (at step S87). They represent that the right edge of the current rectangle i is extended to the right edge of the current rectangle k and the coordinates at the upper edge and the lower edge of the current rectangle i are substituted with those of the current rectangle k. When use=2, it represents that the current rectangle k has been used. Next, it is determined whether or not ryup<line_starty is satisfied (at step S88). When the relation is satisfied, line_starty=ryup is set (at step S89). Thereafter, it is determined whether or not rybl>line_endy is satisfied (at step S90). When the relation is satisfied, line_endy=rybl is set (at step S91).

Thereafter, it is determined whether or not b_use=9 is satisfied (at step S92 shown in FIG. 39). When the relation of b_use=0 is not satisfied at step S81 or the determined results at steps S83, S85, S86, S88, and S90 are NO, the flow advances to step S92.

When b_use=9 is satisfied, it is determined whether or not the identification variable use of the current rectangle k is 9 (at step S93). When the relation of use=9 is satisfied, it represents that both the current rectangle i and the current rectangle k are wild cards. When the relation of use=9 is satisfied, it is determined whether or not xr+1≧rxlf and xr<rxr are satisfied (at step S94). When these relations are satisfied, the current rectangle k is disposed on the right of the current rectangle i and they overlap by one dot or more in the horizontal and vertical directions. In this case, xr=rxr is set so as to extend the right edge of the current rectangle i to the right edge of the current rectangle k (at step S95).

When the relation of use=9 is not satisfied at step S93, it is determined whether or not the relation use=0 is satisfied (at step S96). When the relation of use=0 is satisfied, it represents that the current rectangle i is a wild card and that the current rectangle k is not a wild card. When the relation of use=0 is satisfied, it is determined whether or not the relations of xr+1≧rxlf and xr<rxr are satisfied (at step S97). When these conditions are satisfied, xr=rxr, yup=ryup, ybl=rybl, use=2, b_use=0, line_starty=ryup, line_endy=rybl, height=rybl−ryup+1, standard_st=ryup, and standard_en=rybl are set (at step S98). They represent that the right edge of the current rectangle i is extended to the right edge of the current rectangle k and that the coordinates at the upper and lower edges of the current rectangle i are substituted with those of the current rectangle k. When the relation of use=2 is satisfied, it represents that the current rectangle k has been used.

Next, it is determined whether or not all partial segment rectangles have been extracted as the current rectangle k (at step S99). When the relation of b_use=9 is not satisfied at step S92 or when the determined results at step S94, S96, and S97 are NO, the flow advances to step S99. When there is a partial segment rectangle to be processed at step S99, the flow returns to step S80.

After the process for all the partial segment rectangles has been completed, it is determined whether or not the relation of b_use=9 is satisfied (at step S100). When the relation of b_use=9 is satisfied, height=height2 is set (at step S101). This condition represents that the current rectangle i and all rectangles connected thereto are wild card.

Next, it is determined whether or not all partial segment rectangles have been extracted as the current rectangle i (at step S102). When there is a partial segment rectangle to be processed, the flow returns to step S75. When the identification variable use of the current rectangle i is neither 0 nor 9, it represents that the extracted partial segment rectangle has been used. In this case, the flow advances to step S102. At step S102, the next partial segment rectangle is extracted.

After all the partial segment rectangles have been processed, xlf, xr, line_starty, and line_endy are stored in a file yokoline as the coordinates at the left edge, the right edge, the upper edge, and the lower edge of the extracted segment rectangle, respectively (at step S103). As a result, the process is completed. The file yokoline accords with a memory region for storing one or more segment rectangles extracted from one character string rectangle.

Figure 40:
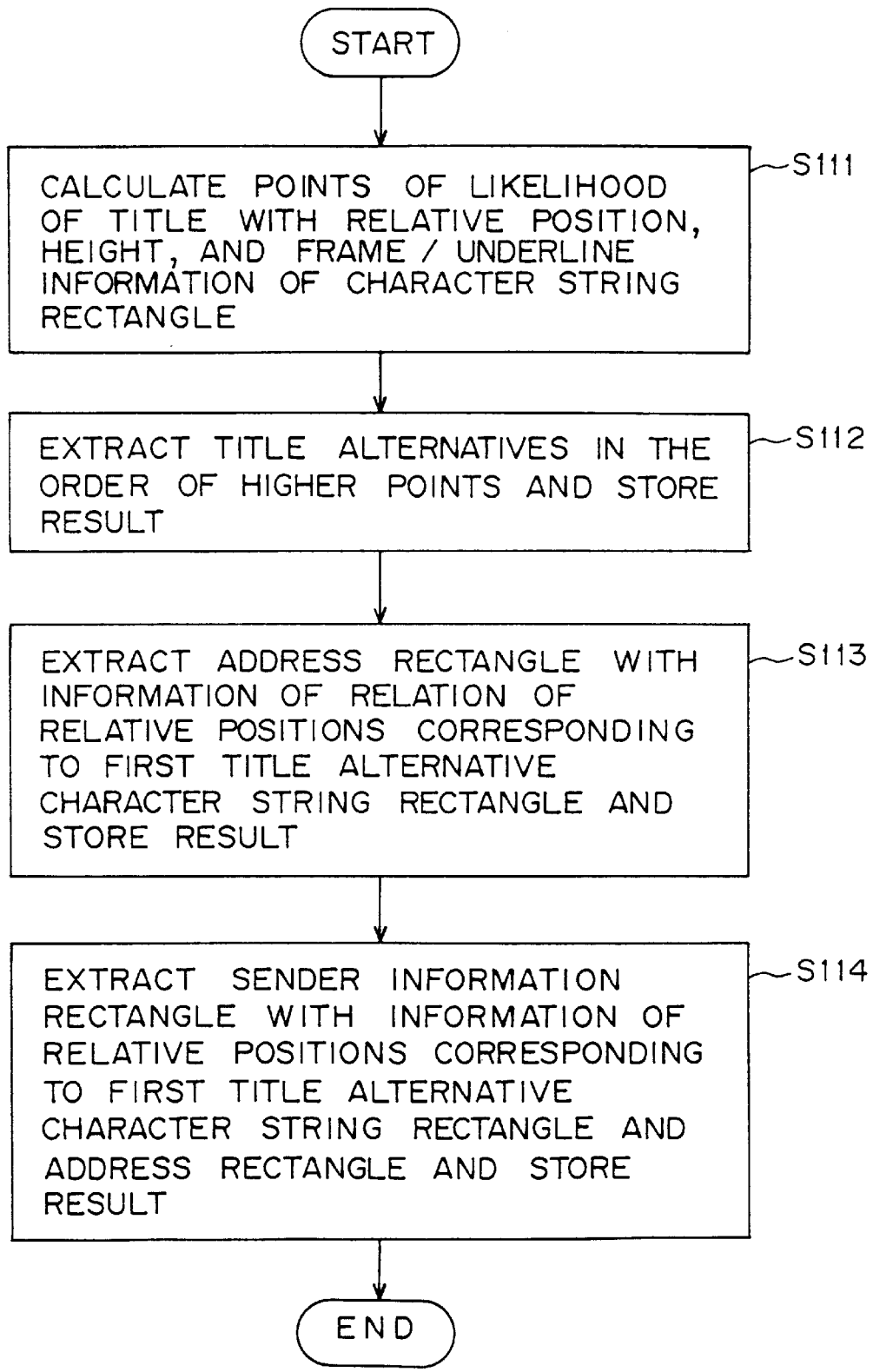
FIG. 40 is an operating flow chart showing a title/address/sender information extracting process.

At step S50 shown in FIG. 24, segments are extracted from the character string rectangle in the above-described manner. When the segments accord with an underline rectangle, the underline flag is set to the character string rectangle. After the character string rectangle forming process has been completed, the title/address/sender information extracting process at steps S8 to S10 of FIG. 3 is performed by the processor 14. FIG. 40 is an operating flow chart showing the title/address/sender information extracting process.

In FIG. 40, when the process is started, with the relative position, the height, and the frame/underline information of a character string rectangle, points that represent the likelihood of being a title are calculated (at step S111). Points for the likelihood of being a title against each character string rectangle are assigned corresponding to the following conditions.

(m) Plus points

Attributes of character string (frame and underline): high points

Size of character string (height and width): Points are proportional to the size of the character string Shape of character string (aspect ratio): Points are assigned when the aspect ratio of the character string is larger than a predetermined value.

Relation of mutual position of character string (vertical space and presence of left side rectangle): Points are proportional to the isolating characteristic of the character string.

Position in document (center, top, etc.): Points are high when the character string is disposed at the center or top position of the document. When the difference between the positions of character strings is small, the point difference is relatively small.

(n) Minus points

Attribute of character string (when a character string rectangle is composed of one character rectangle): Large minus points Relation of mutual position of character string (when an upper character string is close to a lower character string, when two character strings overlap, when an upper rectangle and a lower rectangle are left-justified, or when an upper rectangle overlaps with a lower rectangle): Large minus points Position in document (right side): Large minus points Corresponding to the above-described conditions, when the following conditions are satisfied for each character string rectangle, the following points are assigned.

(o) The point of a ruled line rectangle is 0.

(p) When the height of a character string rectangle is less than ½ of the maximum frequency value str_freq, the point is 0.

(q) When the aspect ratio (that is the ratio of width/height) is less than 3, the point is 0.

(r) When the width of the character string rectangle is less than 4 times the maximum frequency value str_freq, the point is 0.

(s) When a character string rectangle does not accord with the above-described conditions (o), (p), (q), and (r), the character string rectangle is assigned points according to the following conditions.

[#1] Aspect ratio: When the aspect ratio is 3, 20 points are assigned.

[#2] Vertically close character string rectangles: Unless character string rectangles overlap, when each of the space between a current character string rectangle and an upper character string rectangle and the space between the current character string rectangle and a lower character string rectangle is (str_freq/2) or less, −40 points are assigned.

[#3] Vertically close character string rectangles on one side: When a current character string rectangle is close to an upper character string rectangle or a lower character string rectangle and the space therebetween is 16 dots or more, −20 points are assigned.

[#4] Space between upper character string rectangle and lower character string rectangle: When the space between an upper character string rectangle and a lower character string is larger than the maximum frequency value str_freq, 20 points are assigned.

[#5] Overlap: When a current character string rectangle overlaps with another character string rectangle, −40 points are assigned.

[#6] Center: When the center coordinate in the horizontal direction (x direction) of a character string rectangle is within (center coordinates of a document region)±(40% of the width of the document region), 30 points are assigned.

[#7] Right side: When the coordinate of the center position of a character string rectangle is disposed on the right of the position of 60% from the left edge of the document region and when the value of (coordinate at center position of document region−coordinate at left edge of character string rectangle) is (⅙ of width of document region) or less, 30 points are assigned.

[#8] Height 1: When the height of a character string rectangle is in the range from 0.5 times to 1.5 times the maximum frequency value str_freq, 20 points are assigned.

[#9] Height 2: When the height of a character string rectangle is in the range from 1.5 times to 3 times the maximum frequency value str_freq, 30 points are assigned.

[#10] Height 3: When the height of a character string rectangle is larger than three times the maximum frequency value str_freq, 40 points are assigned.

[#11] Height 4: When the height of a character string rectangle is larger than 3 times the maximum frequency value str_freq and the coordinate of the lower position of the character string rectangle is disposed at a position of ⅓ from the upper edge of the document region, 10 points are assigned.

[#12] Horizontal width: When the width of a character string rectangle is larger than 0.4 times the width of the document region, 10 points are assigned.

[#13] Underline: When an underline flag is set to a character string rectangle, 30 points are assigned.

[#14] Frame: When a frame flag is set to a character string rectangle, up to 30 points are assigned. The points are decreased in proportion to the aspect ratio of the character string rectangle.

[#15] No left side rectangle: When a character string rectangle is not disposed on the left of a current character string rectangle at similar coordinates or when a character string rectangle whose width is smaller than 3 times of the maximum frequency value is disposed on the left of the current character string rectangle, 20 points are assigned.

[#16] y coordinate: When a character string rectangle is disposed at the top of the document, 20 points are assigned. The points are decreased by 1 whenever the character string rectangle is downwardly moved by 1 line.

[#17] Left justification: When a character string rectangle is disposed on a current character string rectangle in such a manner that the left edge of the current character string rectangle is close to that of the other character string rectangle, −30 points are assigned.

[#18] Overlap: When a character string rectangle is disposed above a current character string rectangle in such a manner that the left edge or the right edge of the current character string rectangle is close to that of the other character string rectangle or when the left edge and the right edge of the other character string rectangle is closer to the edge of the document region than the current character string rectangle, −30 points are assigned.

[#19] Black region: When a large character string rectangle is composed of one black pixel connected region, −40 points are assigned.

Figure 41A:
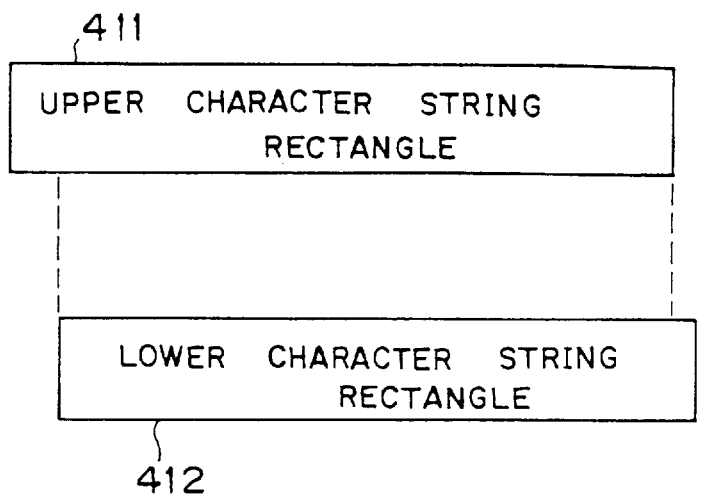
FIGS. 41A and 41B are schematic diagrams showing character string rectangles that overlap with a space.
Figure 41B:
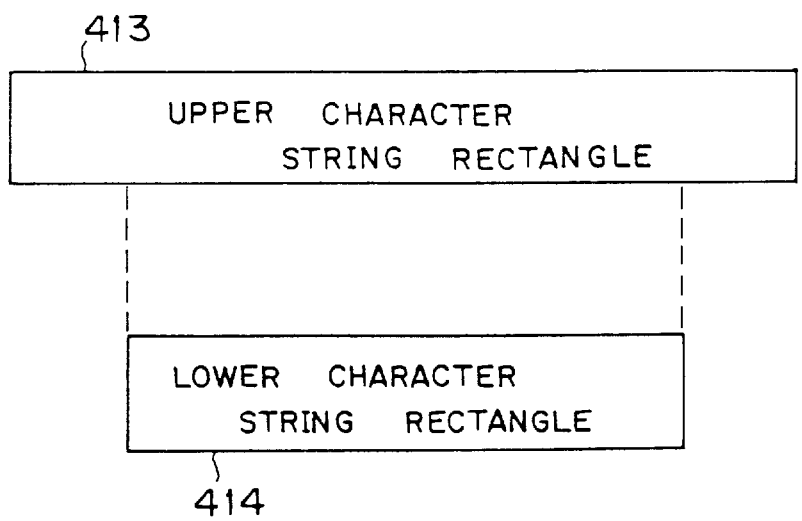

FIGS. 41A and 41B are schematic diagrams showing character string rectangles that overlap as with the condition [#18]. In FIG. 41A, the left and right edges of an upper character string rectangle 411 are close to those of a lower character string rectangle 412. In FIG. 41B, the left and right edges of an upper character string rectangle 413 are closer to the edges of the document region than those of a lower character string rectangle 414. In this case, it is assumed that the likelihood of being a title for the lower character string rectangle 414 is low.

The total of the points obtained corresponding to the conditions (o), (p), (q), (r), and (s) is calculated for each character string rectangle and stored in the memory 15.

Thereafter, title alternatives are extracted in the order of higher points and the result is stored (at step S112). In this example, all character string rectangles in the file line3 are sorted in the order of higher points and the result is stored in the file title. All the character string rectangles are stored in the file title in the order of higher title alternatives (namely, from the first title alternative). Thus, the first title alternative is extracted as the title rectangle.

Next, an address character string rectangle (address rectangle) is extracted with information of the relation of relative positions corresponding to the first title alternative and the result is stored (at step S113). In addition, a character string rectangle of a sender information (sender information rectangle) is extracted with the information of the relation of the relative positions and the information of the relation of the relative positions corresponding to the address rectangle and the result is stored (at step S114). As a result, the process is completed. The sender information includes the date of transmission of the document, the name of the sender, the report number, and so forth.

Figure 42:
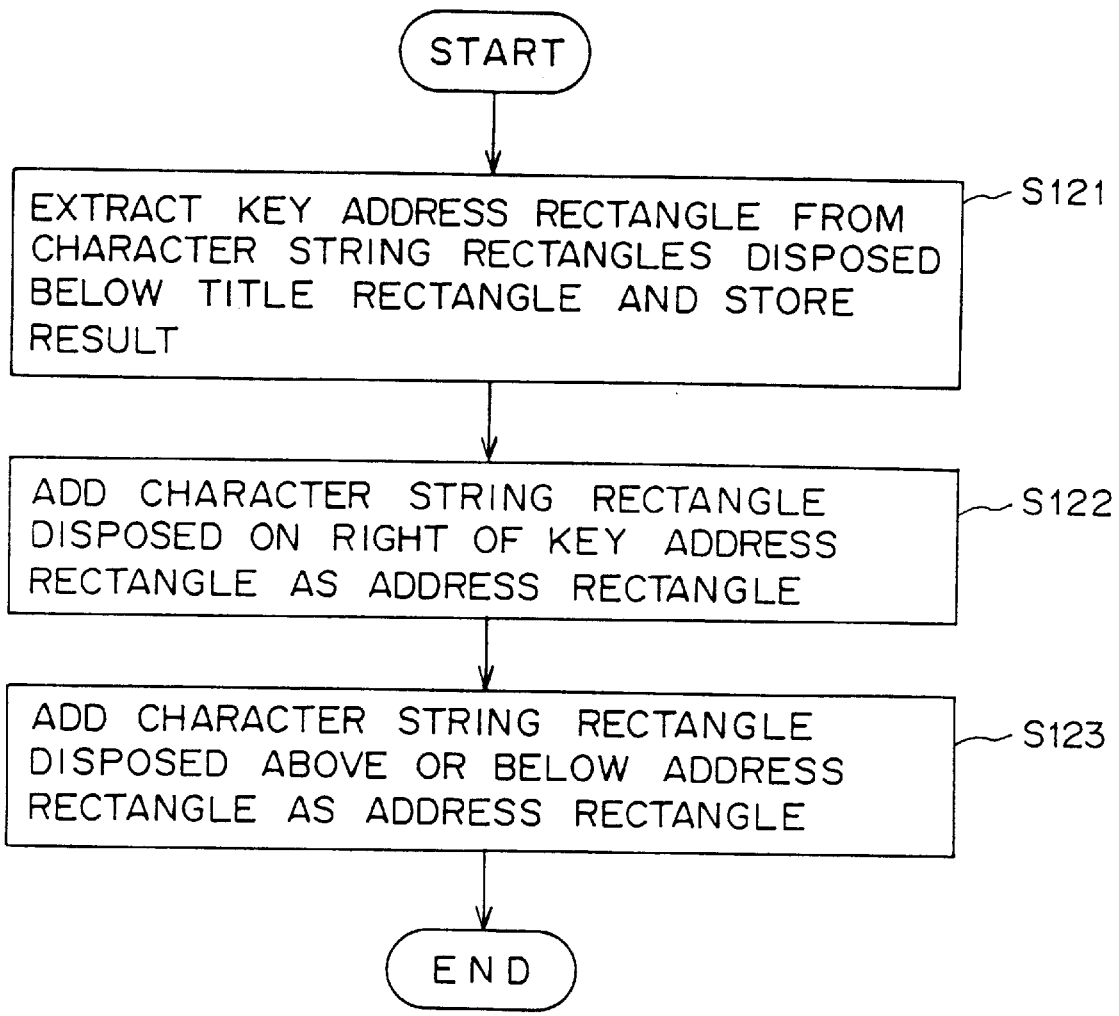
FIG. 42 is an operating flow chart showing a first address extracting process.
Figure 43:
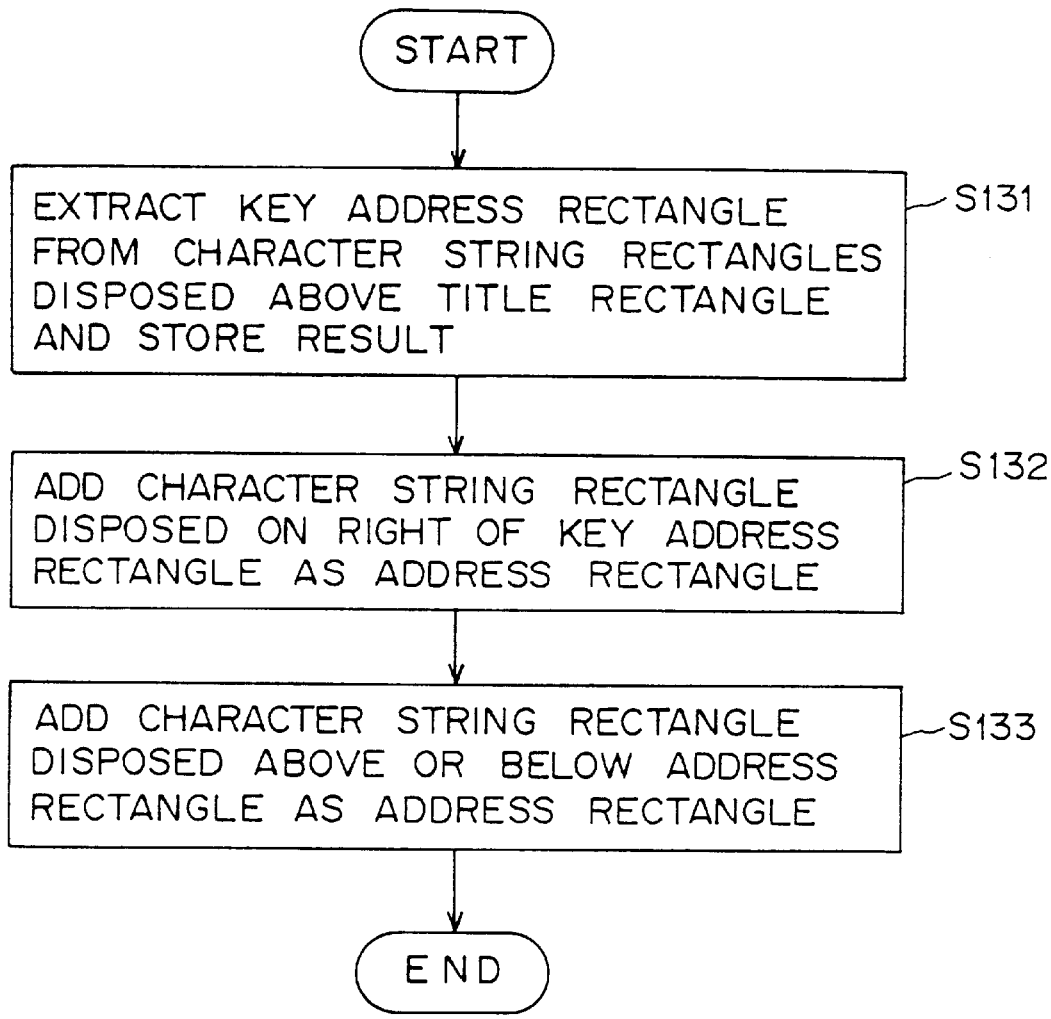
FIG. 43 is an operating flow chart showing a second address extracting process.

At step S113, the position in the y direction of the first title alternative character string rectangle is obtained. When the position of the first title alternative is the highest position, a first address extracting process is performed. Otherwise, a second address extracting process is performed. FIG. 42 is an operating flow chart showing the first address extracting process. FIG. 43 is an operating flow chart showing the second address extracting process.

Next, the first address extracting process will be described. In FIG. 42, when the process is started, a key address rectangle is extracted from character string rectangles disposed below the title rectangle by the processor 14. The extracted key address rectangle is stored (at step S121). In this example, a character string rectangle that is disposed below the title rectangle, whose height is in the range from 0.6 times of st_h to 1.4 times of en_h, whose center coordinate in the x direction is present on the left of the center coordinate of the title rectangle, and whose aspect ratio is larger than 3 is extracted as a key address rectangle. As with a character string rectangle disposed above the key address rectangle and whose center coordinate in the x direction is present on the right of the center coordinate of the title rectangle, when a character string rectangle that has the likelihood of being a sender information is not present in character string rectangles disposed above the key address rectangle, the extracted key address rectangle is stored in a file to.

Next, a character string rectangle disposed on the right of the key address rectangle is added as an address rectangle (at step S122). In this example, a character string rectangle that is disposed on the right of the key address rectangle and whose y coordinate is present in (y coordinate of key address rectangle)±(height×0.2) is treated as an address rectangle. The extracted address rectangle is stored in the file to in such a manner that it is independent from the key address rectangle.

Next, a character string rectangle disposed between an upper address rectangle and a lower address rectangle is treated as an address rectangle (at step S123). In this example, the average value (average height) of address rectangles extracted and stored in the file to is obtained. A character string rectangle that is disposed below the title rectangle, that is not an address rectangle that has not been extracted, that is disposed above or below an address rectangle, whose coordinate at the left edge accords with the coordinate at the left edge of the upper or lower address rectangle within a predetermined error, and whose height is less than twice the average height or whose distance to the upper or lower address rectangle is less than ½ of the average height, is stored as an address rectangle to the file to. This process is repeated until the number of address rectangles does not vary.

As a result, the first address extracting process is completed and character string rectangles in the file to are extracted as address rectangles.

Next, the second address extracting process will be described. In FIG. 43, when the process is started, a key address rectangle is extracted from character string rectangles disposed above a title rectangle and stored (at step S131). In this example, a character string rectangle that is disposed above the title rectangle, whose height is in the range from 0.6 times of st_h to 1.4 times of en_h, whose center coordinate in the x direction is disposed on the left of the center coordinate of the title rectangle, and whose aspect ratio is larger than 3, is extracted as a key address rectangle. The extracted key address rectangle is stored in the file to.

Next, a character string rectangle disposed on the right of the key address rectangle is added as an address rectangle (at step S132). In this example, a character string rectangle that is disposed on the right of the key address rectangle in a predetermined distance and whose y coordinate is in the range of (y coordinate of key address rectangle)±(0.2× height) is treated as an address rectangle and stored in the file to in such a manner that it is independent from the key address rectangle.

Next, a character string rectangle disposed between an upper address rectangle and a lower address rectangle is added as an address rectangle (at step S133). In this example, the average height of address rectangles extracted and stored in the file to is obtained. A character string rectangle that is disposed below the title rectangle, that has not been extracted as an address rectangle, that is disposed above or below an address rectangle, whose coordinate at the left edge accords with the coordinate at the left edge of the upper or lower address rectangle in a predetermined error, and whose height is less than twice the average height or whose distance to the upper or lower address rectangle is less than ½ of the average height, is added as an address rectangle to the file to. This process is repeated until the number of address rectangles does not vary.

As a result, the second address extracting process is completed. Character string rectangles stored in the file to are extracted as address rectangles.

At step S114 shown in FIG. 40, the position in the y direction of a title rectangle is obtained. When this position is the highest position, a first sender information extracting process is performed. Otherwise, a second sender information extracting process is performed.

In the first sender information extracting process, a character string rectangle that is disposed below a title rectangle, that is not an address rectangle, whose height is in the range from 0.6 times of st_h to 1.4 times of en_h, and whose center coordinate in the x direction is present on the right of the title rectangle, is extracted as an address rectangle and stored in a file from. In the second sender information extracting process, a character string rectangle that is disposed above a title rectangle and that is not an address rectangle, is extracted as an address rectangle and stored in the file from. Thus, character string rectangles in the file from are extracted as sender information rectangles.

Thus, the first and second sender information extracting processes are simpler than the first and second address extracting processes. However, another character string rectangle that satisfies a predetermined condition may be added as a sender information rectangle as with the address extracting process.

Figure 44:
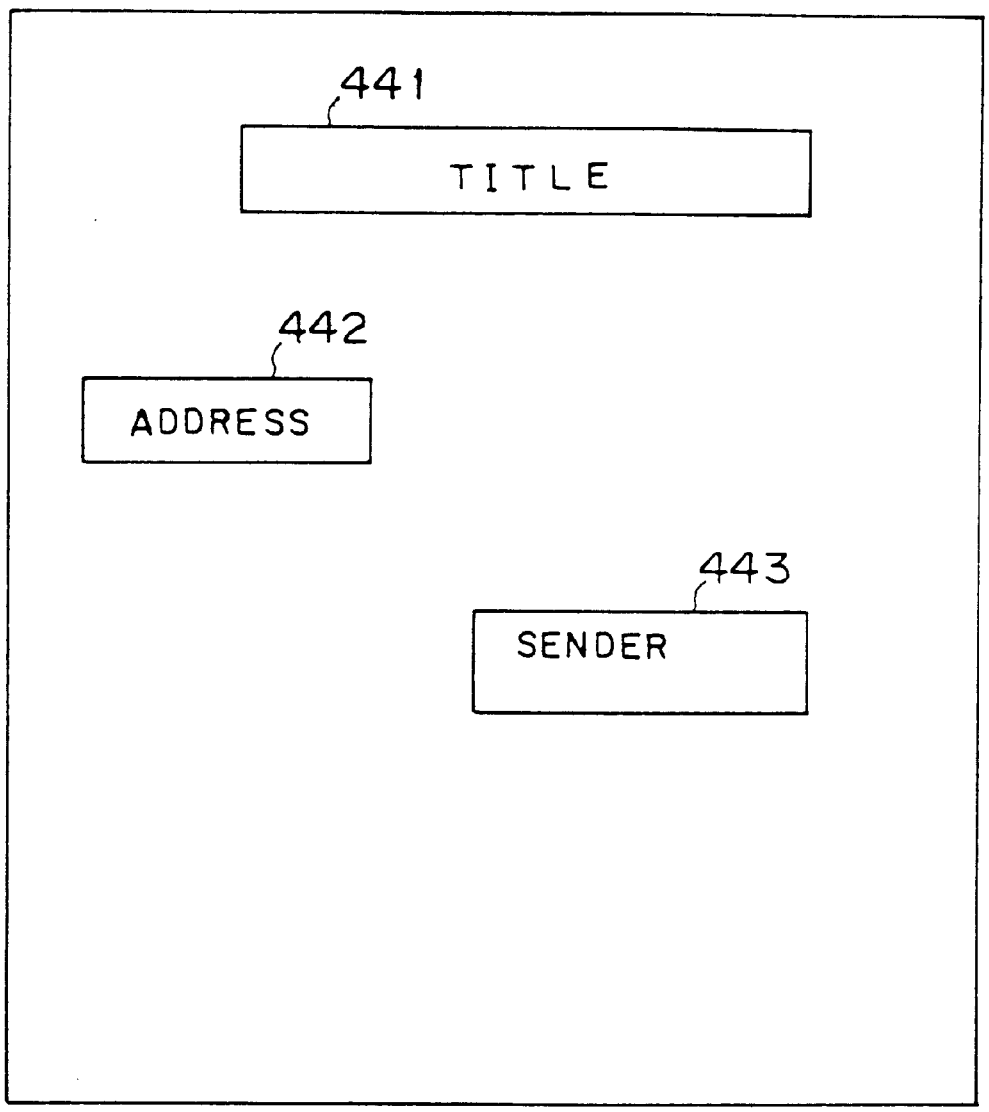
FIG. 44 is a schematic diagram showing a first arrangement of a title, an address, and a sender information.
Figure 45:
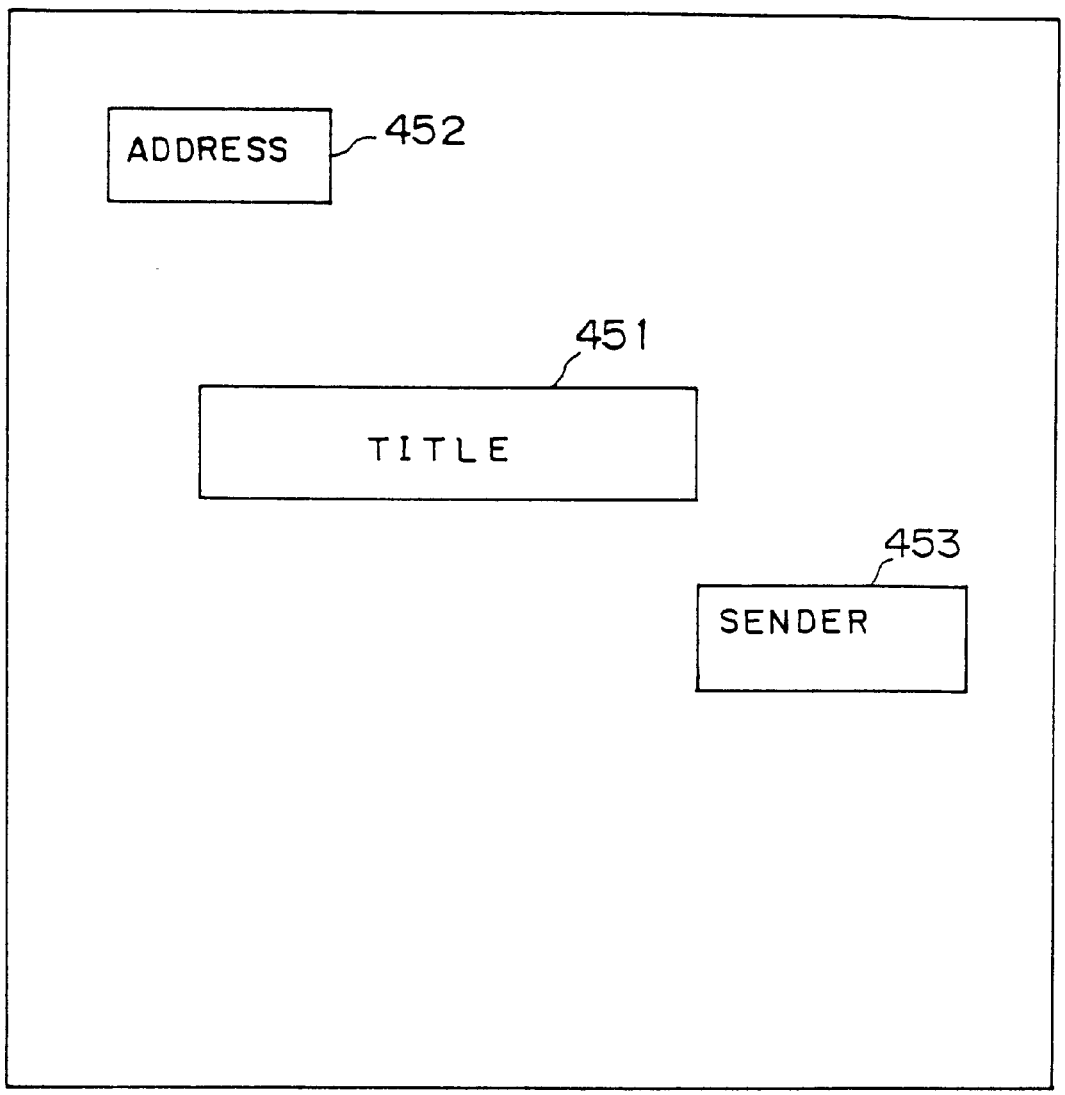
FIG. 45 is a schematic diagram showing a second arrangement of a title, an address, and a sender information.
Figure 46:
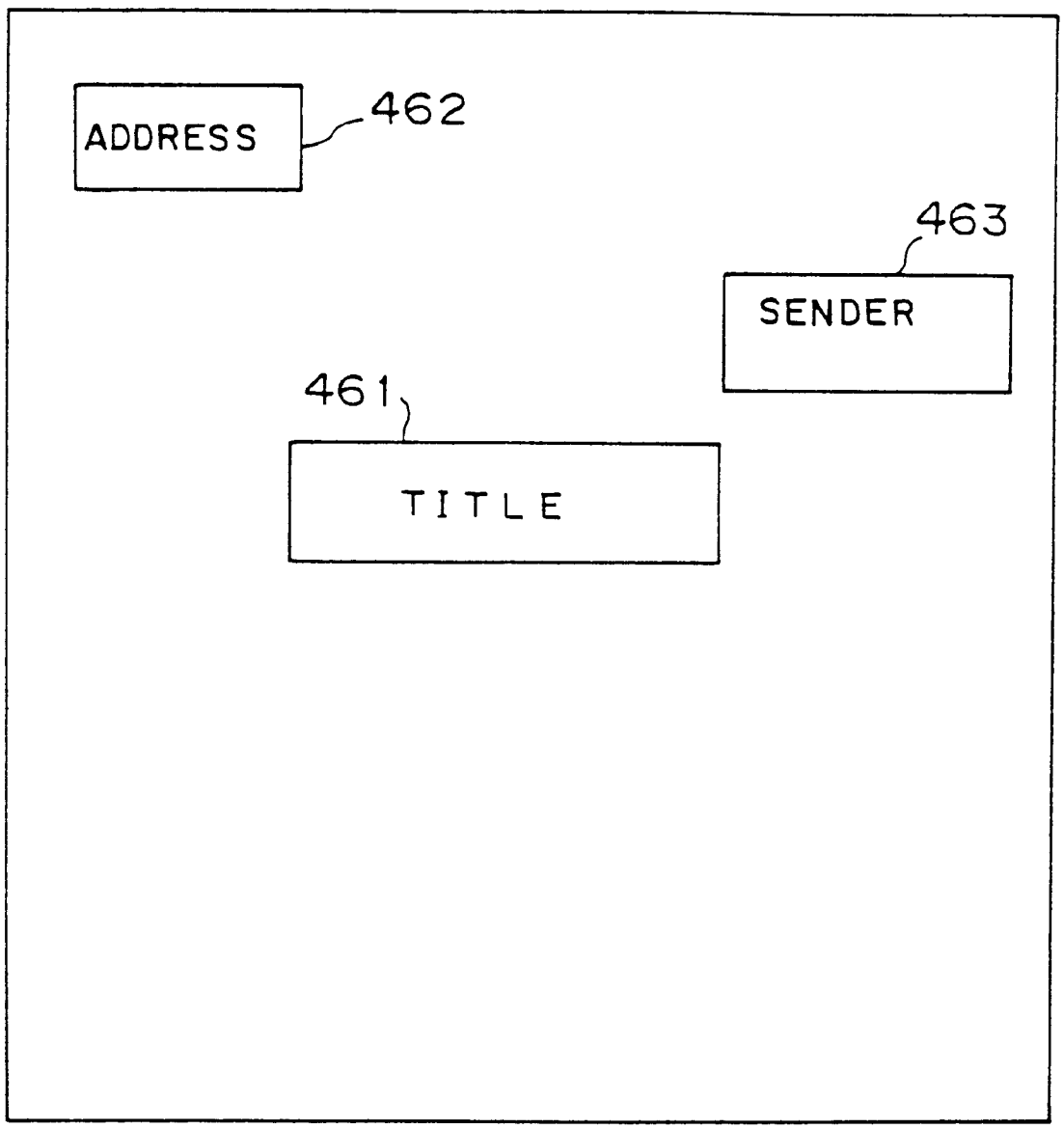
FIG. 46 is a schematic diagram showing a third arrangement of a title, an address, and a sender information.
Figure 48:
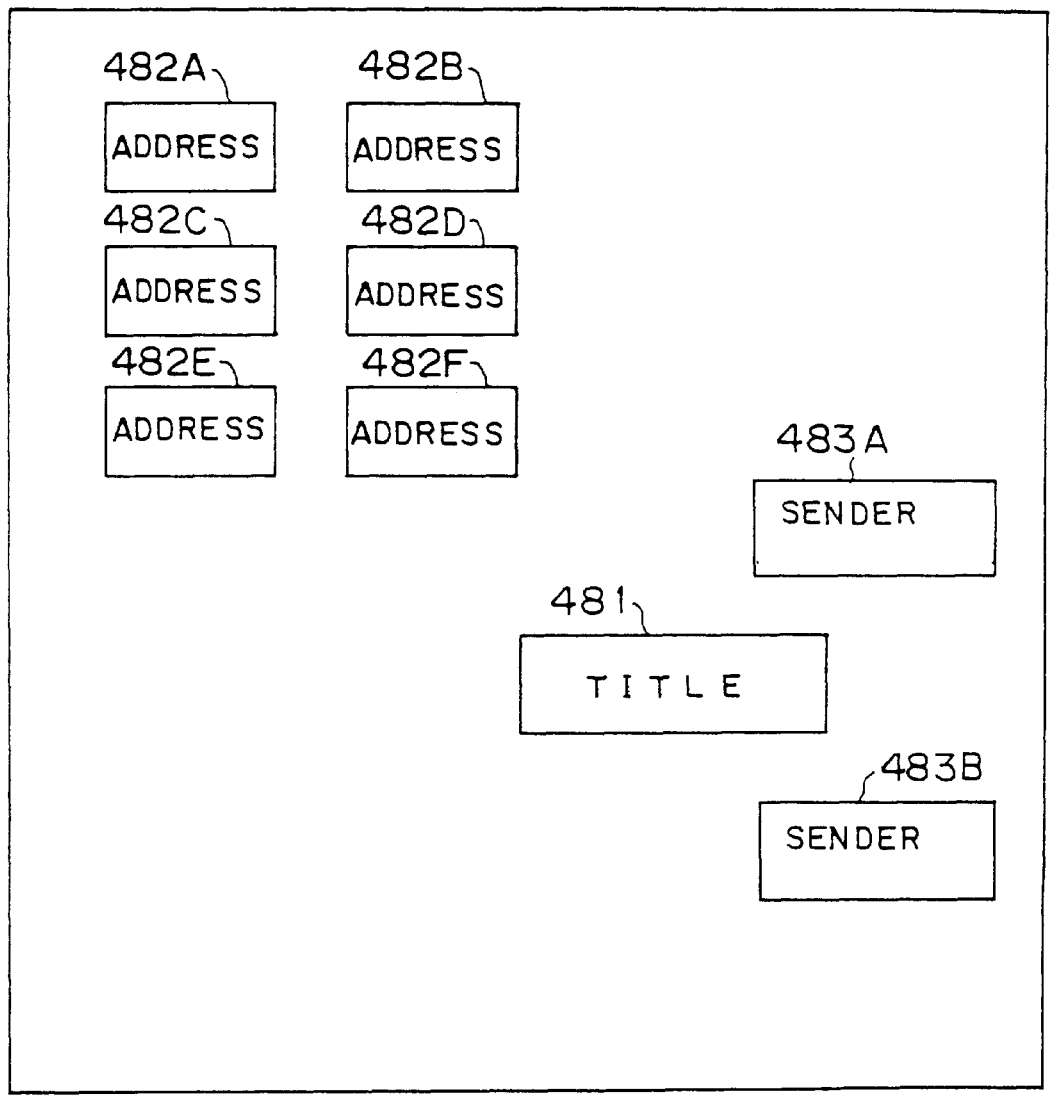
FIG. 48 is a schematic diagram showing a plurality of addresses and sender information.

FIG. 44 is a schematic diagram showing a first arrangement of a title 441, an address 442, and a sender information 443. In FIG. 44, since the title rectangle 441 is disposed at the top of the document, the first address extracting process and the first sender information extracting process are performed. FIGS. 45, 46, and 47 are schematic diagrams showing second, third, and fourth arrangements of titles 451, 461, and 471, addresses 452, 462, and 472, and sender information 453, 463, and 473, respectively. In these arrangements, since the title rectangles 451, 461, and 471 are not disposed at the top of these documents, the second address extracting process and the second sender information extracting process are performed. FIG. 48 is a schematic diagram showing a plurality of addresses 482a to 482f and a plurality of sender information 483a and 483b. In FIG. 48, the second address extracting process and the second sender information extracting process are performed.

In the arrangements shown in FIGS. 45, 47, and 48, when the second sender information extracting process is performed, a sender information rectangle disposed below a title rectangle is not extracted. To prevent this problem, a structure in which the first sender information extracting process is performed even if the title rectangle is not disposed at the top of the document can be used. Alternatively, both the first and second sender information extracting processes can be performed.

Figure 49:
FIG. 49 is a schematic diagram showing an example of the extracted result of a title, an address, and a sender information.

FIG. 49 is a schematic diagram showing contents generated by the title/address/sender information extracting process and stored in the files title, to, and from. In FIG. 49, a character string rectangle (「ソフトウェア販推レポート　送付表」) 491 is extracted as a title rectangle. Left justified character string rectangles 492 disposed below the title rectangle 491 are extracted as a plurality of address rectangles. A numeral disposed at the bottom of the document is extracted as a sender information 493.

Figure 50:
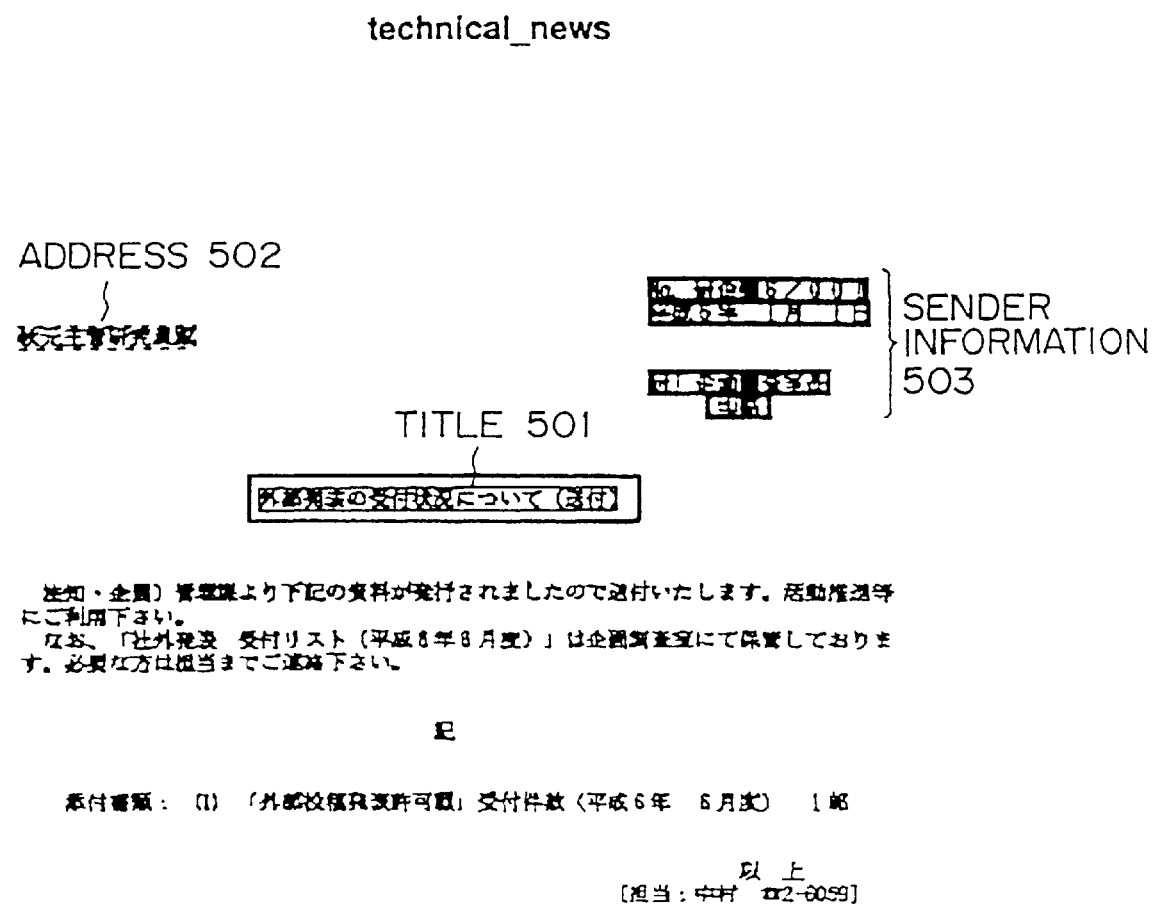

FIG. 50 is a schematic diagram showing another extracted result of the title/address/sender information extracting processes. In FIG. 50, a character string rectangle (「外部発表の受付状況について(送付)」) is extracted as a title rectangle 501. A character string rectangle disposed at the upper left position of the title rectangle 501 is extracted as an address rectangle 502. A plurality of character string rectangles disposed at the upper right position of the title rectangle 501 are extracted as sender information 503.

The title rectangle 501, the address rectangle 502, and the sender information rectangle 503 are extracted and recognized as character strings by the recognizing process at step S11 shown in FIG. 3. At this point, characters are extracted one by one from a rectangle to be processed and recognized. The recognized result is used, for example, as keywords of an image file in an electronic filing system 11.

In the above-described embodiment, the segment extracting process shown in FIG. 31 can be applied for a process for extracting horizontal segments from a large rectangle at step S6 shown in FIG. 3 as well as the underline extracting process at step S50 shown in FIG. 24. Thus, horizontal segment rectangles can be extracted regardless of the heights of wild cards in a large rectangle, and a frame line thereof can be recognized.

In the embodiment described with reference to FIGS. 3 to 50, an art for extracting a title from a region outside of a table is described. When a title is disposed inside a table, since a table rectangle is excluded from the process at step S24 shown in FIG. 5, a title in a table cannot be extracted.

Generally, in a document including a table, the title of the document may often be disposed outside the table. However, in a document distributed within a company, as with a formatted business document, a title may be disposed inside a table. Even if a title is disposed outside a table, when the title is a standard title such as "proceedings", the title that is a keyword for distinguishing a required document in an electronic filing system may be disposed in a region of the table.

In this example, a method for effectively and quickly extracting a title portion in a table is required without need to use a method that takes a long time, as with the conventional character recognizing method. Next, an embodiment for extracting item portions that represent names of regions that are likely to be titles such as "title" and "company name" in the table, and a title portion that represents actual contents of the items will be described.

Figure 51:
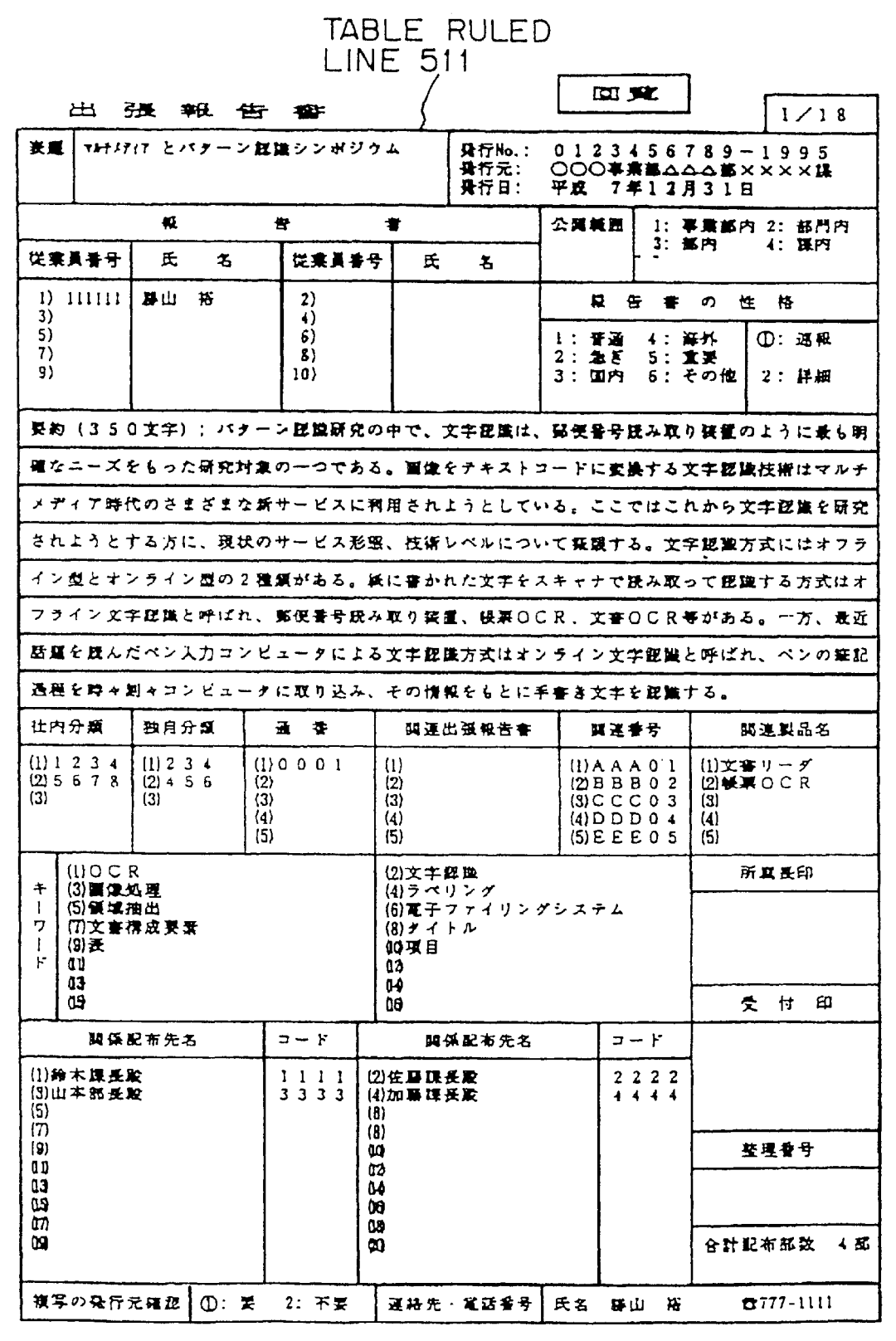

FIG. 51 is a schematic diagram showing a tabulated company document. In FIG. 51, (「表題」) disposed at an upper left portion in a table surrounded by table ruled lines 511 is an item portion and (「マルチメディアとパターン認識シンポジウム」) disposed on the right thereof is a title portion. In the case of a horizontally written document, a title portion in a table is normally disposed on the right of an item portion.

Figure 52:
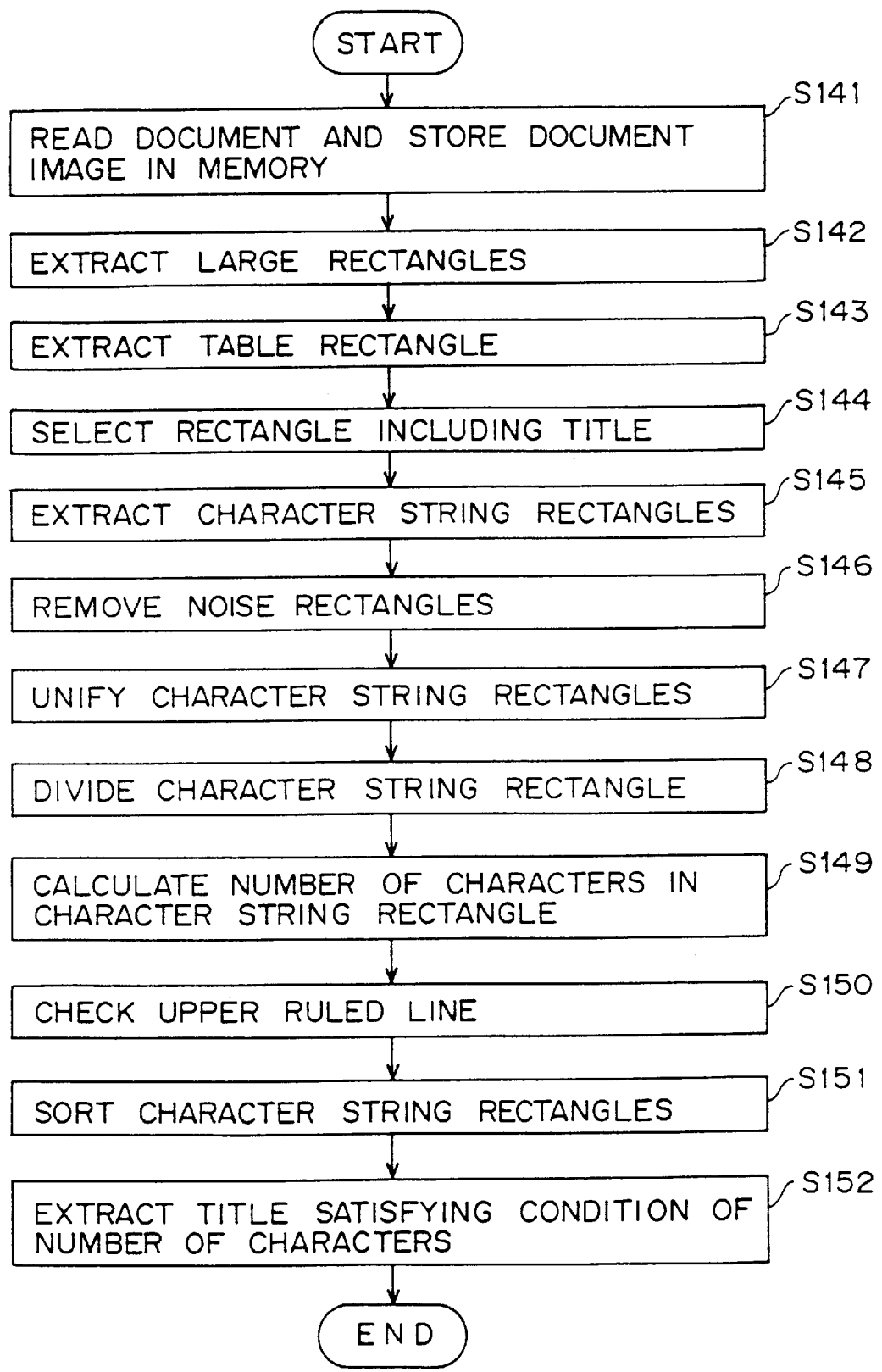
FIG. 52 is an operating flow chart showing an in-table title extracting process.

FIG. 52 is a flow chart showing an in-table title extracting process performed by the title extracting system shown in FIG. 2. In the process shown in FIG. 52, as a precondition, a horizontally written document is processed. However, as with the process shown in FIG. 3, a vertically written document can be also processed.

Figure 53:
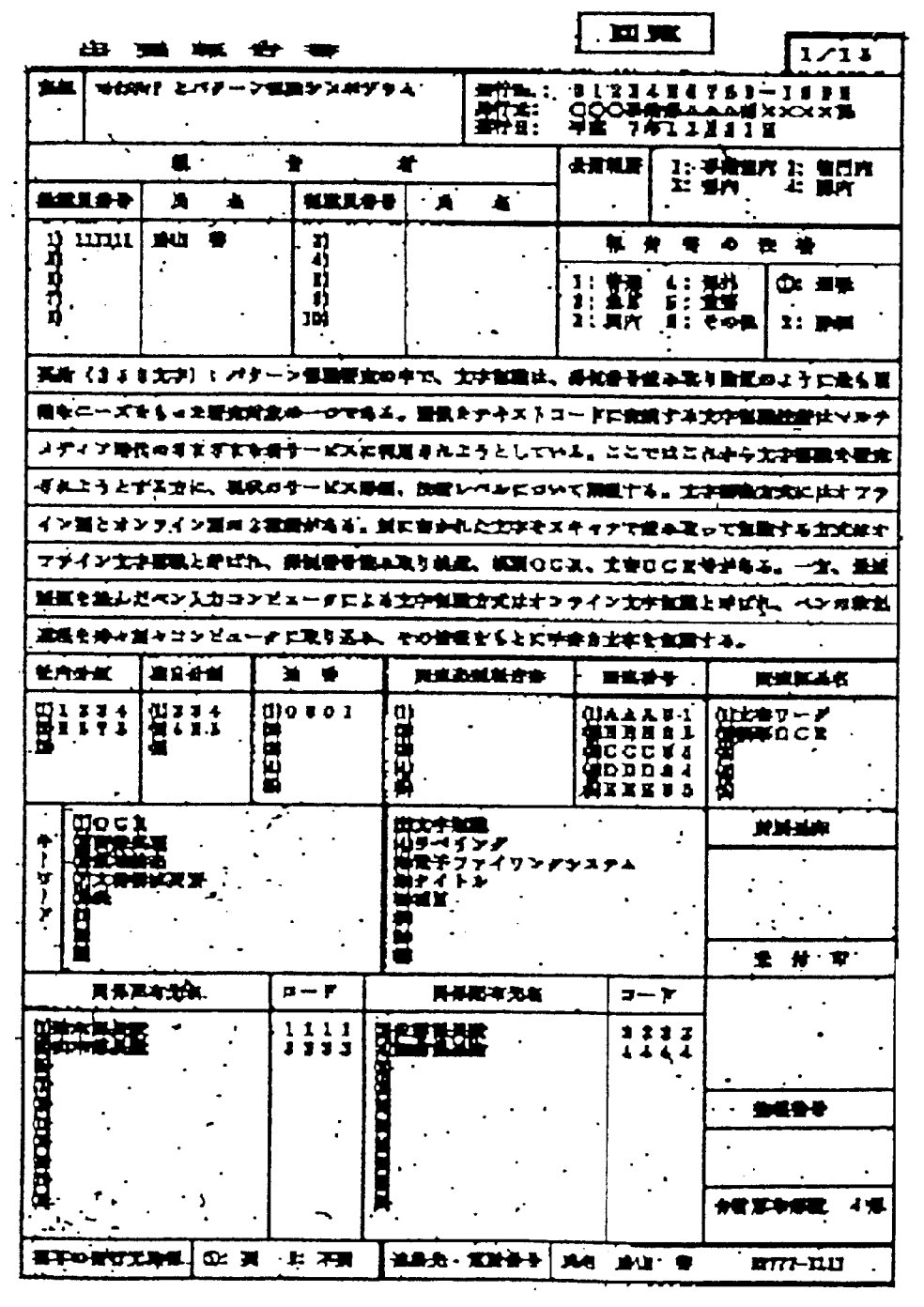

In FIG. 52, when the process is started, a document is scanned by the photoelectric converting device 12. The scanned document is stored in the memory 15 as a document image (at step S141). In this example, as with step S1 shown in FIG. 3, the original image is compressed and then stored. FIG. 53 is a schematic diagram showing a compressed image of the document shown in FIG. 51.

Figure 54:
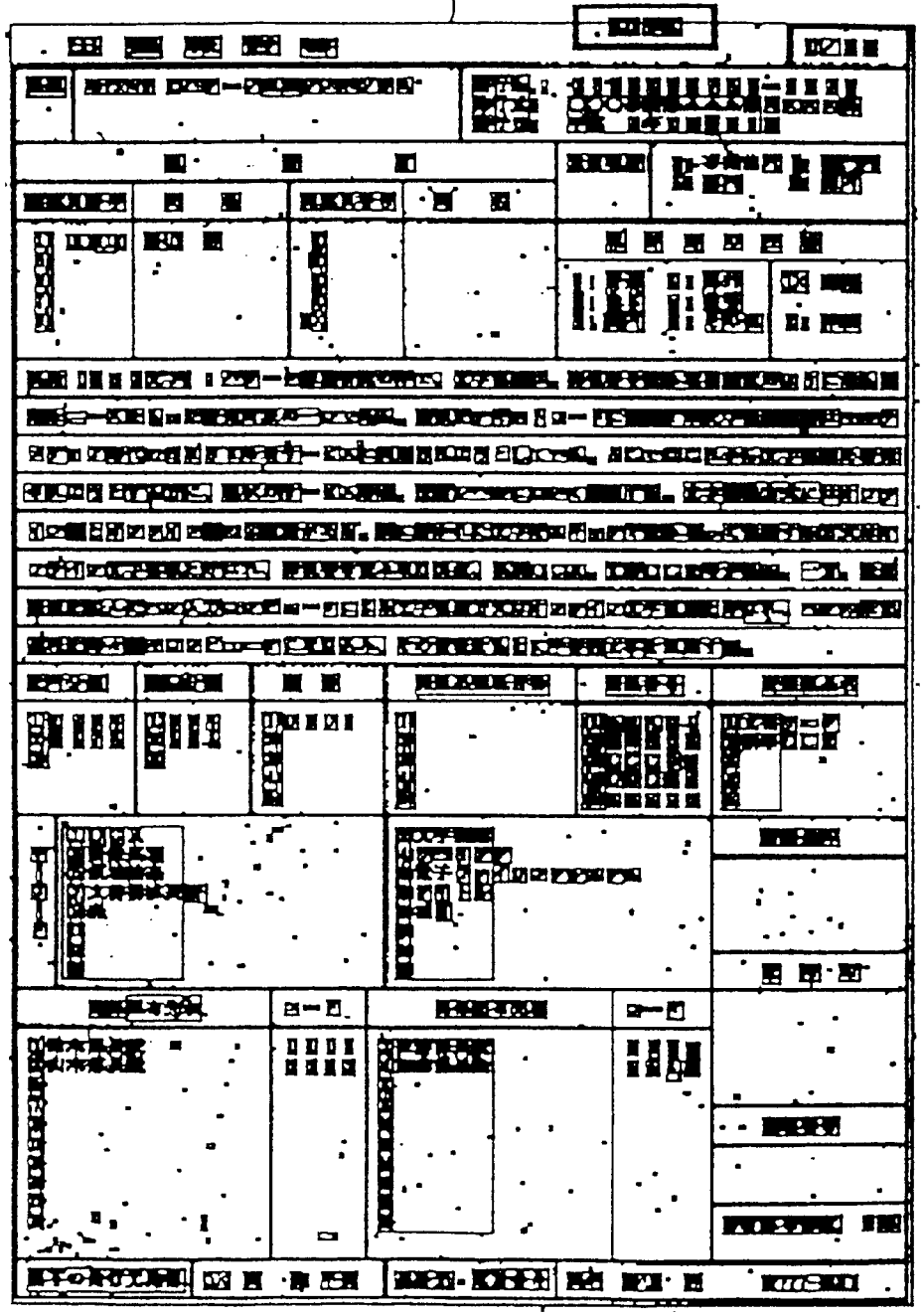
FIG. 54 is a schematic diagram showing a labeled result of a tabulated document.

Thereafter, a labeling process is performed for the document image by the processor 14. The maximum frequency value of the heights of rectangles is obtained. With the maximum frequency value, large rectangles are extracted (at step S142). The process performed at step S142 is the same as the process performed at steps S21, S22, and S23 shown in FIG. 5. However, in this example, a frame rectangle is not extracted. Rectangles stored in a file box are larger than a predetermined threshold th_large. FIG. 54 is a schematic diagram showing a result of the labeling process for the document image shown in FIG. 53.

Thereafter, a rectangle 80 that surrounds a table (this rectangle is referred to as a table rectangle) is extracted from the large rectangles (at step S143). A rectangle that includes a title is selected from the table rectangle 80 (at step S144). In this example, a table rectangle 80 with, for example, the largest area is selected. The following process is performed for the inside of the selected table rectangle 80.

Character strings (or lines) are extracted from the inside of the table rectangle 80 and circumscribed rectangles of the character strings are obtained (these circumscribed rectangles are referred to as character string rectangles). The coordinates of the obtained character string rectangles are stored in the memory 15 (at step S145). Thereafter, rectangles whose widths are small and whose heights are large are removed as noise rectangles from the stored character string rectangles (at step S146). Two or more resultant character string rectangles are unified (at step S147).

The process at step S145 is basically the same as the process at steps S25 to S31. The process at step S146 is the same as the process at step S41. The process at step S147 is the same as the process at steps S42 to S44.

In the above-described process, character string rectangles that have been extracted from the inside of the table are arranged. However, since these character string rectangles may include part of a table ruled line, ruled lines are extracted from the character string rectangles. A character string rectangle is divided with a ruled line (at step S148).

Next, the number of characters in each character string rectangle is calculated so as to extract a character string rectangle that is likely to be a title (at step S149). The number of characters is used as an attribute of the character string rectangle in the process at step S152.

In the process at step S148, character string rectangles for individual regions surrounded by the table ruled lines are extracted. However, when the shape of the table is not rectangular, character string rectangles disposed outside the table may not be processed. Thus, an upper ruled line is checked (at step S150). When a table ruled line is not disposed above a current character string rectangle, it is treated as a character string rectangle disposed outside the table. This character string rectangle is removed.

Next, the character string rectangles disposed in the table are sorted in the order of positions closer to the upper left edge of the table rectangle (at step S151). When the number of characters of a current character string rectangle satisfies a predetermined condition, the character string rectangle is extracted as an item portion or a title portion (at step S152). As a result, the in-table title extracting process is completed. At this point, character string rectangles that satisfy the predetermined condition and that are disposed at positions closer to the upper left edge of the table rectangle are selected as higher title alternatives.

Next, the individual steps of the in-table title extracting process will be described in detail.

Figure 55:
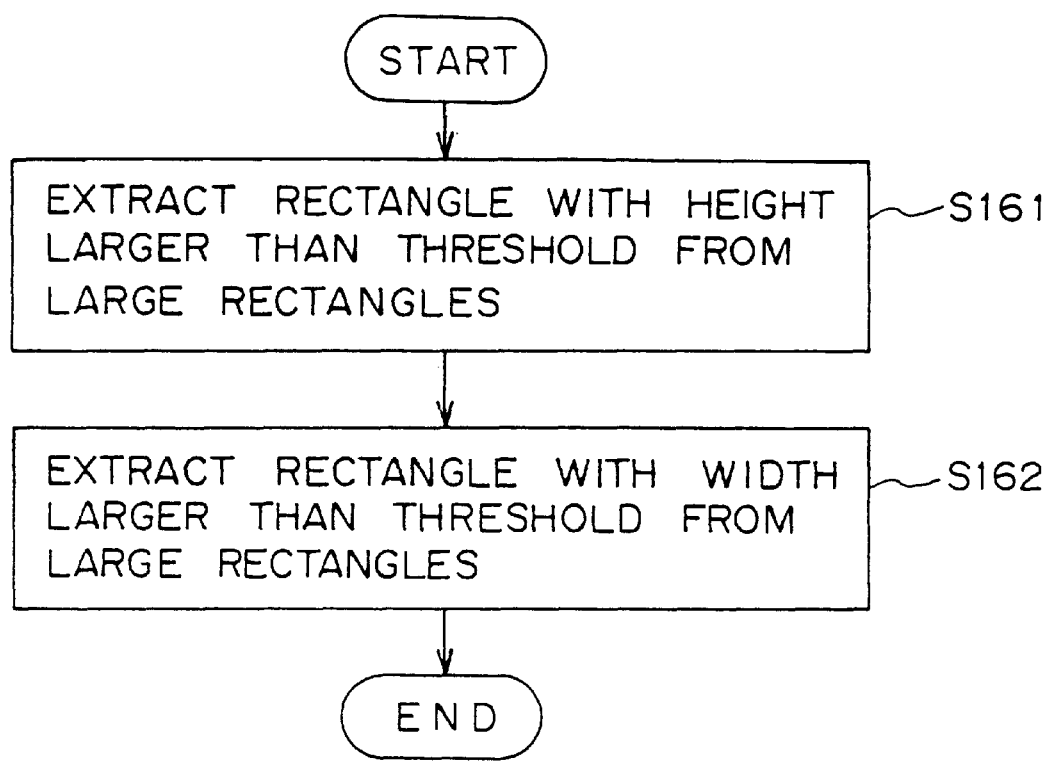
FIG. 55 is an operating flow chart showing a table rectangle extracting process.

FIG. 55 is an operating flow chart showing the table rectangle extracting process at step S143 shown in FIG. 52. When the process at step S142 is followed by the table rectangle extracting process, only rectangles that are larger than a predetermined size are processed. Thus, the table rectangle can be effectively extracted.

In FIG. 55, when the process is started, rectangles that are larger than a predetermined threshold are extracted from large rectangles in the file box (at step S161). In this example, rectangles whose heights are larger than, for example, five times the maximum frequency value freq of the heights of the rectangles, are extracted. The extracted rectangles are stored in a file large_4bai as the table rectangle. The table rectangles extracted at step S161 are used for the upper ruled line checking process at step S150.

Next, rectangles having widths larger than a threshold are extracted from large rectangles in the file box (at step S162). In this example, rectangles that have widths larger than 0.7 times of the width of the document image are extracted and stored as table rectangles in a file largewide.

At step S144 shown in FIG. 52, the largest table rectangle is selected from those extracted at step S162. For example, a table rectangle with the largest area is selected from those stored in the file largewide. The selected table rectangle is processed. In the case of the document image shown in FIG. 54, only a table rectangle 80 is stored in the file largewide. Thus, this table rectangle 80 is automatically processed.

Next, at step S145 shown in FIG. 52, character string rectangles are extracted from the inside of the selected table rectangle. However, rectangles that accord with the following conditions are excluded from those to be processed.

(t) When a current rectangle is a frame rectangle, (u) When a current rectangle is a flat rectangle whose height is larger than 3 times the maximum frequency value freq and whose aspect ratio is smaller than 0.4, and (v) When a current rectangle has a height larger than ⅓ of the height of the document image.

Frame rectangles that satisfy the condition (t) are extracted by the process at step S23 shown in FIG. 5.

Figure 56:
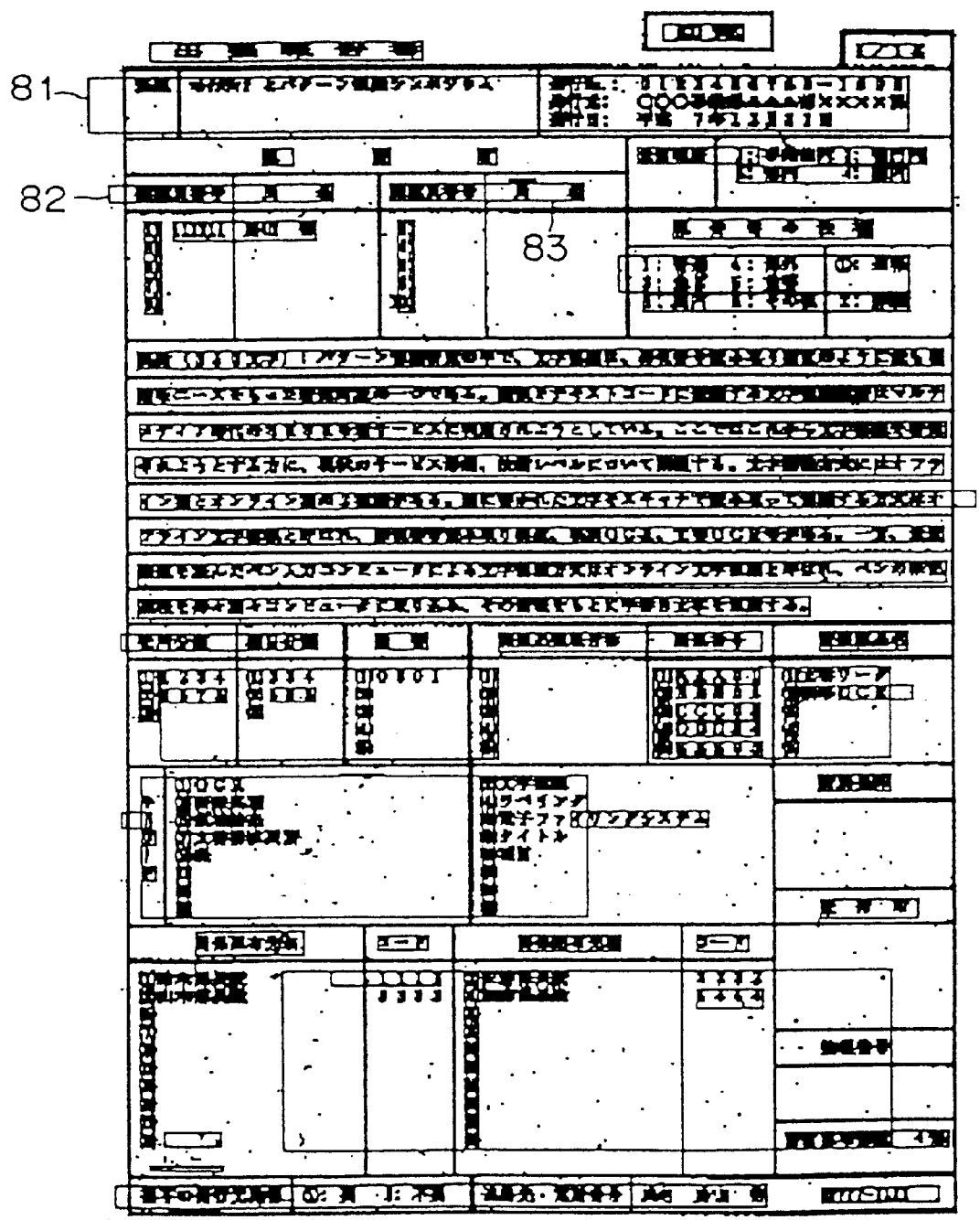
FIG. 56 is a schematic diagram showing character string rectangles of a tabulated document.

FIG. 56 is a schematic diagram showing character string rectangles unified by the processes at steps S145, S146, and S147. In FIG. 56, for example, character string rectangles 81, 82, an 83 each include a plurality of character strings divided by table ruled lines. To correctly extract character strings in the table, character string rectangles are divided by vertical ruled lines disposed between each character rectangle at step S148. Next, with reference to FIGS. 57 to 65, the character string dividing process will be described.

Figure 57:
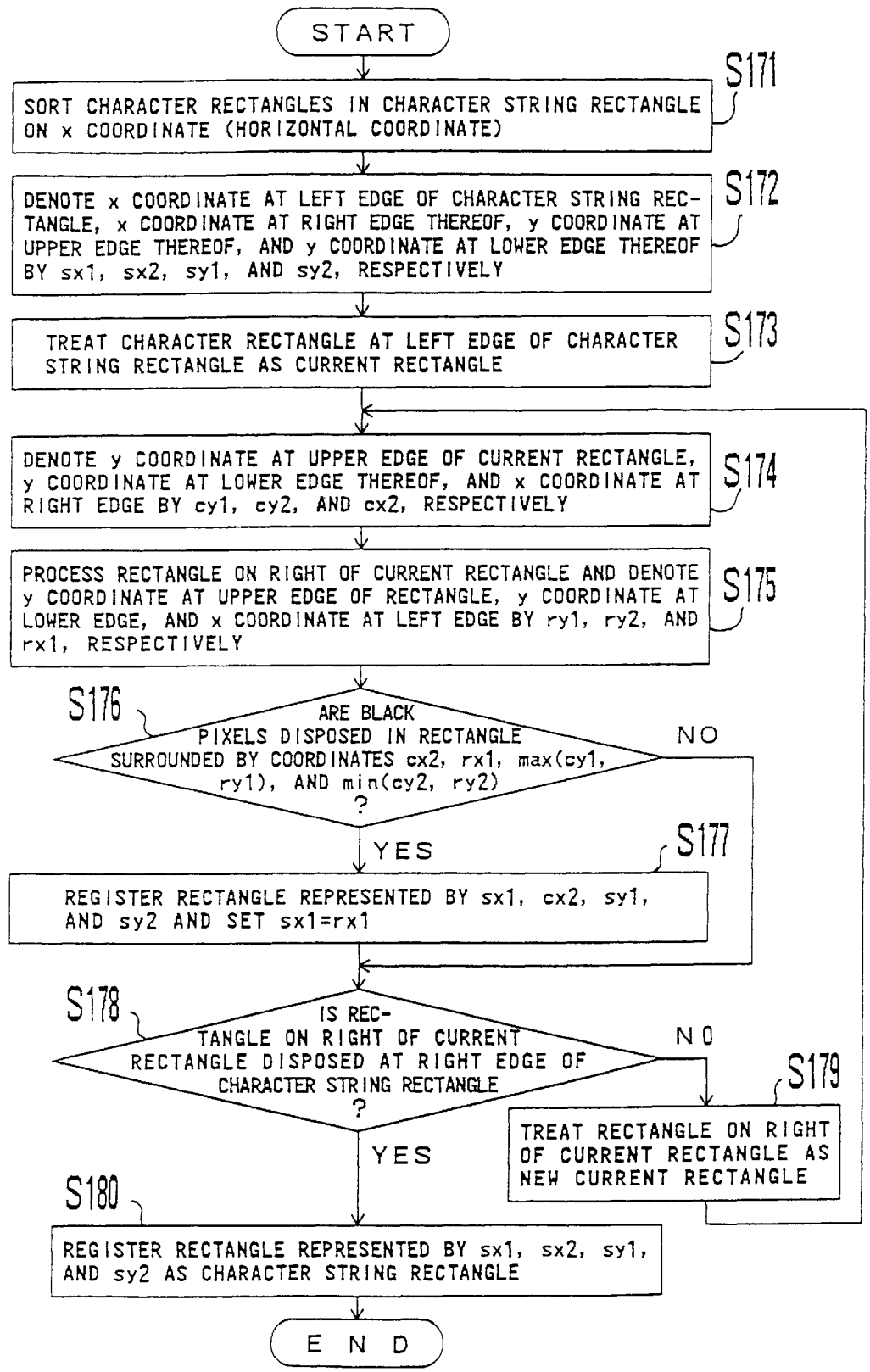
FIG. 57 is an operating flow chart showing a first character string dividing process.

The character string dividing method can be roughly categorized into the following two methods. FIG. 57 is an operating flow chart showing a first character string dividing process. In the first character string dividing process, it is determined whether or not a vertically ruled line is disposed between any two adjacent character rectangles included in each character string rectangle by the processor 14. At this point, character rectangles included in a current character string rectangle are sorted in the horizontal direction so as to determine whether or not black pixels are present therebetween. When black pixels are disposed, the character string rectangle is divided at the position of the black pixels. Thus, a plurality of new character string rectangles are generated.

In FIG. 57, when the process is started, character rectangles in a current character string rectangle are sorted in the order of smaller x coordinate values (horizontal coordinate values) (at step S171). In the processes up to step S147, character rectangles in the string rectangle are sorted in the order of smaller y coordinate values (vertical coordinate values). In other words, the order in the horizontal direction is not considered. Thus, the order of character rectangles stored is changed.

Figure 58:
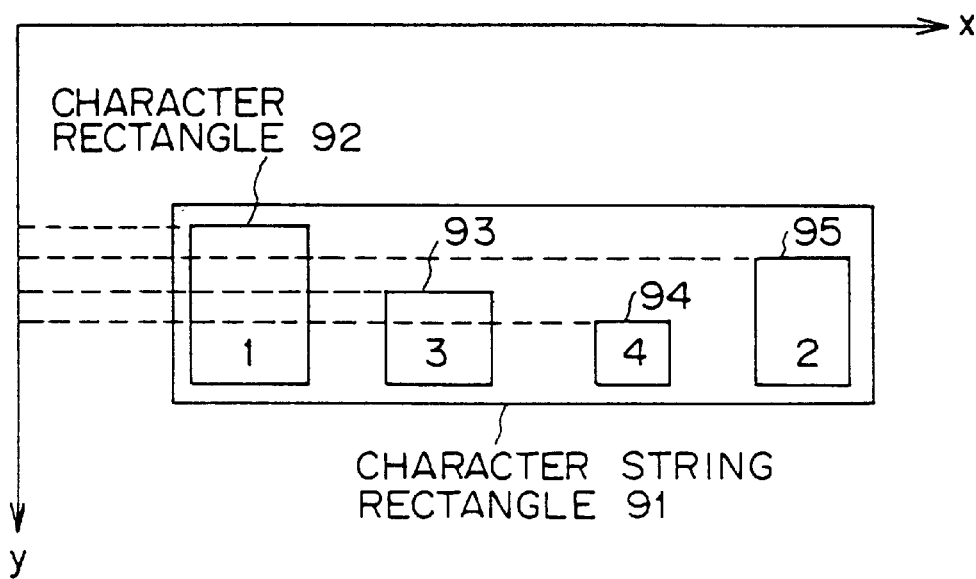
FIG. 58 is a schematic diagram showing the order of character rectangles in a character string rectangle.
Figure 59:
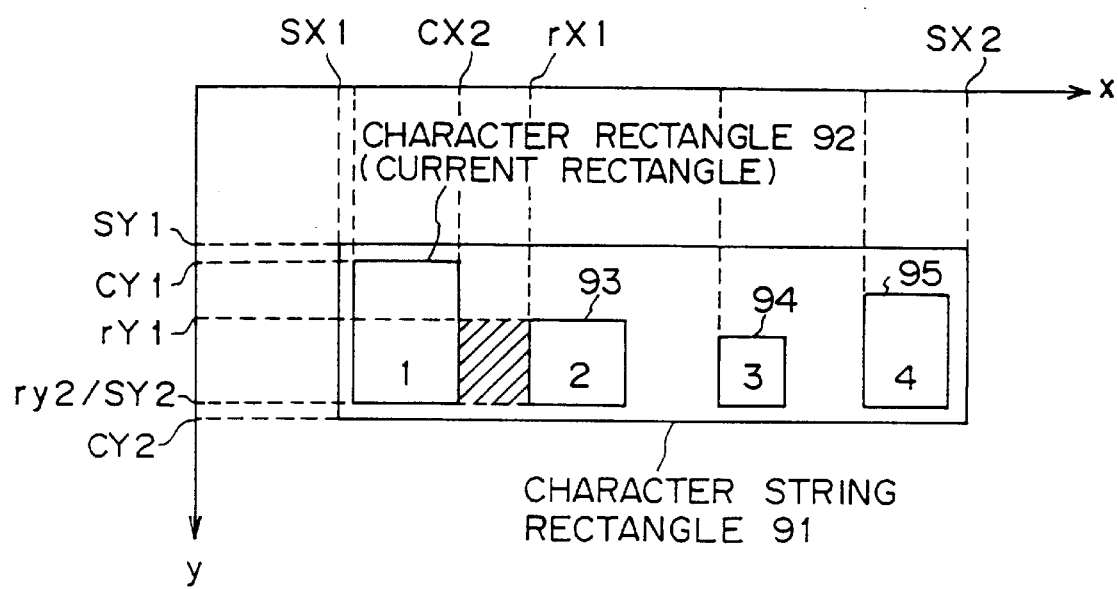
FIG. 59 is a schematic diagram showing the order of character rectangles that have been sorted.

For example, in the case of a character string rectangle 91 shown in FIG. 58, before the character string dividing process is performed, character rectangles 92, 95, 93, and 94 are sorted in that order and stored. These character rectangles are then resorted in the order of x coordinate values. Thus, the character rectangles 92, 93, 94, and 95 are correctly stored in the order as shown in FIG. 59.

Next, the x coordinate of the left edge of a character string rectangle, the x coordinate of the right edge thereof, the y coordinate of the upper edge thereof, and the y coordinate of the lower edge thereof, are denoted by sx1, sx2, sy1, and sy2, respectively (at step S172). In addition, the leftmost character rectangle of the character string rectangle is defined as a current rectangle (at step S173). The y coordinate of the upper edge of the current rectangle, the y coordinate of the lower edge thereof, and the x coordinate of the right edge thereof, are denoted by cy1, cy2, and cx2 (at step S174). The y coordinate of the upper edge of a character rectangle disposed on the right of the current rectangle, the y coordinate of the lower edge thereof, and the x coordinate of the left edge thereof, are denoted by ry1, ry2, and rx1 (at step S175).

Next, it is determined whether or not black pixels are present in a rectangle region surrounded by straight lines x=cx2, x=rx1, y=max (cy1, ry1), and y=min (cy2, ry2) (at step S176). This rectangle region is a region disposed between the current rectangle and a character rectangle disposed on the right of the current rectangle.

When black pixels are present in the rectangle region described above, they are treated as a vertical ruled line. The rectangle represented by coordinates x=sx1, cx2 and y=sy1, sy2 is registered as a character string rectangle. Next, sx1=rx1 is set (at step S177).

Next, it is determined whether or not a character rectangle on the right of the current rectangle is disposed at the right edge of the character string rectangle (at step S178). Otherwise, a character rectangle disposed on the right of the current rectangle is treated as a new current rectangle (at step S179). The flow returns to step S174. When no black pixels are present in the rectangle region at step S176, the flow advances to step S178.

At step S178, when a character rectangle on the right of the current rectangle is a rectangle disposed at the right edge of the character string rectangle, a character string rectangle represented by coordinates x=sx1, sx2, y=sy1, sy2 is stored as a character string rectangle (at step S180). As a result, the first character string dividing process is completed.

In the first character string dividing process, whenever a vertically ruled line is detected between the current rectangle and a rectangle on the right thereof, at least one character rectangle on the left thereof is stored as a character string rectangle. Thus, even if an original character string rectangle includes two or more vertically ruled lines, the character string rectangles are divided at their positions.

Figure 60:
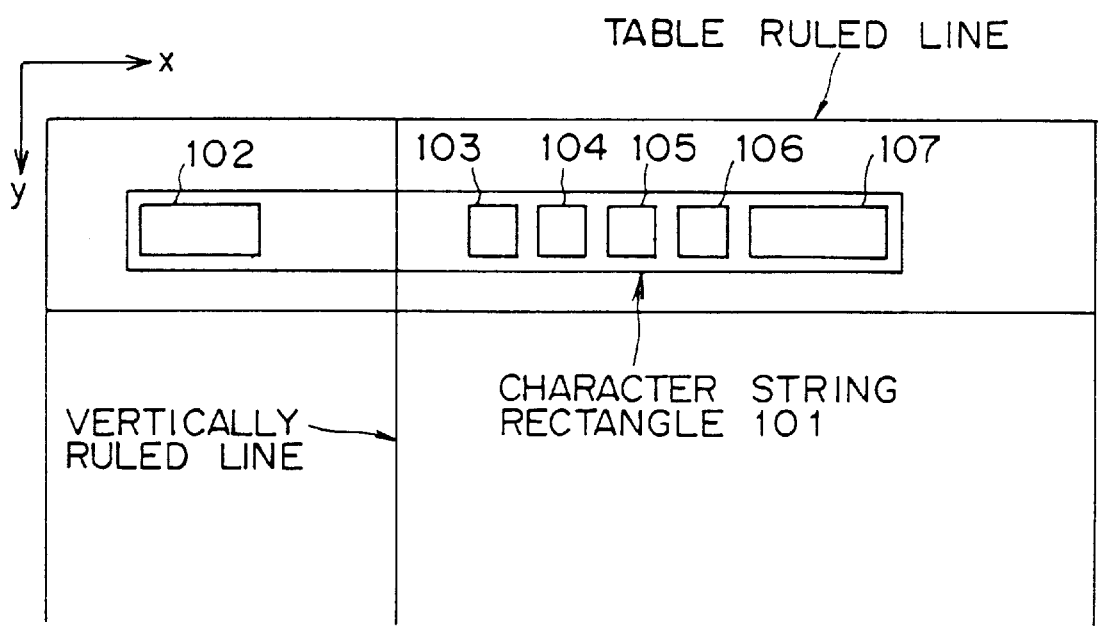
FIG. 60 is a schematic diagram showing a character string rectangle including a vertically ruled line.
Figure 61:
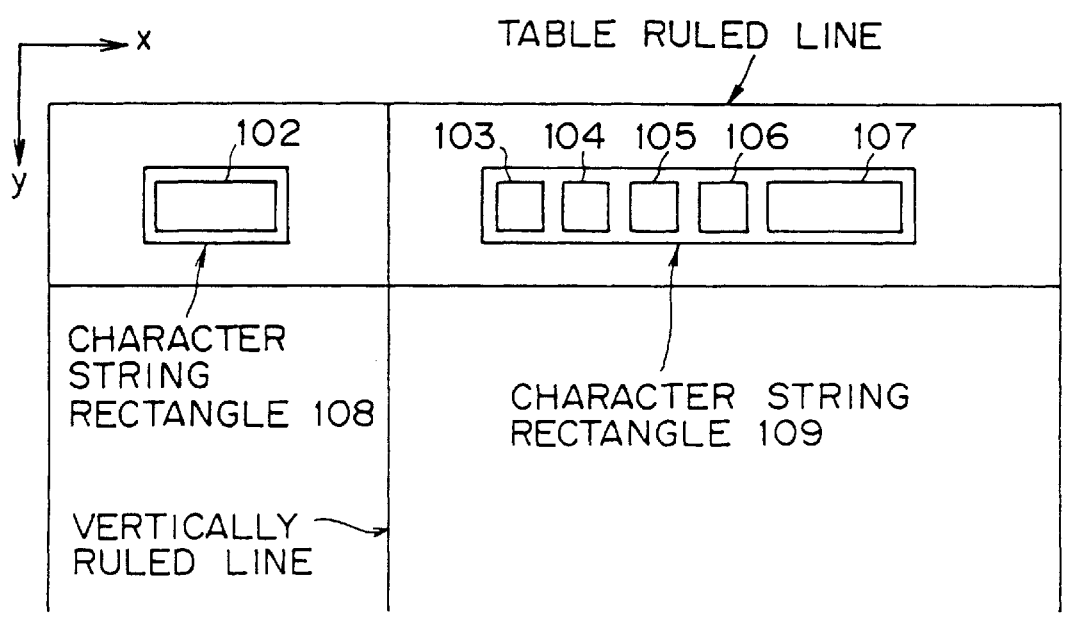
FIG. 61 is a schematic diagram showing divided character string rectangles.

For example, in the case of a character string rectangle 101 in a table as shown in FIG. 60, the character string rectangle 101 includes character rectangles 102, 103, 104, 105, 106, and 107. A vertically ruled line is disposed between the character rectangle 102 and the character rectangle 103. When the first character string dividing process is performed for the character string rectangle 101, if the character rectangle 102 is a current rectangle, black pixels are detected in a region between the character rectangle 102 and the character rectangle 103 (when the determined result at step S176 is YES). Thus, as shown in FIG. 61, a rectangle including the character rectangle 102 is registered as the character string rectangle 108 (at step S177).

Thereafter, the character rectangle 103 is treated as a new current rectangle and the similar process is performed (at step S179). However, a vertically ruled line is not detected. When the character rectangle 106 is treated as a new current rectangle, a rectangle including the character rectangles 103, 104, 105, 106, and 107 is registered as a character string rectangle 109 (at step S180). As a result, the first character string dividing process is completed. Thus, the original character string rectangle 101 is divided into the character string rectangles 108 and 109.

Figure 62:
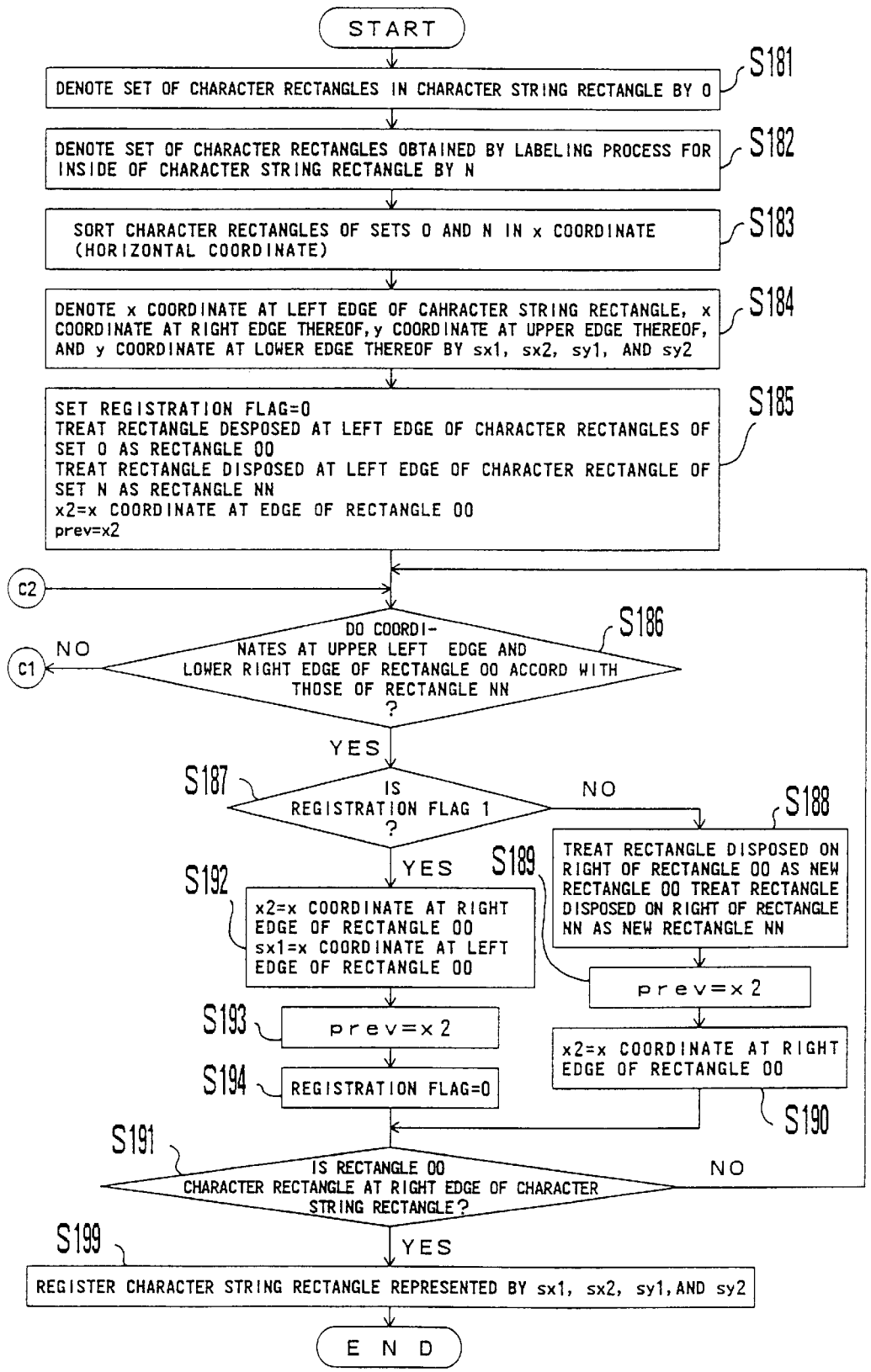
FIG. 62 is an operating flow chart showing a second character string dividing process (No. 1)
Figure 63:
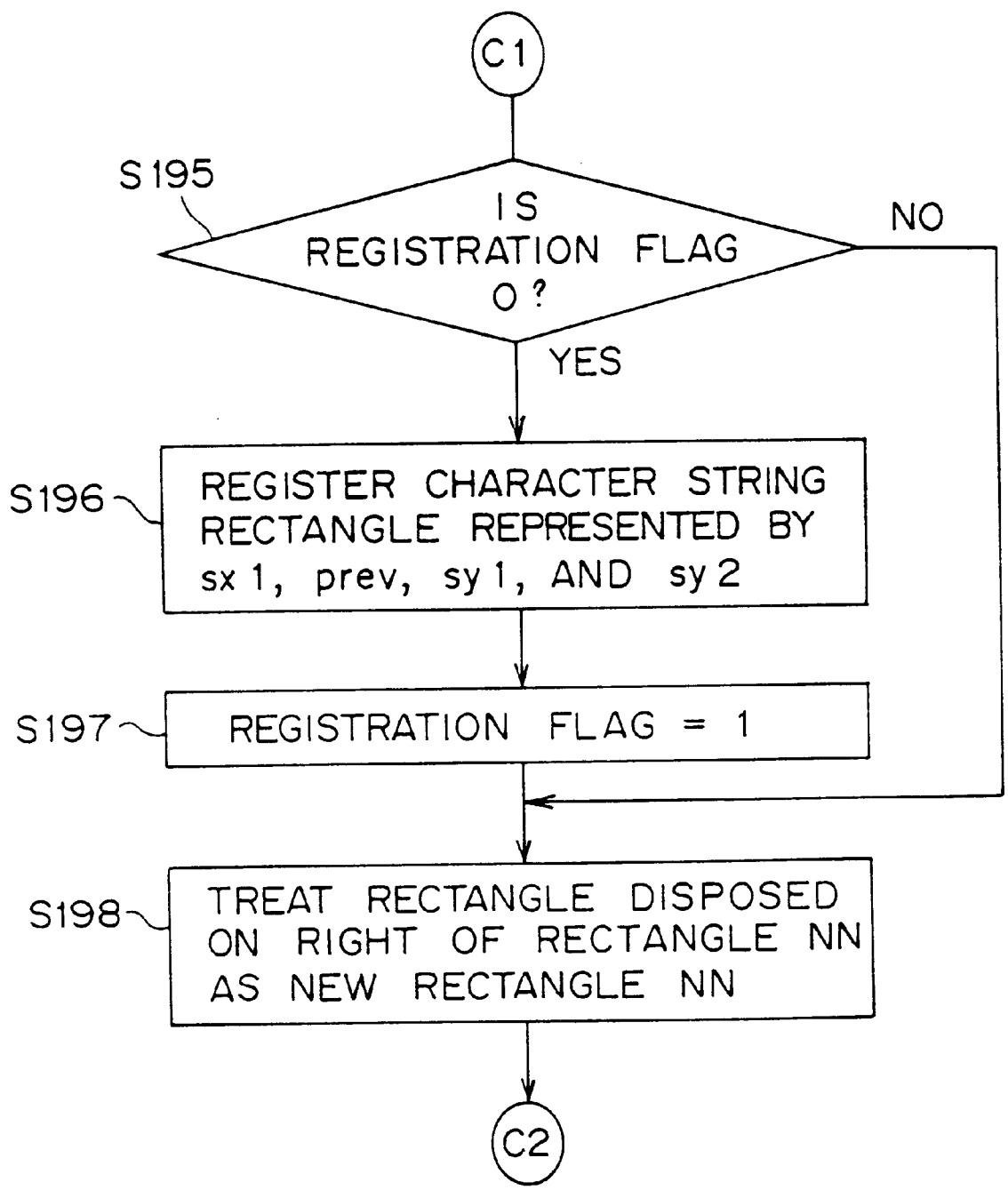
FIG. 63 is an operating flow chart showing the second character string dividing process (No. 2)

FIGS. 62 and 63 are operating flow charts showing a second character string dividing process. In the second character string driving process, the labeling process is performed for the inside of each character string rectangle by the processor 14. At this point, coordinates of each character rectangle that compose a character string rectangle are stored. In addition, the labeling process is performed for the inside of the character string rectangle so as to obtain coordinates of character rectangles of the character string rectangle.

In the case that a part of a vertically ruled line is disposed inside a character string rectangle, when the number of rectangles of the former group is compared with that of the latter group, they differ because the number of rectangles of the latter group increases for the vertically ruled line. Thus, the character string rectangle is divided at the position where an unnecessary character rectangle is present in the latter group.

Figure 64:
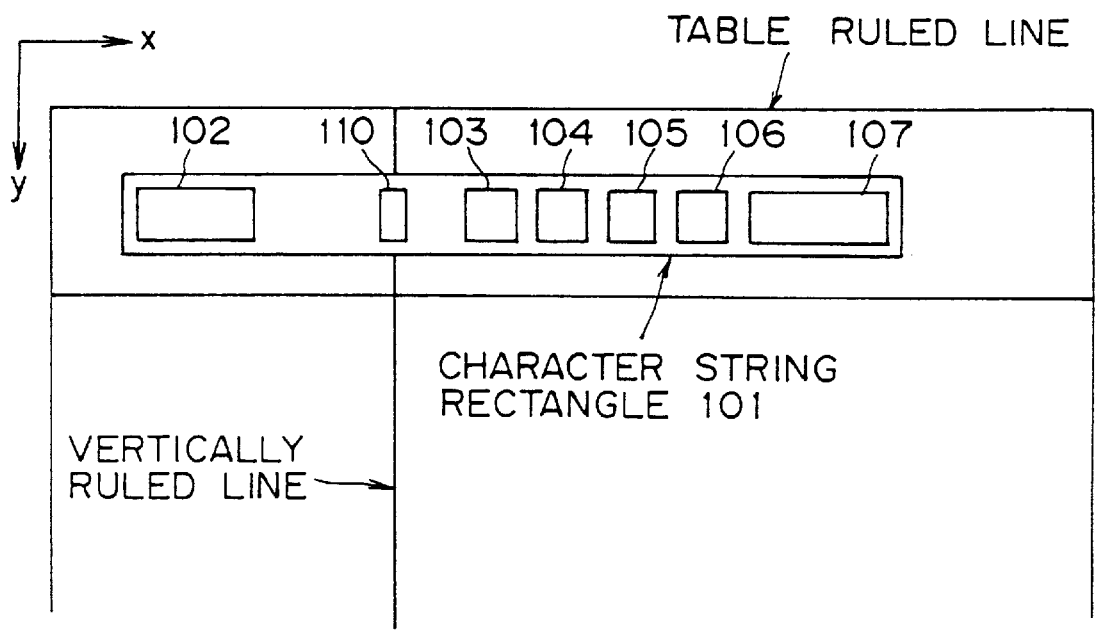
FIG. 64 is a schematic diagram showing a labeled result of a character string rectangle.

For example, in the case of the character string rectangle 101 shown in FIG. 60, when the labeling process is performed for the inside of the character string rectangle 101, character rectangles are obtained as shown in FIG. 64. When the character rectangle group shown in FIG. 60 is compared with that shown in FIG. 64, it is clear that the character rectangle group shown in FIG. 64 includes an unnecessary rectangle 110. The rectangle 110 is equivalent to a vertically ruled line included in the character string rectangle 101. At this position, the character string rectangle 101 is divided.

In FIG. 62, when the process is started, a set of character rectangles in a character string rectangle is denoted by 0 (at step S181). A set of character rectangles obtained by labeling the inside of the character string rectangle is denoted by N (at step S182). The character rectangles of the sets 0 and N are sorted on the x coordinate (at step S183). The x coordinate of the left edge of the character string rectangle, the x coordinate of the right edge thereof, the y coordinate of the upper edge thereof, and the y coordinate of the lower edge thereof, are denoted by sx1, sx2, sy1, and sy2, respectively (at step S184). The sorting process on the x coordinates is performed in the same manner as that at step S172 shown in FIG. 57.

Next, registration flag=0 is set. A character rectangle at the left edge of the set 0 is denoted by a rectangle OO. A character rectangle at the left edge of the set N is denoted by a rectangle NN. x2=x coordinate at right edge of OO and prev=x2 are set (at step S185). Thereafter, the registration flag has a value 0 or 1.

Thereafter, it is determined whether or not the coordinates at the upper left edge and the lower right edge of the rectangle OO accord with those of the rectangle NN (at step S186). When they accord with each other, it is assumed that the rectangle OO is the same as the rectangle NN. Thereafter, it is determined whether or not the registration flag is 1 (at step S187).

When the registration flag is 0, a rectangle disposed on the right of the rectangle OO is treated as a new rectangle OO. In addition, a rectangle disposed on the right of the rectangle NN is treated as a new rectangle NN (at step S188). Moreover, prev=x2 is set (at step S189). x2=x coordinate of the right edge of OO is set (at step S190). Thereafter, it is determined whether or not the rectangle OO is a character rectangle disposed at the right edge of the character string rectangle (at step S191). When another character rectangle is disposed on the right of the rectangle OO, the flow returns to step S186.

When the coordinates of the rectangle OO do not accord with those of the rectangle NN at step S186, the rectangle NN is treated as a vertically ruled line. Thereafter, it is determined whether or not the registration flag is 0 (at step S195 shown in FIG. 63). When the registration flag is 0, a rectangle represented by coordinates x=sx1, prev, y=sy1, sy2 is registered as a character string rectangle (at step S196). In addition, the registration flag=1 is set (at step S197). Thus, a rectangle including a character rectangle disposed on the left of the rectangle OO is registered as a character string rectangle.

Next, a rectangle disposed on the right of the rectangle NN treated as a vertically ruled line is treated as a new rectangle NN (at step S198). Thereafter, the flow returns to step S186. When registration flag is not 0 at step S195, the flow advances to step S198.

When the registration flag is 1 at step S187, the rectangle OO is treated as the first character of a new character string. x2=x coordinate of the right edge of rectangle OO and sx1=x coordinate of the left edge of rectangle OO are set (at step S192). In addition, prev=x2 and registration flag=0 are set (at steps S193 and S194). Thereafter, the flow returns to step S191.

When the rectangle OO is a character rectangle at the right edge of the character string rectangle at step S191, a rectangle represented by coordinates x=sx1, x2, y=sy1, sy2 is registered as a character string rectangle (at step S199). As a result, the second character string dividing process is completed. According to the second character string dividing process, whenever an unnecessary rectangle that is included in the set N, not the set 0, is detected, at least one character rectangle disposed on the left of the unnecessary rectangle is registered as a character string rectangle. Thereafter, the next rectangle of the set 0 is disposed at the left edge of the character string. Thus, a vertically ruled line that is not required is removed from the character string rectangle.

For example, in the case of the character string rectangle 101 shown in FIG. 64, the set 0 is composed of the character rectangles 102, 103, 104, 105, 106, and 107. The set N is composed of character rectangles 102, 110, 103, 104, 105, 106, and 107. When the rectangle OO is the character rectangle 103 and the rectangle NN is the character rectangle 110, the character rectangle 110 is treated as a vertically ruled line (when the determined result at step S186 is NO). Thus, a rectangle including the character rectangle 102 is registered as a character string rectangle 108 as shown in FIG. 61 (at step S196).

Thereafter, the character rectangle 103 is treated as a new rectangle NN (at step S198). A similar process is repeated. However, a rectangle corresponding to a vertically ruled line is not detected. When the character rectangle 107 is treated as the rectangle OO, a rectangle including the character rectangles 103, 104, 105, 106, and 107 is registered as a character string rectangle 109 (at step S199). As a result, the second character string dividing process is completed. Thus, as with the result of the first character string dividing process, the original character string rectangle 101 is divided into the character string rectangles 108 and 109.

Figure 65:
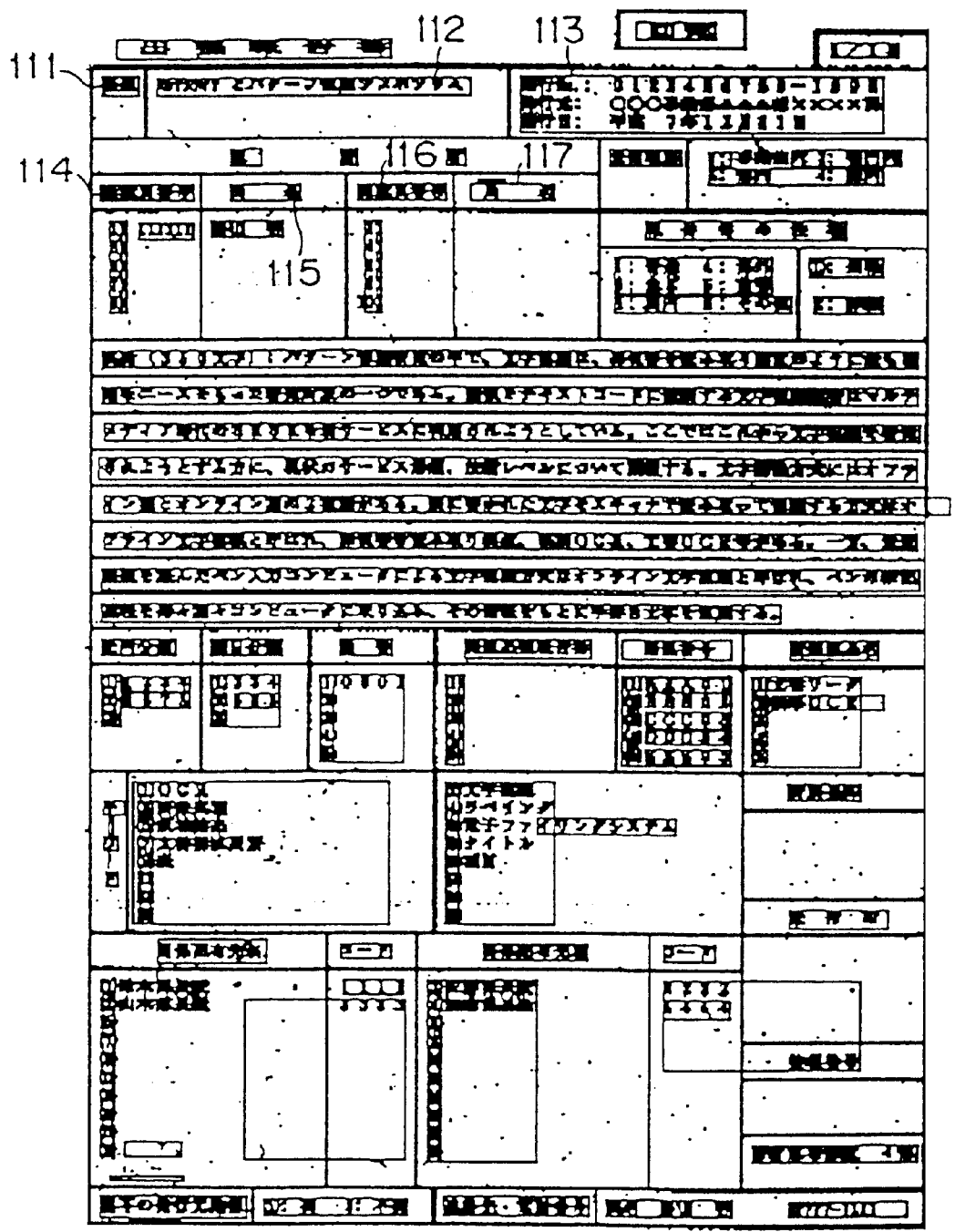
FIG. 65 is a schematic diagram showing character string rectangles on which the dividing process has been performed.

When the first and second character string dividing processes are compared, although these functions are basically the same, the first character string dividing process is faster than the second character string dividing process. FIG. 65 is a schematic diagram showing a result of the character string dividing process performed for the character string rectangle shown in FIG. 56. When the results shown in FIGS. 56 and 65 are compared, it is clear that the original character string rectangle 81 is divided into the character string rectangles 111, 112, and 113, that the character string rectangle 82 is divided into the character string rectangles 114 and 115, and that the character string rectangle 83 is divided into the character string rectangles 116 and 117.

After the character string rectangle has been divided into smaller character string rectangles, the flow advances to step S149 shown in FIG. 52. At step S149, the number of characters of the character string rectangle is calculated, corresponding to the shapes of the character rectangles, by the processor 14. In this example, the number of characters is extracted corresponding to the aspect ratio of each character rectangle.

FIG. 66 is a schematic diagram showing the relation of character rectangles and the number of characters. In FIG. 66, the height of each of the character rectangles and the width thereof are denoted by H and W, respectively. It is considered that the height of one character is almost equal to the width thereof. Thus, the number of characters in the character rectangle can be represented by [W/H] (where [W/H] is a calculation symbol that represents that the decimal of the real number W/H is truncated).

Figure 67:
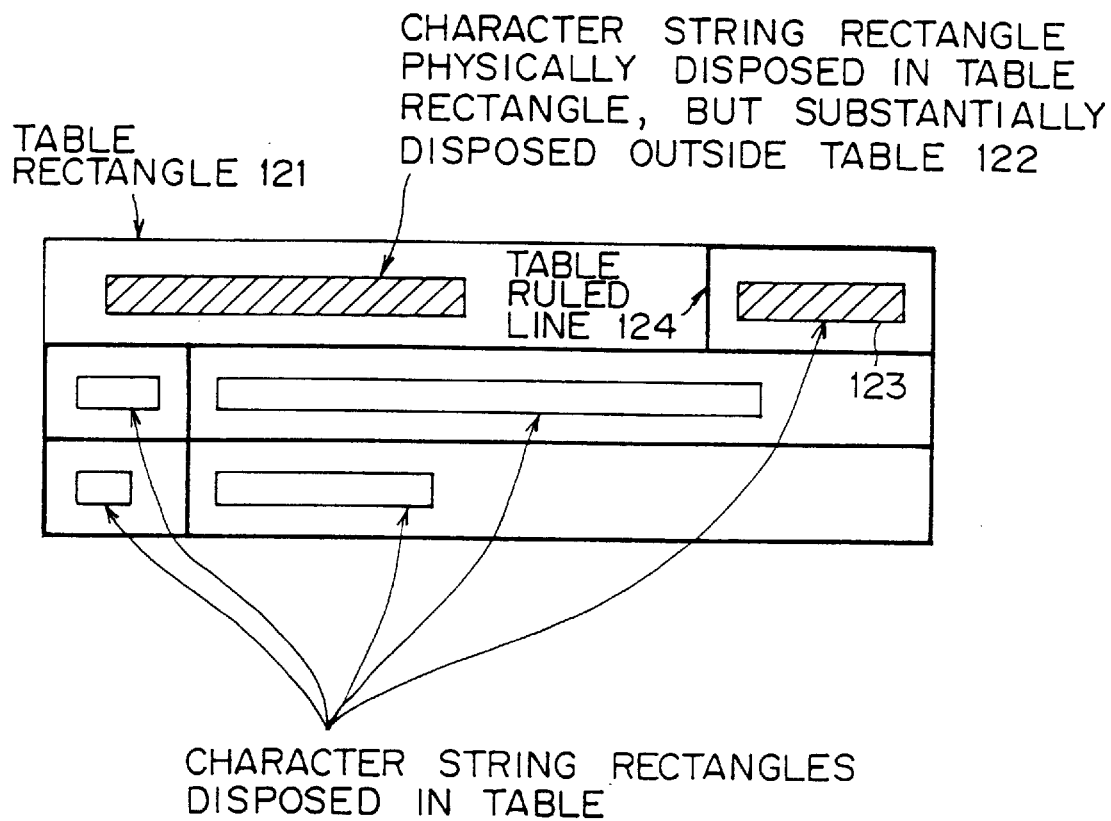
FIG. 67 is a schematic diagram showing an out-of-of-table character string rectangle in a table rectangle.

By the character string dividing process at step S148, character string rectangles in a table rectangle are correctly divided. However, the table rectangle may include a character string rectangle that is actually disposed outside the table. FIG. 67 is a schematic diagram showing an example of an out-of-table character string rectangle disposed in a table rectangle. In FIG. 67, since the periphery of table ruled lines 124 denoted by solid lines is not rectangular, a table rectangle 121 includes a character string rectangle 122 disposed outside the table. On the other hand, a character string rectangle 123 disposed on the same line as the character string rectangle 122 is an in-table character string rectangle.

Figure 68:
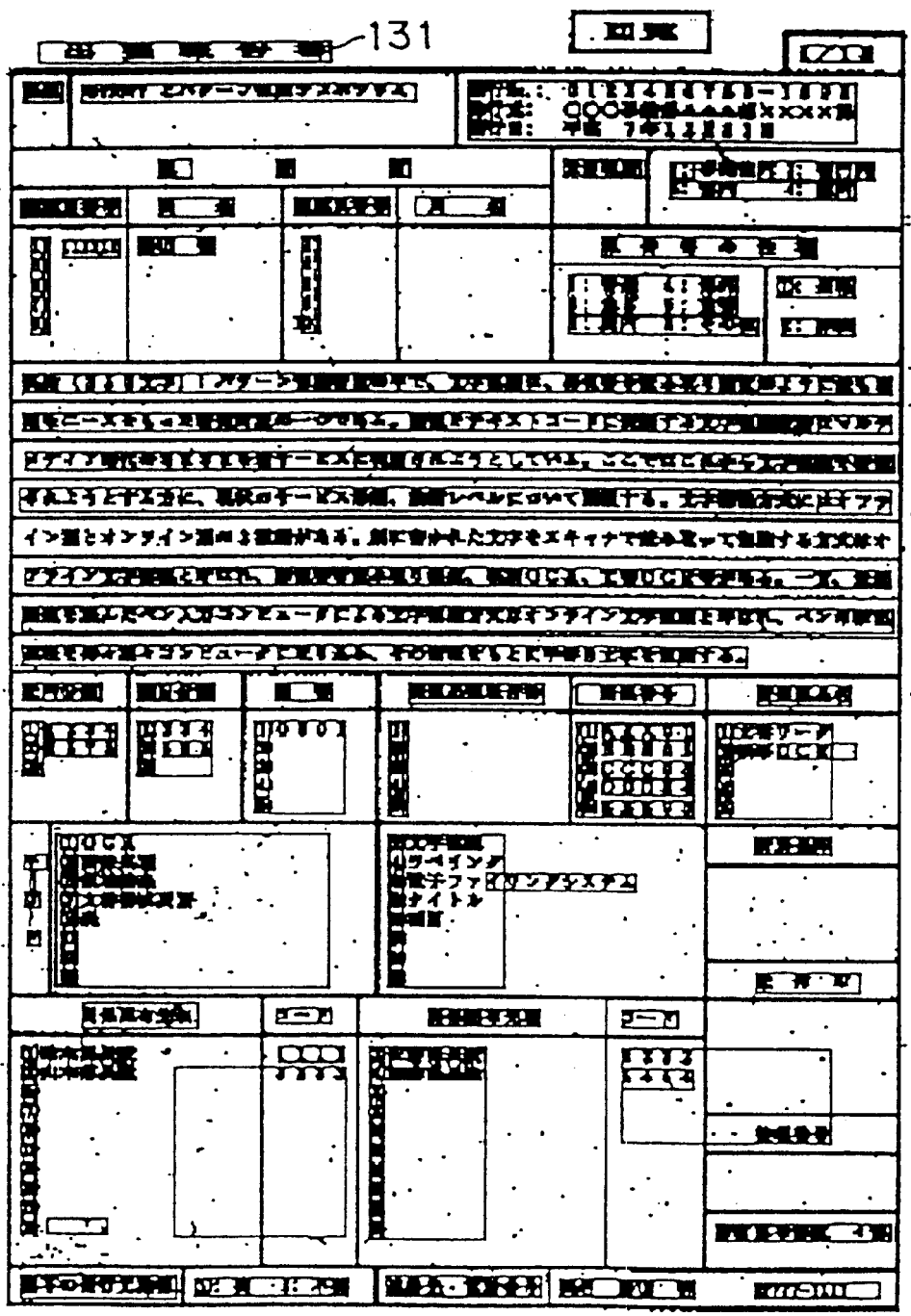
FIG. 68 is a schematic diagram showing character string rectangles in a table rectangle.

FIG. 68 is a schematic diagram showing a character string rectangle in the table rectangle 80 shown in FIG. 54. A character string rectangle 131 of character string rectangles shown in FIG. 68 is an out-of-table character string rectangle. To extract a title from the table, out-of-table character string rectangles, such as the character string rectangles 122 and 131, should be distinguished from in-table character string rectangles and the out-of-table character string rectangles should be removed from the table rectangle.

Thus, at step S150, it is determined whether or not a ruled line is disposed above a character string rectangle that does not adjoin an upper character string rectangle. When a ruled line is not disposed, the character string rectangle is removed.

Figure 69:
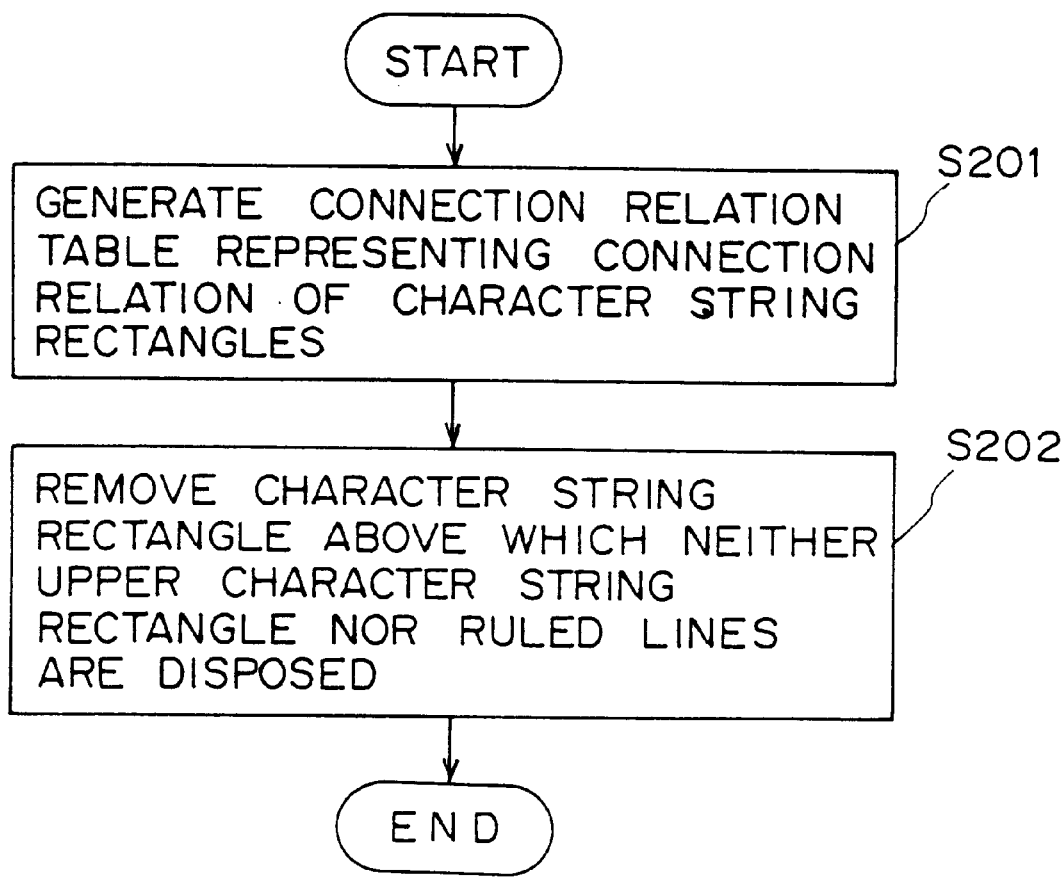
FIG. 69 is an operating flow chart showing an upper ruled line checking process.

FIG. 69 is an operating flow chart showing the upper ruled line checking process. In FIG. 69, when the process is started, a connection relation table that represents a connection relation of character string rectangles is generated in the same manner as that at step S42 shown in FIG. 24 (at step S201). With the connection relation table, character string rectangles above which other character string rectangles are not disposed are obtained. When ruled lines are not disposed above the character string rectangles, they are removed (at step S202). As a result, the upper ruled line checking process is completed.

Figure 70:
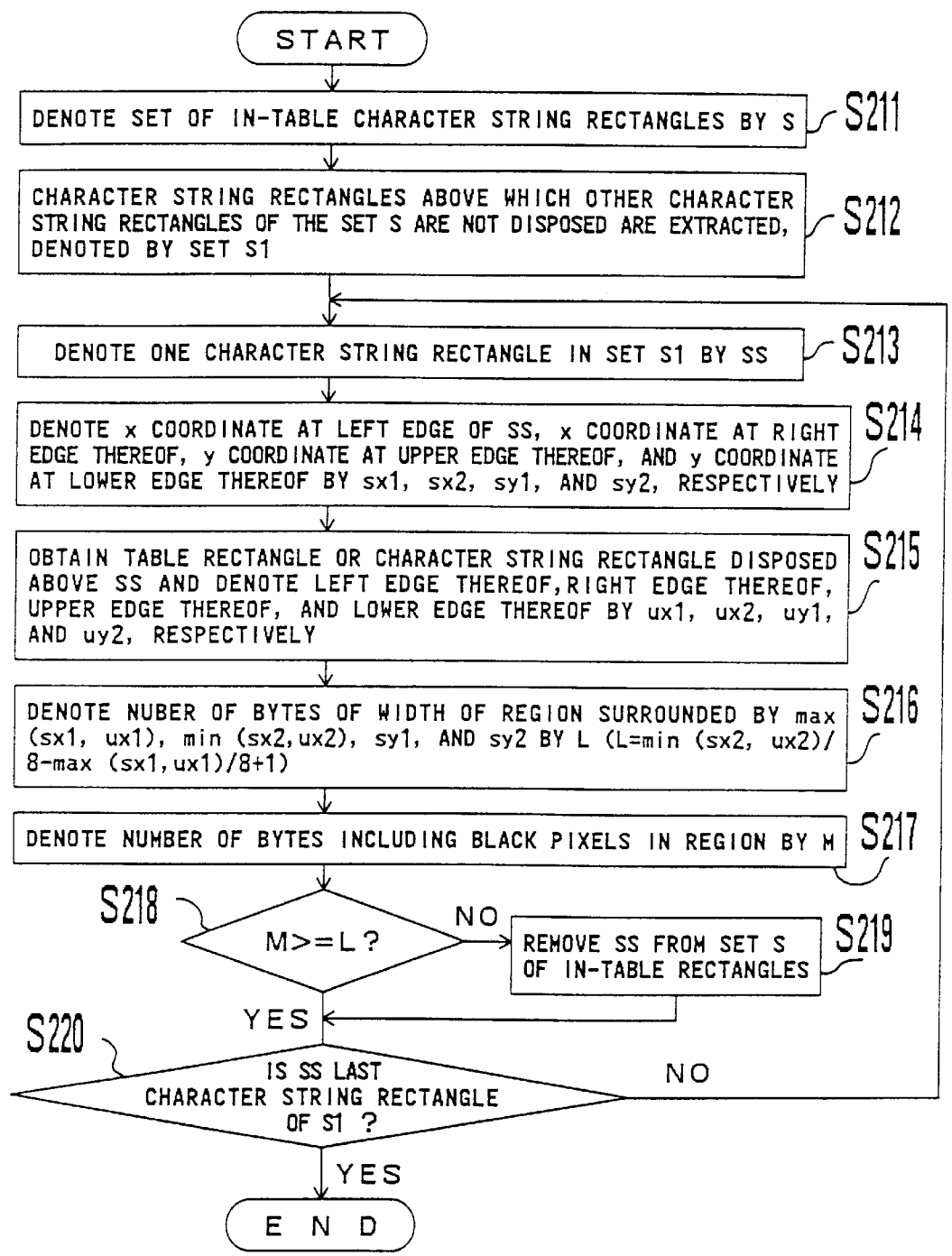
FIG. 70 is an operating flow chart showing an out-table character string rectangle removing process.

FIG. 70 is an operating flow chart showing the out-of-table character string rectangle removing process at step S202. In the out-of-table character string rectangle removing process shown in FIG. 70, with reference to the connection relation table of all character string rectangles in the table rectangle, character string rectangles above which other character string rectangles are not disposed are extracted. A predetermined region of each of the extracted character string rectangles is searched for the number of bytes of black pixels. In this example, eight pixels is equal to one byte. The number of bytes is denoted by M.

When the total M is equal to or larger than a threshold L that represents the width of the search range in bytes, it is assumed that a horizontally ruled line is present in the range. The character string rectangle is registered as an in-table character string rectangle. When there is a character string rectangle that satisfies the relation of M<L, it is assumed that a horizontally ruled line is not disposed above the character string rectangle. This character string rectangle is removed as an out-of-table character string rectangle.

In FIG. 70, when the process is started, a set of character string rectangles in the table rectangle is denoted by a set S of in-table character string rectangles (at step S211). Thereafter, character string rectangles above which other character string rectangles of the set S are not disposed are extracted. The extracted character string rectangles are denoted by a set S1 (at step S212). In the case of the table rectangle shown in FIG. 67, the character string rectangles 122 and 123 being hatched are elements of the set S1.

Next, one character string rectangle in the set S1 is denoted by SS (at step S213). The x coordinate of the left edge of the character string rectangle SS, the x coordinate of the right edge thereof, the y coordinate of the upper edge thereof, and the y coordinate of the lower edge thereof, are denoted by sx1, sx2, sy1, and sy2, respectively (at step S214).

Next, a table rectangle disposed above the character string rectangle SS or a character string rectangle that is not a table rectangle is obtained. The x coordinate of the left edge of the obtained table rectangle, the x coordinate of the right edge thereof, the y coordinate of the upper edge thereof, and the y coordinate of the lower edge thereof, are denoted by ux1, ux2, uy1, and uy2 (at step S215). At this point, table rectangles extracted at step S161 shown in FIG. 55 as the other table rectangle and stored in the file large__4bai are referenced.

Next, the number of bytes of the width of a rectangle region surrounded by straight lines x=max (sx1, ux1), x=min (sx2, ux2), y=sy1, and y=uy2 is denoted by L (at step S216). The width of the rectangle region is equivalent to the overlap portion of the width of the character string rectangle SS and the width of the rectangle disposed above the character string rectangle SS. In this example, the number of bytes L is given by the following formula.

$$L=\min(sx2, ux2)/8 - \max(sx1, ux1)/8 + 1$$

Next, black pixels in the rectangle region are obtained. The total M as the number of bytes of the black pixels is obtained (where eight pixels is equal to one byte) (at step S217).

Figure 71:
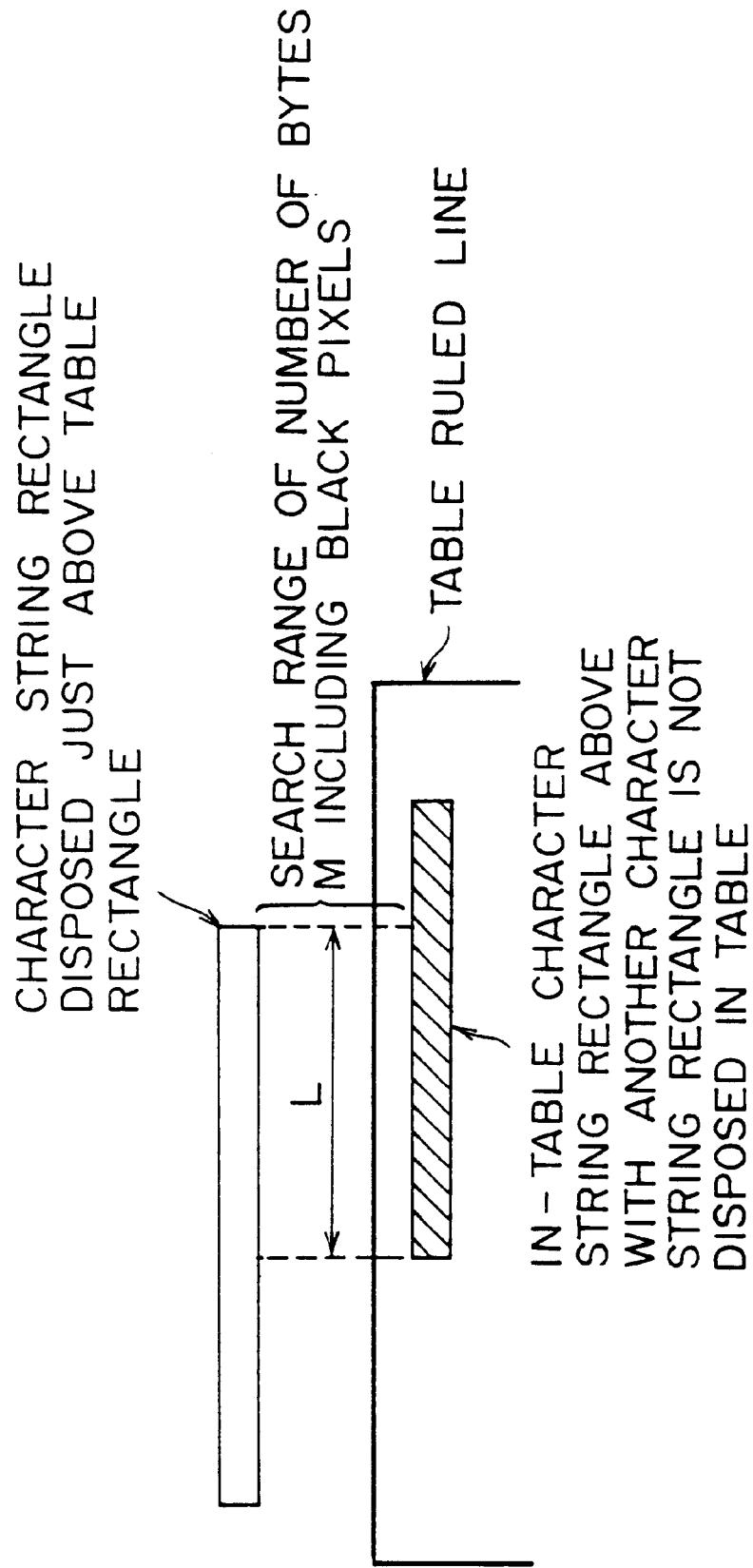
FIG. 71 is a schematic diagram showing a first search range.
Figure 72:
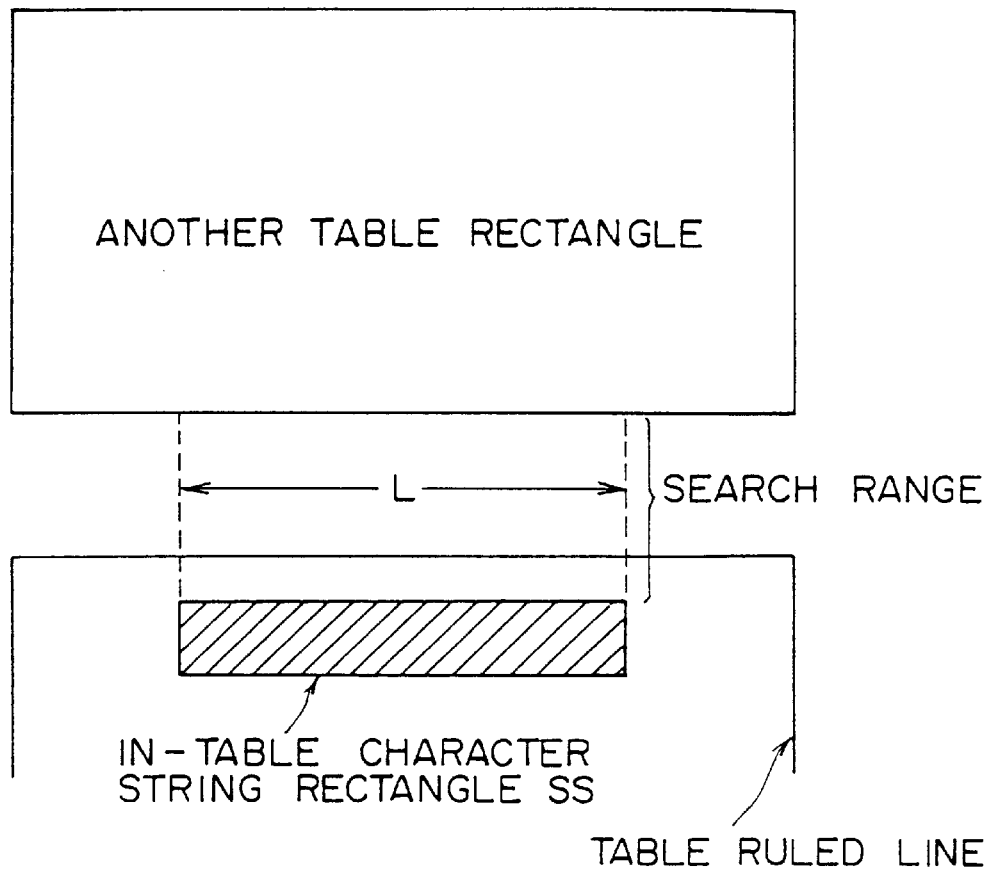
FIG. 72 is a schematic diagram showing a second search range.

When a rectangle disposed above the character string rectangle SS obtained at step S215 is a character string rectangle, the number of bytes L at step S216 and the search range of black pixels at step S217 are as shown in FIG. 71. When a rectangle disposed above the character string rectangle SS is another table rectangle, the number of bytes L at step S216 and the search range of black pixels at step S217 are as shown in FIG. 72.

Next, the total M is compared with the number of bytes L (at step S218). When the total M is less than L, it is assumed that a horizontally ruled line is not disposed above the character string rectangle SS. Thus, the character string rectangle SS is treated as an out-of-table character string rectangle. Thus, the character string rectangle SS is removed from the set S (at step S219).

Next, it is determined whether or not the character string rectangle SS is the last character string rectangle of the set S1 (at step S220). When the character string rectangle SS is not the last character string rectangle, the flow returns to step S213. After all the character string rectangles of the set S1 have been processed, the out-of-table character string rectangle removing process is completed.

Figure 73:
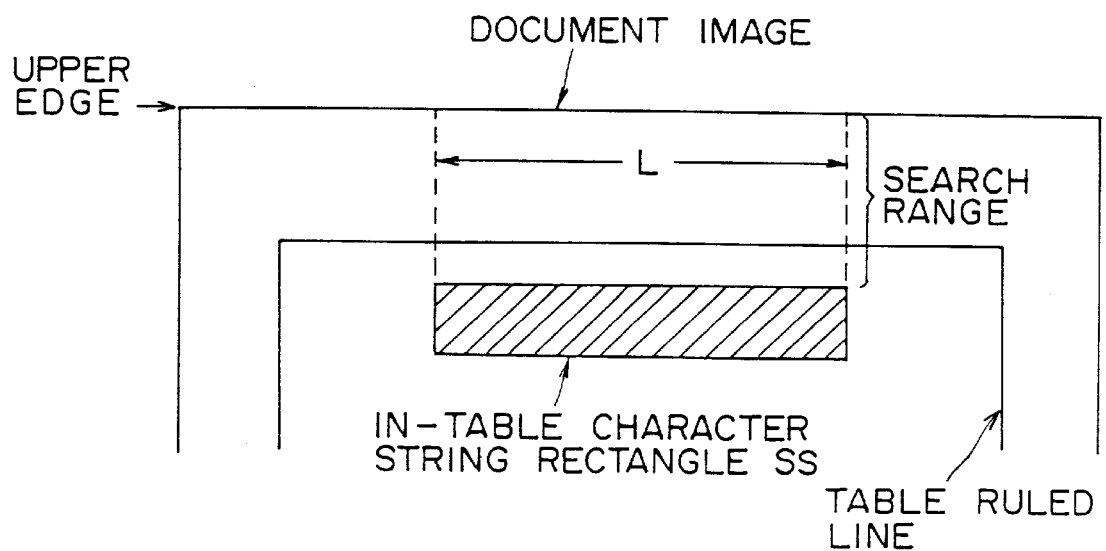
FIG. 73 is a schematic diagram showing a third search range.

At step S215, when neither a table rectangle, nor a character string rectangle is disposed above the character string rectangle SS, the range of up to the upper edge of the document image is searched at step S217 so as to obtain black pixels. FIG. 73 is a schematic diagram showing the search range. The width accords with the width of the character string rectangle SS.

Figure 74:
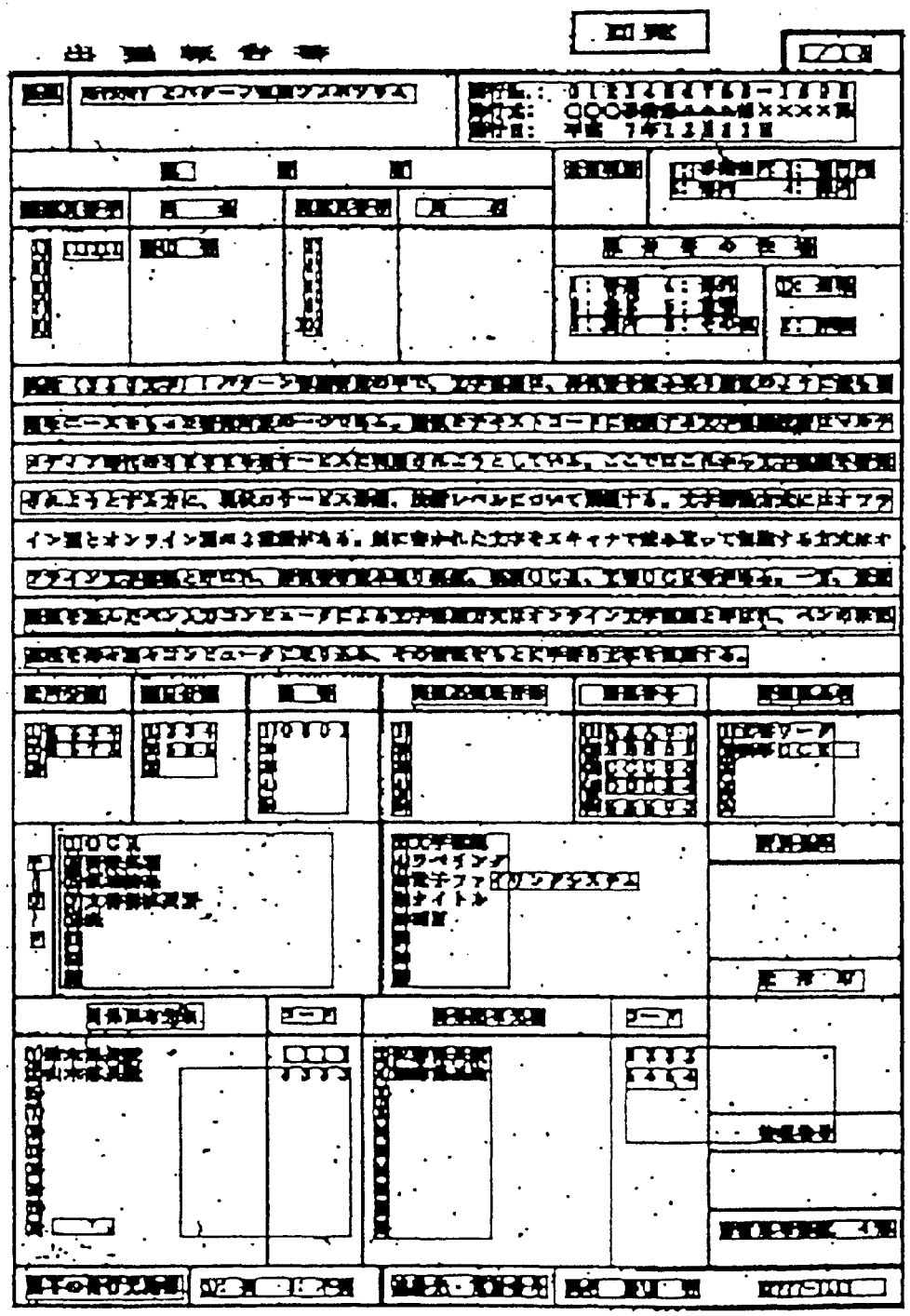
FIG. 74 is a schematic diagram showing character string rectangles of which an out-of-table character string rectangle has been removed.

By the process shown in FIG. 70, the out-of-table character string rectangle 131 shown in FIG. 68 is removed. FIG. 74 shows the remaining in-table character string rectangles. Title alternatives are extracted from the obtained in-table character string rectangles corresponding to the relations of the positions and number of characters.

Figure 75:
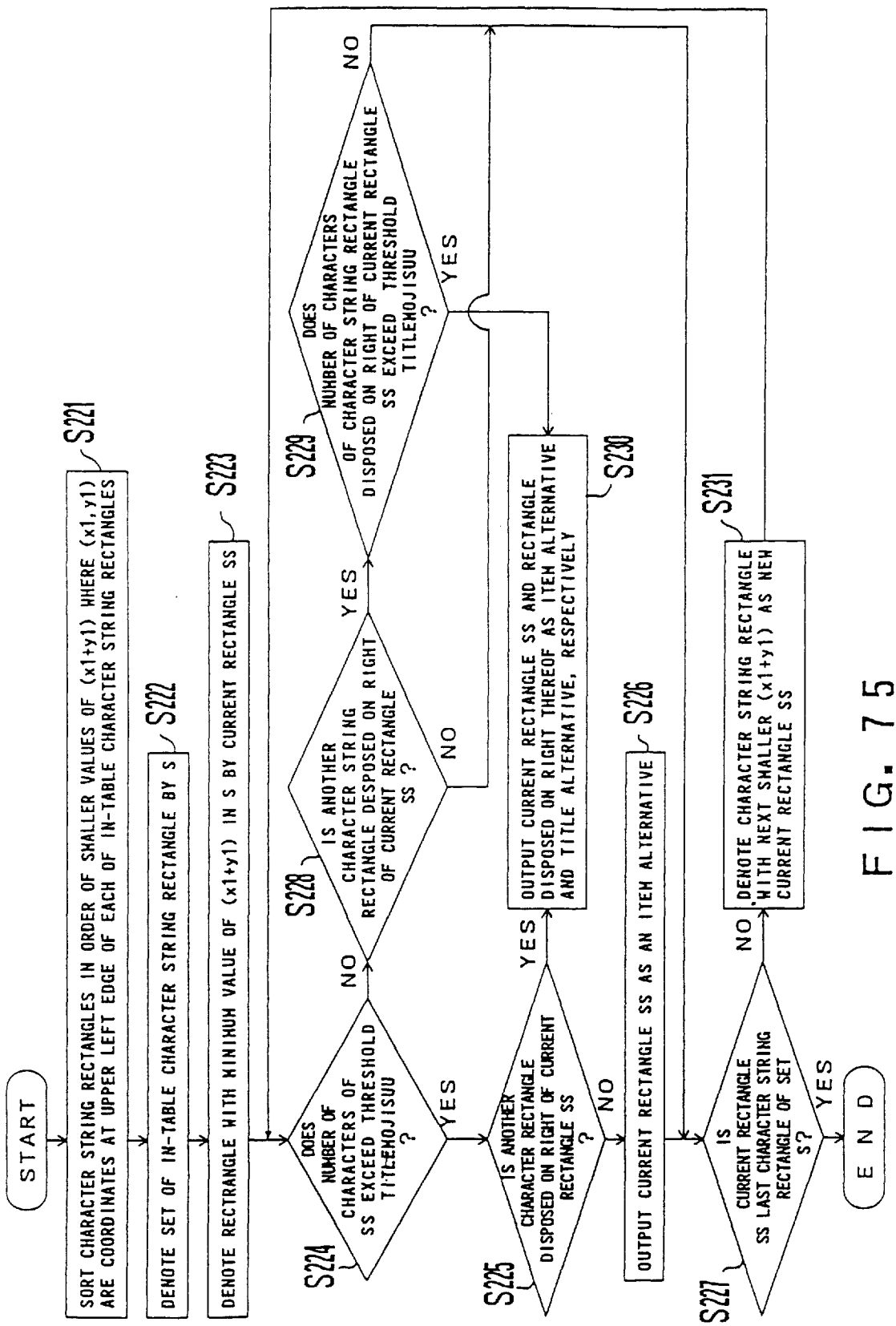
FIG. 75 is an operating flow chart showing a title alternative outputting process.

FIG. 75 is an operating flow chart showing a title alternative output process performed at steps S151 and S152 shown in FIG. 52. In the case of a horizontally written document, a character string disposed at a position closest to the upper left edge is likely to be a title. Thus, in the title alternative output process shown in FIG. 75, character string rectangles are sorted in the order of positions closer to the upper left edge of the table. Thereafter, in-table title alternatives are assigned corresponding to the order and the information of the number of characters obtained at step S149. The title alternatives are output in this order.

The priority order of the title alternatives can be assigned mainly using the following three methods.

(w) Title alternatives that are closer to the upper left edge of the table are assigned a higher priority.

(x) The number of characters of each of adjacent character string rectangles is checked. Corresponding to the number of characters, the priority order of title alternatives is assigned for the character string rectangles. Item names that represent titles such as "title" and "subject" may be disposed on the left (or above) titles. The relation of these item names and titles can be represented by the number of characters. When a character string consisting of several characters up to ten, and several characters are disposed on the right or below a character string consisting of two to several characters, it can be determined that there is a pair of an item name and a title. A higher priority is assigned to these pairs.

(y) A higher priority is assigned to character string rectangles that consist of a predetermined number of characters and that have a relation of the number of characters against adjacent character string rectangles in the order of positions closer to the upper left edge of the table.

In this case, character string rectangles in the table are checked from the upper left edge of the table. When the number of characters of a current character string rectangle exceeds a predetermined threshold, it is treated as an item alternative. In addition, when another character string rectangle is disposed on the right of the current character string rectangle, it is treated as a title alternative regardless of the number of characters thereof.

In other words, when both an item and a title are disposed in one region as with "item: title", the title can be extracted. Thus, even if one character string rectangle includes both elements, the title can be extracted. In addition, a character string rectangle that consists of many characters is likely to be an in-table title. Even if such a character string rectangle is output as an item alternative, when it is likely to be a title corresponding to the result of character recognition, it can be treated as a title.

In the case that the number of characters of a current character string rectangle is less than the threshold, when another character string rectangle is disposed on the right of the current character string rectangle and the number of characters of the other character string rectangle exceeds the threshold, the current character string rectangle is treated as an item alternative and the other character string rectangle is treated as a title alternative.

Experimental results of the methods (w), (x), and (y) for 20 types of document images show that the method (y) is superior to the methods (w) and (x) in in-table title extracting performance. In the process shown in FIG. 75, the priority is assigned corresponding to the method (y).

Figure 76:
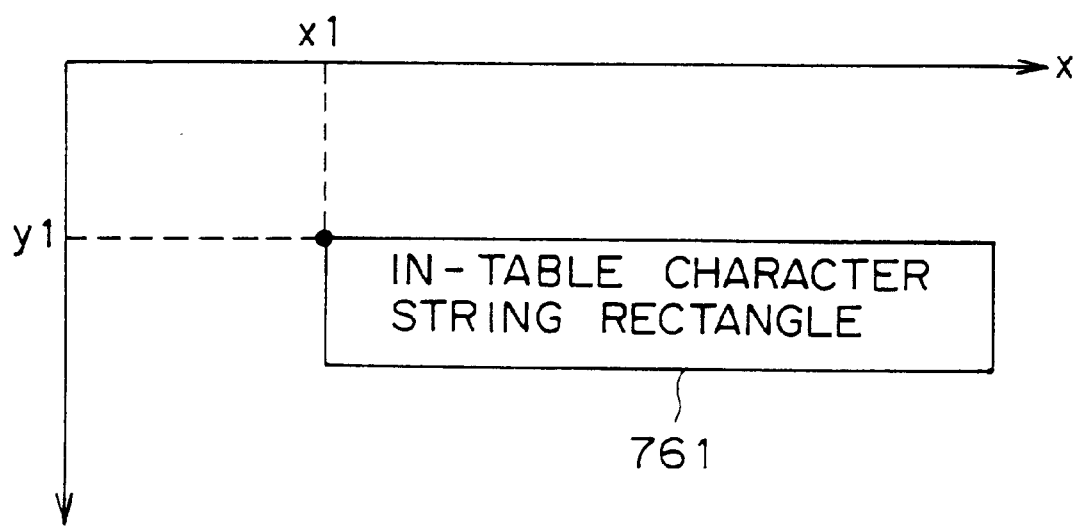
FIG. 76 is a schematic diagram showing coordinates of the upper left edge of a character string rectangle.

In FIG. 75, when the process is started, with the coordinates (x1, y1) of the upper left edge of each of in-table character string rectangles 761 in FIG. 76, they are sorted in the order of (x1+y1) (at step S221). The set of the in-table character string rectangles 761 is denoted by S (at step S222). An in-table character string rectangle that has the smallest value of (x1+y1) in the set S is denoted by a current rectangle SS (at step S223).

Next, it is determined whether or not the number of characters of the current rectangle SS is larger than a threshold TITLEMOJISUU (at step S224). For example, TITLEMOJISUU=7 is set. When the number of characters of the current rectangle SS is equal to or larger than TITLEMOJISUU, it is determined whether or not another character string rectangle is disposed on the right of the current rectangle SS (at step S225). When another character string rectangle is not disposed on the right of the current rectangle SS, it is output as an item alternative (at step S226). Next, it is determined whether or not the current rectangle SS is the last character string rectangle (at step S227). When the current rectangle SS is not the last character string rectangle, a character string rectangle with the next smaller value of (x1+y1) is treated as a new current rectangle SS (at step S231). Thereafter, the flow returns to step S224.

When a character string rectangle is disposed on the right of the current rectangle SS at step S225, the current rectangle SS is output as an item alternative. The character string rectangle disposed on the right of the current rectangle SS is output as a title alternative (at step S230). Thereafter, the flow advances to step S227.

When the number of characters of the current rectangle SS is less than the threshold TITLEMOJISUU at step S224, it is determined whether or not another character string rectangle is disposed on the right of the current rectangle SS (at step S228). When another character string rectangle is disposed on the right of the current rectangle SS, it is determined whether or not the number of characters is larger than the threshold TITLEMOJISUU (at step S229). When the number of characters exceeds the threshold TITLEMOJISUU, the flow advances to step S230.

When another character string rectangle is not disposed on the right of the current rectangle SS at step S228 or when the number of characters of the character string rectangle disposed on the right of the current rectangle SS is less than the threshold TITLEMOJISUU at step S229, the flow advances to step S227. When the current rectangle SS is the last character string rectangle at step S227, the title alternative output process is completed.

According to the title alternative output process, character string rectangles that satisfy the following three conditions are output as item alternatives or title alternatives.

(α) When the number of characters of the current rectangle exceeds the threshold and another character string rectangle is not disposed on the right of the current rectangle, the current rectangle is output as an item alternative.

(β) When the number of characters of the current rectangle exceeds the threshold and another character string rectangle is disposed on the right of the current rectangle, the current rectangle is output as an item alternative and the character string rectangle disposed on the right of the current rectangle is output as a title alternative.

(γ) When the number of characters of the current rectangle is less than the threshold and the number of characters of another character string rectangle disposed on the right of the current rectangle exceeds the threshold, the current rectangle is output as an item alternative and the character string rectangle disposed on the right of the current rectangle is output as a title alternative.

Figure 77:
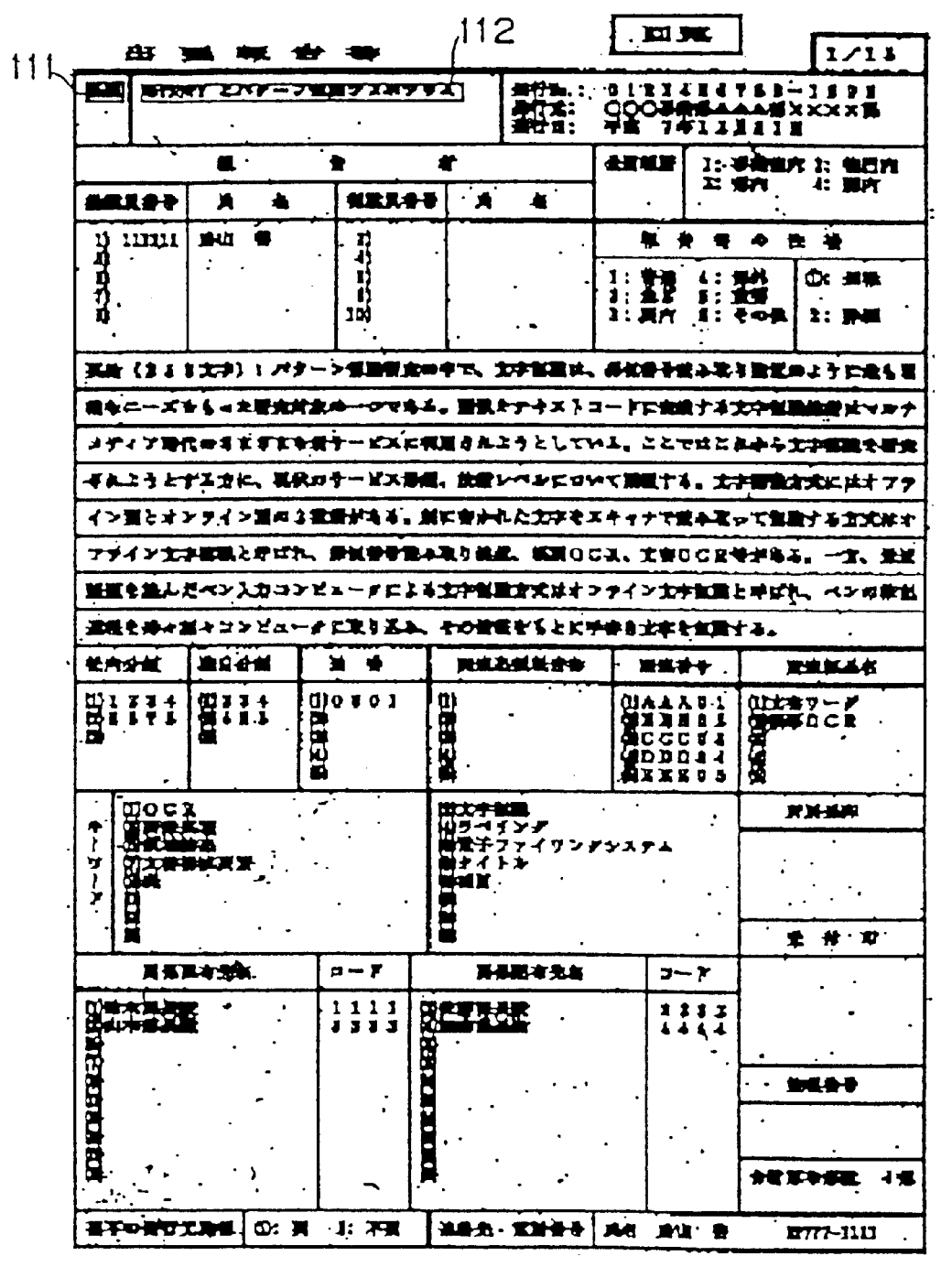

FIG. 77 is a schematic diagram showing a first alternative of the in-table title. In FIG. 77, a character string rectangle 111 is an item alternative. A character string rectangle 112 is a title alternative. According to the in-table title extracting process, regions for items and a title in the table can be extracted from document images, including various tables, without the need to use special operations and dictionaries.

Character string rectangles extracted as item alternatives and title alternatives are recognized as character strings by the same process as that at step S11 shown in FIG. 3. At this point, actually, a character string that is extracted as an item alternative may include a title character string. Thus, a proper portion of the recognized result is used as an item name or a title.

According to the present invention, the shapes of character regions and character string regions may not be always rectangular. Instead, regions of any shape surrounded by straight lines or curved lines may be used.

It should be noted that the present invention can be applied for any patterns, such as symbols and figures, as well as documents.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a particular character string region of the character string regions, according to attributes of a plurality of character string regions generated by said character string region generating means, as a title region, wherein said character region generating means is adapted for obtaining circumscribed rectangles of the black pixel connected regions as the character regions, and wherein said character string region generating means is adapted for generating a histogram of frequency values of lengths of sides of the circumscribed rectangles in the document image, generating a relation table of a predetermined frequency value and a length of a maximum side corresponding to the predetermined frequency value, obtaining a length of a first side, having a high frequency value of the document image, using the relation table, and generating the character string regions corresponding to the length of the first side.

2. The title extracting apparatus as set forth in claim 1, wherein said character string region generating means is adapted for determining the length of the first side corresponding to the length of a side of which the frequency value varies more than a predetermined value in the relation table.

3. The title extracting apparatus as set forth in claim 1, wherein said character string region generating means is adapted for generating the histogram using heights or widths of the circumscribed rectangles as the lengths of the sides of the circumscribed rectangles.

4. The title extracting apparatus as set forth in claim 1, wherein said character string region generating means is adapted for generating a threshold using the length of the first side and for removing unnecessary character regions using the threshold.

5. The title extracting apparatus as set forth in claim 4, wherein said character string region generating means is adapted for removing circumscribed rectangles of tables or photographs using the threshold.

6. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a particular character string region of the character string regions, according to attributes of a plurality of character string regions generated by said character string region generating means, as a title region, wherein said character region generating means is adapted for obtaining circumscribed rectangles of the black pixel connected regions as the character regions, and wherein said character string region generating means is adapted for generating a first histogram of the circumscribed rectangles that represents a distribution of the circumscribed rectangles in a first direction using a first side of each of the circumscribed rectangles, obtaining groups of the circumscribed rectangles from a shape of the first histogram, and processing each of the groups.

7. The title extracting apparatus as set forth in claim 6, wherein said character string region generating means is adapted for generating a second histogram of the circumscribed rectangles that has a shape, and that represents a distribution of the circumscribed rectangles in a second direction using the second side of each of the circumscribed rectangles, obtaining groups of the circumscribed rectangles from the shapes of the first histogram and the second histogram, and processing each of the groups.

8. The title extracting apparatus as set forth in claim 6, wherein said character string region generating means is adapted for searching circumscribed rectangles included in the groups, obtaining circumscribed rectangles that overlap, and unifying the overlapping circumscribes rectangles into a single circumscribed rectangle.

9. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a particular character string region of the character string regions, according to attributes of a plurality of character string regions generated by said character string region generating means, as a title region, wherein said character region generating means is adapted for obtaining circumscribed rectangles of the black pixel connected regions as the character regions, said character string region generating means is adapted for generating a first histogram that represents a distribution of the circumscribed rectangles in a first direction using a first side of each of the circumscribed rectangles, obtaining groups of the circumscribed rectangles from a shape of the first histogram, and processing each of the groups, and wherein said character string region generating means is adapted for searching the circumscribed rectangles included in the groups, obtaining circumscribed rectangles that nest, and removing the nest.

10. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a particular character string region of the character string regions, according to attributes of a plurality of character string regions generated by said character string region generating means, as a title region, wherein said character region generating means is adapted for obtaining circumscribed rectangles of the black pixel connected regions as the character regions, said character string region generating means is adapted for generating a first histogram that represents a distribution of the circumscribed rectangles in a first direction using a first side of each of the circumscribed rectangles, obtaining groups of the circumscribed rectangles from a shape of the first histogram, and processing each of the groups, and wherein said character string region generating means is adapted for searching the circumscribed rectangles in a group that includes a reference first circumscribed rectangle, obtaining a second circumscribed rectangle that adjoins the first circumscribed rectangle, generating a connection relation table that represents a connection relation of the first circumscribed rectangle and the second circumscribed rectangle, and generating the character string regions with the connection relation table.

11. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a particular character string region of the character string regions, according to attributes of a plurality of character string regions generated by said character string region generating means, as a title region, wherein said character region generating means is adapted for obtaining circumscribed rectangles of the black pixel connected regions as the character regions, and wherein said character string region generating means is adapted for obtaining a second circumscribed rectangle adjacent to a reference first circumscribed rectangle, generating a connection relation table that represents a connection relation of the first circumscribed rectangle and the second circumscribed rectangle, assigning same identification information to the first circumscribed rectangle and the second circumscribed rectangle using the connection relation table, and unifying the first circumscribed rectangle and the second circumscribed rectangle into one character string region.

12. The title extracting apparatus as set forth in claim 11, wherein said character string region generating means is adapted for storing at least one of a first pointer that moves from the first circumscribed rectangle to the second circumscribed rectangle and a second pointer that moves from the second circumscribed rectangle to the first circumscribed rectangle in the connection relation table.

13. The title extracting apparatus as set forth in claim 11, wherein said character string region generating means is adapted for causing the first circumscribed rectangle and the second circumscribed rectangle not to be connected when a frame line is disposed between the first circumscribed rectangle and the second circumscribed rectangle.

14. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions;

title extracting means for extracting a particular character string region of the character string regions, according to attributes of a plurality of character string regions generated by said character string region generating means, as a title region; and segment extracting means for horizontally dividing an inside of the character string region into a plurality of partial regions, extracting a partial segment region with a large black pixel occupying ratio from each of the partial regions, unifying horizontally connected partial segment regions that have heights exceeding a predetermined threshold regardless of the heights, and extracting the unified horizontally connected partial segment regions, wherein the title region is extracted using the unified horizontally connected partial segment region.

15. The title extracting apparatus as set forth in claim 14, wherein said segment extracting means is adapted for dividing the inside of the character string region into a plurality of partial regions that overlap.

16. The title extracting apparatus as set forth in claim 14, wherein said segment extracting means is adapted for extracting a segment region that has a length similar to a width of the character string region.

17. The title extracting apparatus as set forth in claim 14, wherein said title extracting means is adapted for determining the unified horizontally connected partial segment region from an underline when the partial segment region is disposed in a lower part of the character string region, and treating the character string region as an alternative of the title region.

18. The title extracting apparatus as set forth in claim 14, wherein said segment extracting means is adapted for extracting two segment regions, having left edge coordinates and right edge coordinates, from the character string region, generating a third histogram of black pixels in a vertical direction in the vicinity of the left edge coordinates, generating a fourth histogram of black pixels in the vertical direction in the vicinity of the right edge coordinates, and determining that a frame line is disposed in the character string region when heights of the third and fourth histograms are approximately equal to a distance between the two segment regions.

19. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a particular character string region of the character string regions, according to attributes of a plurality of character string regions generated by said character string region generating means, as a title region, wherein said title extracting means is adapted for extracting an underline attribute or a frame attribute as an attribute of the character string regions, assigning a number of points to each of the character string regions corresponding to the extracted underline attribute or frame attribute, a position of each character string regions, and a relative position relation between the character string regions, and treating a character string region having the greatest number of assigned points as the particular character string region.

20. The title extracting apparatus as set forth in claim 19, wherein said title extracting means is adapted for assigning predetermined points to a character string region with the underline attribute or the frame attribute.

21. The title extracting apparatus as set forth in claim 19, wherein said title extracting means is adapted for assigning predetermined points to a character string region having a center coordinate in a first direction in a center region of the document image.

22. The title extracting apparatus as set forth in claim 19, wherein said title extracting means is adapted for assigning predetermined points to a character string region that is disposed between and spaced apart from an upper and a lower character string region.

23. The title extracting apparatus as set forth in claim 19, wherein said title extracting means is adapted for assigning predetermined points to a character string region, having a left side, that does not have a character string region positioned on the left side.

24. The title extracting apparatus as set forth in claim 19, wherein said title extracting means is adapted for determining that a second character string region, disposed in a first character string region including a frame line, has the frame attribute when a predetermined position relation in which the first character string region and the second character string region are not spaced apart by a predetermined threshold, is satisfied.

25. A title extracting apparatus for recognizing and extracting a required partial region from a document image of a document that has been converted into image data, comprising:
- character region generating means for generating character regions, including black pixel connected regions composed of connected black pixels of the document image;
- character string region generating means for unifying one or more character regions generated by said character region generating means, and for generating character string regions including one or more character regions;
- title extracting means for extracting a particular character string region of the character string regions, according to attributes of a plurality of character string regions generated by said character string region generating means, as a title region; and
- address extracting means for obtaining a relative position relation or a size of another character string region corresponding to information of a position or size of the title region, and extracting the other character string region as an address region when the relative position or size of the other character string region satisfies a predetermined condition.

26. A title extracting apparatus for recognizing and extracting a required partial region from a document image of a document that has been converted into image data, comprising:
- character region generating means for generating character regions, including black pixel connected regions composed of connected black pixels of the document image;
- character string region generating means for unifying one or more character regions generated by said character region generating means, and for generating character string regions including one or more character regions;
- title extracting means for extracting a particular character string region of the character string regions, according to attributes of a plurality of character string regions generated by said character string region generating means, as a title region; and
- sender information extracting means for obtaining a relative position relation or a size of another character string region corresponding to information of a position or size of the title region, and extracting the other character string region as a sender information region when the relative position or size of the other character string region satisfies a predetermined condition.

27. A title extracting apparatus for recognizing and extracting a required partial region from a document image of a document that has been converted into image data, comprising:
- character region generating means for generating character regions, including black pixel connected regions composed of connected black pixels of the document image;
- character string region generating means for unifying one or more character regions generated by said character region generating means, and for generating character string regions including one or more character regions; and
- title extracting means for extracting a particular character string region of the character string regions, according to attributes of a plurality of character string regions generated by said character string region generating means, as a title region, wherein said title extracting means is adapted for unifying two character string regions that adjoin and have similar sizes or coordinate values into one character string region.

28. A title extracting apparatus for recognizing and extracting a required partial region from a document image of a document that has been converted into image data, comprising:
- character region generating means for generating character regions, including black pixel connected regions composed of connected black pixels of the document image;
- character string region generating means for unifying one or more character regions generated by said character region generating means, and for generating character string regions including one or more character regions; and
- title extracting means for extracting a particular character string region of the character string regions, according to attributes of a plurality of character string regions generated by said character string region generating means, as a title region, wherein said title extracting means is adapted for assigning a ruled line attribute to a character string region when determining that a ruled line is indicated by a size or a shape of the character string region, and extracting the title region corresponding to the ruled line attribute.

29. The title extracting apparatus as set forth in claim 28, wherein said title extracting means is adapted for assigning an underline attribute to a fourth character string region disposed above a third character string region that has the ruled line attribute, and treating the fourth character string region as an alternative of the title region.

30. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a table region, including a black pixel connected region having a predetermined size, and extracting a particular character string region from a plurality of character string regions in the table region as a title region, wherein said title extracting means is adapted for dividing a fifth character string region having a ruled line at a position of the ruled line.

31. The title extracting apparatus as set forth in claim 30, wherein said title extracting means is adapted for determining whether black pixels are disposed in a plurality of character regions in the fifth character string region, and dividing the fifth character string region at the black pixels.

32. The title extracting apparatus as set forth in claim 30, wherein said title extracting means is adapted for determining a difference between character regions of the fifth character string region and character regions obtained by said character region generating means for the fifth character string region to be targeted, and dividing the fifth character string region at a position where the difference is detected.

33. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a table region, including a black pixel connected region having a predetermined size, and extracting a particular character string region from a plurality of character string regions in the table region as a title region, wherein said title extracting means is adapted for determining whether a ruled line is disposed in a particular region within a sixth character string region in the table region, and treating the sixth character string region as an out-of-table character string region when the ruled line is not disposed in the particular region.

34. The title extracting apparatus as set forth in claim 33, wherein said title extracting means is adapted for treating a character string region above which an in-table character string region is not disposed as the sixth character string region corresponding to a mutual position relation of the character string regions in the table region, searching black pixels in a particular region disposed above the sixth character string region, and determining that the ruled line is disposed in the particular region when black pixels that exceed a predetermined threshold are detected.

35. The title extracting apparatus as set forth in claim 34, wherein said title extracting means is adapted for treating a region between the sixth character string region and another character string region above the sixth character string region or a table region as the particular region, and assigning a threshold corresponding to a position relation of the sixth character string region and the other character string region or the table region.

36. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a table region, including a black pixel connected region having a predetermined size, and extracting a particular character string region from a plurality of character string regions in the table region as a title region, wherein said title extracting means is adapted for outputting the character string regions in order of positions closest to an upper left edge of the table region.

37. The title extracting apparatus as set forth in claim 36, wherein said character string region generating means is adapted for generating one or a plurality of character string rectangles, including character regions, as character string regions, and wherein said title extracting means is adapted for assigning a priority order to a plurality of character string rectangles in the table region corresponding to coordinate values of particular vertexes of the character string rectangles.

38. A title extracting apparatus for recognizing and extracting a required partial region from a document image of a document that has been converted into image data, comprising:

character region generating means for generating character regions, including black pixel connected regions composed of connected black pixels of the document image;

character string region generating means for unifying one or more character regions generated by said character region generating means, and for generating character string regions including one or more character regions; and title extracting means for extracting a table region, including a black pixel connected region having a predetermined size, and extracting a particular character string region from a plurality of character string regions in the table region as a title region, wherein said title extracting means is adapted for assigning priority order to character string regions that are likely to be an item of an item region, and character string regions that are likely to be titles of title regions, and outputting the item region and the title region.

39. The title extracting apparatus as set forth in claim 38, wherein said title extracting means is adapted for obtaining pairs of character string regions corresponding to a relation of a predetermined item, a position of a title, and a number of characters, and outputting the pairs of the character string regions in order of higher positions.

40. The title extracting apparatus as set forth in claim 38, wherein said title extracting means is adapted for outputting a seventh character string region having a number of characters equal to or larger than a predetermined threshold of the item regions.

41. The title extracting apparatus as set forth in claim 40, wherein said title extracting means is adapted for outputting a character string region disposed on a right side of the seventh character string region as the title regions.

42. The title extracting apparatus as set forth in claim 38, wherein said title extracting means is adapted for outputting an eighth character string region having a number of characters less than a predetermined threshold as the item regions, and a character string region positioned on a right side of the eighth character string region, having a number of characters equal to or larger than a threshold, as the title regions.

43. A title extracting apparatus to extract a region from a document image, comprising:
   a character region generating device to generate character regions of circumscribed rectangles of black pixel connected regions of the document image;
   a character string region generating device to unify generated character regions and to generate character string regions of the character regions; and
   a title extracting device to extract a character string region, according to attributes of the character string regions, as a title region, wherein the character string region generating device generates a histogram of frequency values of lengths of sides of the circumscribed rectangles, and a relation table of a predetermined frequency value and a length of a maximum side corresponding to the predetermined frequency value, and wherein the character string region generating device obtains a length of a first side, having a high frequency value, using the relation table, and generates the character string regions corresponding to the length of the first side.

44. A title extracting apparatus for recognizing and extracting a required partial region from a document image of a document that has been converted into image data, comprising:
   character region generating means for generating character regions, including black pixel connected regions composed of connected black pixels of the document image;
   character string region generating means for unifying one or more character regions generated by said character region generating means, and for generating character string regions including one or more character regions; and
   title extracting means for extracting a particular character string region of the character string regions, according to attributes, corresponding to the black pixel connected regions, of a plurality of character string regions generated by said character string region generating means, as a title region, wherein said character region generating means is adapted for obtaining circumscribed rectangles of the black pixel connected regions as the character regions, and wherein said character string region generating means is adapted for generating a first histogram that represents a distribution of the circumscribed rectangles in a first direction using a first side of each of the circumscribed rectangles, obtaining groups of the circumscribed rectangles from a shape of the first histogram, and processing each of the groups.

45. The title extracting apparatus as set forth in claim 44, wherein said character string region generating means is adapted for generating a second histogram that has a shape, and that represents a distribution of the circumscribed rectangles in a second direction using the second side of each of the circumscribed rectangles, obtaining groups of the circumscribed rectangles from the shapes of the first histogram and the second histogram, and processing each of the groups.

46. The title extracting apparatus as set forth in claim 44, wherein said character string region generating means is adapted for searching circumscribed rectangles included in the groups, obtaining circumscribed rectangles that overlap, and unifying the overlapping circumscribes rectangles into a single circumscribed rectangle.

47. A method of recognizing and extracting a required partial region from a document image of a document that has been converted into image data, comprising the steps of:
   1. generating character regions, that include black pixel connected regions composed of connected black pixels of the document image, including:
      a. obtaining circumscribed rectangles of the black pixel connected regions as the generated character regions;
   2. unifying one or more character regions generated in step 1 and generating character string regions including one or more character regions, including:
      a. generating a histogram of frequency values of lengths of sides of the circumscribed rectangles in the document image,
      b. generating a relation table of a predetermined frequency value and a length of a maximum side corresponding to the predetermined frequency value,
      c. obtaining a length of a first side, having a high frequency value of the document image, using the relation table, and
      d. generating the character string regions corresponding to the length of the first side; and
   3. extracting a particular character string region of the generated character string regions, according to attributes of a plurality of character string regions generated in step 2, as a title region.

48. A method of recognizing and extracting a required partial region from a document image of a document that has been converted into image data, comprising the steps of:
   1. generating character regions, that include black pixel connected regions composed of connected black pixels of the document image, including:
      a. obtaining circumscribed rectangles of the black pixel connected regions as the character regions;
   2. unifying one or more character regions generated in step 1, and generating character string regions including one or more character regions, including:
      a. generating a first histogram that represents a distribution of the circumscribed rectangles in a first direction using a first side of each of the circumscribed rectangles,
      b. obtaining groups of the circumscribed rectangles from a shape of the first histogram, and processing each of the groups,
      c. searching the circumscribed rectangles included in the groups, d. obtaining circumscribed rectangles that nest, and e. removing the nest; and 3. extracting a particular character string region of the generated character string regions, according to attributes of a plurality of character string regions generated in step 2, as a title region.

49. A method of recognizing and extracting a required partial region from a document image of a document that has been converted into image data, comprising the steps of:

1. generating character regions, that include black pixel connected regions composed of connected black pixels of the document image, including:
   a. obtaining circumscribed rectangles of the black pixel connected regions as the character regions;

2. unifying one or more character regions generated in step 1, and generating character string regions including one or more character regions, including:
   a. generating a first histogram that represents a distribution of the circumscribed rectangles in a first direction using a first side of each of the circumscribed rectangles,
   b. obtaining groups of the circumscribed rectangles from a shape of the first histogram, and processing each of the groups,
   c. searching the circumscribed rectangles in a group that includes a reference first circumscribed rectangle,
   d. obtaining a second circumscribed rectangle that adjoins the first circumscribed rectangle,
   e. generating a connection relation table that represents a connection relation of the first circumscribed rectangle and the second circumscribed rectangle, and
   f. generating the character string regions with the connection relation table; and 3. extracting a particular character string region of the generated character string regions, according to attributes of a plurality of character string regions generated in step 2, as a title region.

50. A method of recognizing and extracting a required partial region from a document image of a document that has been converted into image data, comprising the steps of:

1. generating character regions, that include black pixel connected regions composed of connected black pixels of the document image, including:
   a. obtaining circumscribed rectangles of the black pixel connected regions as the character regions;

2. unifying one or more character regions generated in step 1, and generating character string regions including one or more character regions, including:
   a. obtaining a second circumscribed rectangle adjacent to a reference first circumscribed rectangle,
   b. generating a connection relation table that represents a connection relation of the first circumscribed rectangle and the second circumscribed rectangle,
   c. assigning same identification information to the first circumscribed rectangle and the second circumscribed rectangle using the connection relation table, and
   d. unifying the first circumscribed rectangle and the second circumscribed rectangle into one character string region; and 3. extracting a particular character string region of the generated character string regions, according to attributes of a plurality of character string regions generated in step 2, as a title region.

51. A method of recognizing and extracting a required partial region from a document image of a document that has been converted into image data, comprising the steps of:

1. generating character regions, including black pixel connected regions composed of connected black pixels of the document image;

2. unifying one or more character regions generated in step 1, and generating character string regions including one or more character regions;

3. horizontally dividing an inside of the character string region into a plurality of partial regions, including:
   a. extracting a partial segment region with a large black pixel occupying ratio from each of the partial regions,
   b. unifying horizontally connected partial segment regions that have heights exceeding a predetermined threshold regardless of the heights, and
   c. extracting the unified horizontally connected partial segment regions; and 4. extracting a particular character string region of the generated character string regions, according to attributes of a plurality of character string regions generated in step 2, as a title region, using the unified horizontally connected partial segment region.

52. A method of recognizing and extracting a required partial region from a document image of a document that has been converted into image data, comprising the steps of:

1. generating character regions, including black pixel connected regions composed of connected black pixels of the document image;

2. unifying one or more character regions generated in step 1, and generating character string regions including one or more character regions; and 3. extracting a particular character string region of the generated character string regions, according to attributes of a plurality of character string regions generated in said character string region generating step, as a title region, including:
   a. extracting an underline attribute or a frame attribute as an attribute of the character string regions,
   b. assigning a number of points to each of the character string regions corresponding to the extracted underline attribute or frame attribute, a position of each character string regions, and a relative position relation between the character string regions, and
   c. treating a character string region having the greatest number of assigned points as the particular character string region.

53. A method of recognizing and extracting a required partial region from a document image of a document that has been converted into image data, comprising the steps of:

1. generating character regions, including black pixel connected regions composed of connected black pixels of the document image;

2. unifying one or more character regions generated in step 1, and generating character string regions including one or more character regions;

3. extracting a particular character string region of the generated character string regions, according to attributes of a plurality of character string regions generated in step 2, as a title region; and 4. obtaining a relative position relation or a size of another character string region corresponding to information of a position or size of the title region, and extracting the other character string region as an address region when the relative position or size of the other character string region satisfies a predetermined condition.

54. A method of recognizing and extracting a required partial region from a document image of a document that has been converted into image data, comprising the steps of:

1. generating character regions, including black pixel connected regions composed of connected black pixels of the document image;
2. unifying one or more character regions generated in step 1, and generating character string regions including one or more character regions;
3. extracting a particular character string region of the generated character string regions, according to attributes of a plurality of character string regions generated in step 2, as a title region; and
4. obtaining a relative position relation or a size of another character string region corresponding to information of a position or size of the title region, and extracting the other character string region as a sender information region when the relative position or size of the other character string region satisfies a predetermined condition.

55. A method of recognizing and extracting a required partial region from a document image of a document that has been converted into image data, comprising the steps of:
1. generating character regions, including black pixel connected regions composed of connected black pixels of the document image;
2. unifying one or more character regions generated in step 1, and generating character string regions including one or more character regions; and
3. extracting a particular character string region of the generated character string regions, according to attributes of a plurality of character string regions generated in step 2, as a title region, unifying two character string regions that adjoin and have similar sizes or coordinate values into one character string region.

56. A method of recognizing and extracting a required partial region from a document image of a document that has been converted into image data, comprising the steps of:
1. generating character regions, including black pixel connected regions composed of connected black pixels of the document image;
2. unifying one or more character regions generated in step 1, and generating character string regions including one or more character regions; and
3. extracting a particular character string region of the generated character string regions, according to attributes of a plurality of character string regions generated in step 2, as a title region, assigning a ruled line attribute to a character string region when determining that a ruled line is indicated by a size or a shape of the character string region, and extracting the title region corresponding to the ruled line attribute.

57. A method of recognizing and extracting a required partial region from a document image of a document that has been converted into image data, comprising the steps of:
1. generating character regions, including black pixel connected regions composed of connected black pixels of the document image;
2. unifying one or more character regions generated in step 1, and generating character string regions including one or more character regions; and
3. extracting a table region, including a black pixel connected region having a predetermined size, and extracting a particular character string region from a plurality of character string regions in the table region as a title region, dividing a fifth character string region having a ruled line at a position of the ruled line.

58. A method of recognizing and extracting a required partial region from a document image of a document that has been converted into image data, comprising the steps of:
1. generating character regions, including black pixel connected regions composed of connected black pixels of the document image;
2. unifying one or more character regions generated in step 1, and generating character string regions including one or more character regions; and
3. extracting a table region, including a black pixel connected region having a predetermined size, and extracting a particular character string region from a plurality of character string regions in the table region as a title region, determining whether a ruled line is disposed in a particular region within a sixth character string region in the table region, and treating the sixth character string region as an out-of-table character string region when the ruled line is not disposed in the particular region.

59. A method of recognizing and extracting a required partial region from a document image of a document that has been converted into image data, comprising the steps of:
1. generating character regions, including black pixel connected regions composed of connected black pixels of the document image;
2. unifying one or more character regions generated in step 1, and generating character string regions including one or more character regions; and
3. extracting a table region that includes a black pixel connected region having a predetermined size, including:
   a. extracting a particular character string region from a plurality of character string regions in the table region as a title region, and
   b. outputting the character string regions in order of positions closest to an upper left edge of the table region.

60. A method of recognizing and extracting a required partial region from a document image of a document that has been converted into image data, comprising the steps of:
1. generating character regions, including black pixel connected regions composed of connected black pixels of the document image;
2. unifying one or more character regions generated in step 1, and generating character string regions including one or more character regions; and
3. extracting a table region that includes a black pixel connected region having a predetermined size, including:
   a. extracting a particular character string region from a plurality of character string regions in the table region as a title region,
   b. assigning priority order to character string regions that are likely to be an item of an item region, and character string regions that are likely to be titles of title regions, and
   c. outputting the item region and the title region.

61. A method of extracting a region from a document image, comprising the steps of:
1. generating character regions of circumscribed rectangles of black pixel connected regions of the document image;
2. unifying generated character regions and generating character string regions of the character regions, including:

a. generating a histogram of frequency values of lengths of sides of the circumscribed rectangles, and a relation table of a predetermined frequency value and a length of a maximum side corresponding to the predetermined frequency value, b. obtaining a length of a first side, having a high frequency value, using the relation table, and c. generating the character string regions corresponding to the length of the first side; and 3. extracting a character string region, according to attributes of the character string regions, as a title region.

62. A storage device for causing a computer to recognize and extract a required partial region from a document image of a document that has been converted into image data, comprising:

1. generating character regions, that include black pixel connected regions composed of connected black pixels of the document image, including:

a. obtaining circumscribed rectangles of the black pixel connected regions as the generated character regions;

2. unifying one or more character regions generated in step 1 and generating character string regions including one or more character regions, including:

a. generating a histogram of frequency values of lengths of sides of the circumscribed rectangles in the document image;

b. generating a relation table of a predetermined frequency value and a length of a maximum side corresponding to the predetermined frequency value;

c. obtaining a length of a first side, having a high frequency value of the document image, using the relation table;

d. generating the character string regions corresponding to the length of the first side; and 3. extracting a particular character string region of the generated character string regions, according to attributes of a plurality of character string regions generated in step 2, as a title region.

63. A storage device for causing a computer to recognize and extract a required partial region from a document image of a document that has been converted into image data, comprising:

1. generating character regions, that include black pixel connected regions composed of connected black pixels of the document image, including:

a. obtaining circumscribed rectangles of the black pixel connected regions as the character regions;

2. unifying one or more character regions generated in step 1, and generating character string regions including one or more character regions, including:

a. generating a first histogram that represents a distribution of the circumscribed rectangles in a first direction using a first side of each of the circumscribed rectangles, b. obtaining groups of the circumscribed rectangles from a shape of the first histogram, and processing each of the groups, c. searching the circumscribed rectangles included in the groups, d. obtaining circumscribed rectangles that nest, and e. removing the nest; and 3. extracting a particular character string region of the generated character string regions, according to attributes of a plurality of character string regions generated in step 2, as a title region.

64. A storage device for causing a computer to recognize and extract a required partial region from a document image of a document that has been converted into image data, comprising:

1. generating character regions, that include black pixel connected regions composed of connected black pixels of the document image, including:

a. obtaining circumscribed rectangles of the black pixel connected regions as the character regions;

2. unifying one or more character regions generated in step 1, and generating character string regions including one or more character regions, including:

a. generating a first histogram that represents a distribution of the circumscribed rectangles in a first direction using a first side of each of the circumscribed rectangles, b. obtaining groups of the circumscribed rectangles from a shape of the first histogram, and processing each of the groups, c. searching the circumscribed rectangles in a group that includes a reference first circumscribed rectangle, d. obtaining a second circumscribed rectangle that adjoins the first circumscribed rectangle, e. generating a connection relation table that represents a connection relation of the first circumscribed rectangle and the second circumscribed rectangle, and f. generating the character string regions with the connection relation table; and 3. extracting a particular character string region of the generated character string regions, according to attributes of a plurality of character string regions generated in step 2, as a title region.

65. A storage device for causing a computer to recognize and extract a required partial region from a document image of a document that has been converted into image data, comprising:

1. generating character regions, that include black pixel connected regions composed of connected black pixels of the document image, including:

a. obtaining circumscribed rectangles of the black pixel connected regions as the character regions;

2. unifying one or more character regions generated in step 1, and generating character string regions including one or more character regions, including:

a. obtaining a second circumscribed rectangle adjacent to a reference first circumscribed rectangle, b. generating a connection relation table that represents a connection relation of the first circumscribed rectangle and the second circumscribed rectangle, c. assigning same identification information to the first circumscribed rectangle and the second circumscribed rectangle using the connection relation table, and d. unifying the first circumscribed rectangle and the second circumscribed rectangle into one character string region; and 3. extracting a particular character string region of the generated character string regions, according to attributes of a plurality of character string regions generated in step 2, as a title region.

66. A storage device for causing a computer to recognize and extract a required partial region from a document image of a document that has been converted into image data, comprising:

1. generating character regions, including black pixel connected regions composed of connected black pixels of the document image;

2. unifying one or more character regions generated in step 1, and generating character string regions including one or more character regions;
3. horizontally dividing an inside of the character string region into a plurality of partial regions, including:
    a. extracting a partial segment region with a large black pixel occupying ratio from each of the partial regions,
    b. unifying horizontally connected partial segment regions that have heights exceeding a predetermined threshold regardless of the heights, and
    c. extracting the unified horizontally connected partial segment regions; and
4. extracting a particular character string region of the generated character string regions, according to attributes of a plurality of character string regions generated in step 2, as a title region, using the unified horizontally connected partial segment region.

67. A storage device for causing a computer to recognize and extract a required partial region from a document image of a document that has been converted into image data, comprising:
    1. generating character regions, including black pixel connected regions composed of connected black pixels of the document image;
    2. unifying one or more character regions generated in step 1, and generating character string regions including one or more character regions; and
    3. extracting a particular character string region of the generated character string regions, according to attributes of a plurality of character string regions generated in said character string region generating step, as a title region, including:
        a. extracting an underline attribute or a frame attribute as an attribute of the character string regions,
        b. assigning a number of points to each of the character string regions corresponding to the extracted underline attribute or frame attribute, a position of each character string regions, and a relative position relation between the character string regions, and
        c. treating a character string region having the greatest number of assigned points as the particular character string region.

68. A storage device for causing a computer to recognize and extract a required partial region from a document image of a document that has been converted into image data, comprising:
    1. generating character regions, including black pixel connected regions composed of connected black pixels of the document image;
    2. unifying one or more character regions generated in step 1, and generating character string regions including one or more character regions;
    3. extracting a particular character string region of the generated character string regions, according to attributes of a plurality of character string regions generated in step 2, as a title region; and
    4. obtaining a relative position relation or a size of another character string region corresponding to information of a position or size of the title region, and extracting the other character string region as an address region when the relative position or size of the other character string region satisfies a predetermined condition.

69. A storage device for causing a computer to recognize and extract a required partial region from a document image of a document that has been converted into image data, comprising:
    1. generating character regions, including black pixel connected regions composed of connected black pixels of the document image;
    2. unifying one or more character regions generated in step 1, and generating character string regions including one or more character regions;
    3. extracting a particular character string region of the generated character string regions, according to attributes of a plurality of character string regions generated in step 2, as a title region; and
    4. obtaining a relative position relation or a size of another character string region corresponding to information of a position or size of the title region, and extracting the other character string region as a sender information region when the relative position or size of the other character string region satisfies a predetermined condition.

70. A storage device for causing a computer to recognize and extract a required partial region from a document image of a document that has been converted into image data, comprising:
    1. generating character regions, including black pixel connected regions composed of connected black pixels of the document image;
    2. unifying one or more character regions generated in step 1, and generating character string regions including one or more character regions; and
    3. extracting a particular character string region of the generated character string regions, according to attributes of a plurality of character string regions generated in step 2, as a title region, unifying two character string regions that adjoin and have similar sizes or coordinate values into one character string region.

71. A storage device for causing a computer to recognize and extract a required partial region from a document image of a document that has been converted into image data, comprising:
    1. generating character regions, including black pixel connected regions composed of connected black pixels of the document image;
    2. unifying one or more character regions generated in step 1, and generating character string regions including one or more character regions; and
    3. extracting a particular character string region of the generated character string regions, according to attributes of a plurality of character string regions generated in step 2, as a title region, assigning a ruled line attribute to a character string region when determining that a ruled line is indicated by a size or a shape of the character string region, and extracting the title region corresponding to the ruled line attribute.

72. A storage device for causing a computer to recognize and extract a required partial region from a document image of a document that has been converted into image data, comprising:
    1. generating character regions, including black pixel connected regions composed of connected black pixels of the document image;
    2. unifying one or more character regions generated in step 1, and generating character string regions including one or more character regions; and
    3. extracting a table region, including a black pixel connected region having a predetermined size, and extracting a particular character string region from a plurality of character string regions in the table region as a title region, dividing a fifth character string region having a ruled line at a position of the ruled line.

73. A storage device for causing a computer to recognize and extract a required partial region from a document image of a document that has been converted into image data, comprising:

1. generating character regions, including black pixel connected regions composed of connected black pixels of the document image;
2. unifying one or more character regions generated in step 1, and generating character string regions including one or more character regions; and
3. extracting a table region, including a black pixel connected region having a predetermined size, and extracting a particular character string region from a plurality of character string regions in the table region as a title region, determining whether a ruled line is disposed in a particular region within a sixth character string region in the table region, and treating the sixth character string region as an out-of-table character string region when the ruled line is not disposed in the particular region.

74. A storage device for causing a computer to recognize and extract a required partial region from a document image of a document that has been converted into image data, comprising:

1. generating character regions, including black pixel connected regions composed of connected black pixels of the document image;
2. unifying one or more character regions generated in step 1, and generating character string regions including one or more character regions; and
3. extracting a table region that includes a black pixel connected region having a predetermined size, including:
   a. extracting a particular character string region from a plurality of character string regions in the table region as a title region, and
   b. outputting the character string regions in order of positions closest to an upper left edge of the table region.

75. A storage device for causing a computer to recognize and extract a required partial region from a document image of a document that has been converted into image data, comprising:

1. generating character regions, including black pixel connected regions composed of connected black pixels of the document image;
2. unifying one or more character regions generated in step 1, and generating character string regions including one or more character regions; and
3. extracting a table region that includes a black pixel connected region having a predetermined size, including:
   a. extracting a particular character string region from a plurality of character string regions in the table region as a title region,
   b. assigning priority order to character string regions that are likely to be an item of an item region, and character string regions that are likely to be titles of title regions, and
   c. outputting the item region and the title region.

76. A storage device for causing a computer to extract a region from a document image, comprising:

1. generating character regions of circumscribed rectangles of black pixel connected regions of the document image;
2. unifying generated character regions and generating character string regions of the character regions, including:
   a. generating a histogram of frequency values of lengths of sides of the circumscribed rectangles, and a relation table of a predetermined frequency value and a length of a maximum side corresponding to the predetermined frequency value,
   b. obtaining a length of a first side, having a high frequency value, using the relation table, and
   c. generating the character string regions corresponding to the length of the first side; and
3. extracting a character string region, according to attributes of the character string regions, as a title region.

* * * * *